(12) United States Patent
Vincent

(10) Patent No.: US 6,195,122 B1
(45) Date of Patent: Feb. 27, 2001

(54) SPATIAL REFERENCED PHOTOGRAPHY

(76) Inventor: Robert Vincent, 60 Spring St., Wakefield, IL (US) 01880

( * ) Notice: Subject to any disclaimer, the term of this patent is extended or adjusted under 35 U.S.C. 154(b) by 0 days.

(21) Appl. No.: 08/894,206

(22) PCT Filed: Jan. 31, 1996

(86) PCT No.: PCT/US96/01434

§ 371 Date: Jul. 30, 1997

§ 102(e) Date: Jul. 30, 1997

(87) PCT Pub. No.: WO96/24216

PCT Pub. Date: Aug. 8, 1996

(51) Int. Cl.[7] .............................. H04N 7/00; H04N 5/76; H04N 5/225

(52) U.S. Cl. .................... 348/169; 348/232; 348/333.02; 348/333.12; 348/552; 345/339; 396/310; 396/374

(58) Field of Search .............................. 348/15, 135, 141, 348/142, 143, 169, 207, 211, 213, 222, 231, 232, 233, 333.01, 333.02, 333.12, 373, 375, 552; 358/906, 909.1; 345/326, 333, 334, 339; 396/50, 310, 321, 373, 374, 378, 383

(56) References Cited

U.S. PATENT DOCUMENTS

| | | | |
|---|---|---|---|
| 4,084,184 | 4/1978 | Crain | 358/93 |
| 4,169,666 | 10/1979 | Slater et al. | 352/85 |
| 4,561,063 | 12/1985 | Craig et al. | 364/559 |
| 4,855,822 | 8/1989 | Narendra et al. | 358/103 |
| 5,075,861 | * 12/1991 | Hasson | 701/220 |
| 5,189,402 | 2/1993 | Naimark et al. | 340/709 |
| 5,262,867 | 11/1993 | Kojima | 358/209 |
| 5,335,072 | 8/1994 | Tanaka et al. | 348/232 |
| 5,490,075 | 2/1996 | Howard et al. | 364/459 |
| 5,523,783 | 6/1996 | Cho | 348/157 |
| 5,793,367 | * 8/1998 | Taguchi | 348/211 |
| 5,881,321 | * 3/1999 | Kivolowitz | 348/61 |
| 5,913,078 | * 6/1999 | Kimura | 396/310 |
| 6,037,936 | * 3/2000 | Ellenby | 348/552 |

* cited by examiner

Primary Examiner—Wendy Garber
Assistant Examiner—Ngoc-Yen Vu
(74) Attorney, Agent, or Firm—Foley & Lardner; James A. Sprowl

(57) ABSTRACT

An image system captures, along with the images, information defining both the position and the orientation of a camera along with the distance to the subject. A video camera is attached to three accelerometers, two gyroscopes, and a rangefinder. Data gathered from these devices and defining the pitch, yaw, and roll of the camera, the camera's acceleration, and the camera's distance to the subject is captured and recorded along with the video images. The video images are later stored within a computer's database along with data defining the position and the orientation of the camera, and the distance to the subject for each image. The images may then be presented to a user in a three-dimensional display in which the user can navigate through the images using a joystick or a mouse.

11 Claims, 30 Drawing Sheets

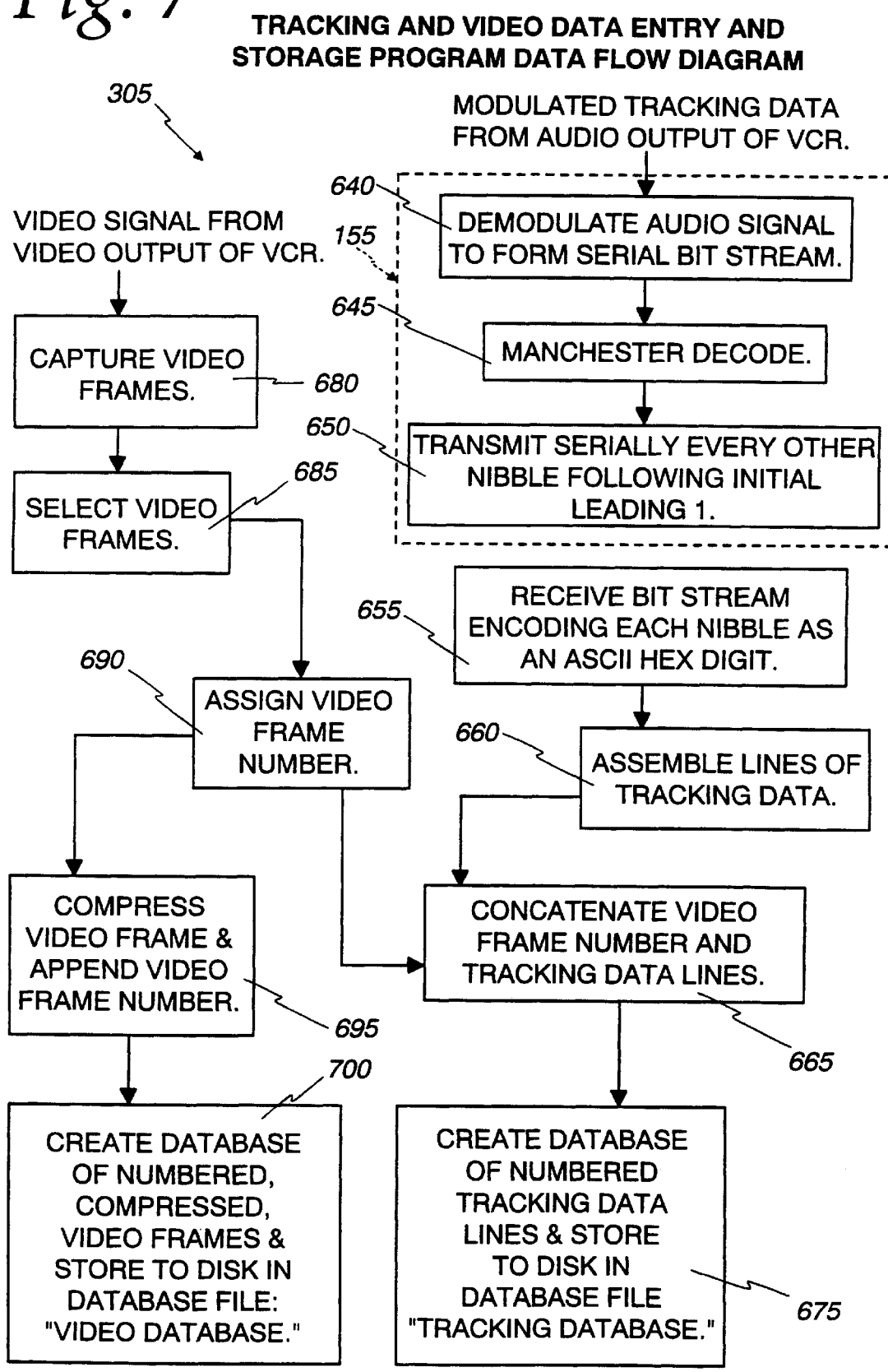

Fig. 8  POSITIONAL DATA RECORD FORMAT

QUATERNION POSITION NOTATION RECORD FORMAT (715)

| POS | SP | VF# | SP | VF# | SP | X | SP | Y | SP | Z | SP | $V_W$ | SP | $V_X$ | SP | $V_Y$ | SP | $V_Z$ |
|---|---|---|---|---|---|---|---|---|---|---|---|---|---|---|---|---|---|---|
| 720 | 725 | 730 | 725 | 730 | 725 | 735 | 725 | 740 | 725 | 745 | 725 | 750 | 725 | 755 | 725 | 766 | 725 | 770 |

DIRECT ANGULAR NOTATION RECORD FORMAT (775)

| POS | SP | VF# | SP | VF# | SP | X | SP | Y | SP | Z | SP | $R_X$ | SP | $R_Y$ | SP | $R_Z$ |
|---|---|---|---|---|---|---|---|---|---|---|---|---|---|---|---|---|
| 720 | 725 | 730 | 725 | 730 | 725 | 735 | 725 | 740 | 725 | 745 | 725 | 780 | 725 | 785 | 725 | 790 |

SPATIAL REFERENCED PHOTOGRAPHY

CROSS-REFERENCE TO RELATED APPLICATION

This is a continuation-in-part of U.S. patent application Ser. No. 08/383,471, filed on Jan. 31, 1995, which is hereby incorporated by reference. In particular, the '471 application contains a more detailed description of the tracking data acquisition unit control circuit 470 (in '471 application FIGS. 16 to 23 and the accompanying text) and exemplary program listings (presented in the Appendices of the '471 application) which may be of interest to those seeking a more detailed understanding of the present invention.

FIELD OF THE INVENTION

This invention relates to referencing, sorting, and displaying images in a three-dimensional system. More particularly, it relates to a system having an image capturing device that captures images of objects together with spatial reference information defining the absolute position of the image capturing device and the relative position of the object relative to that device. It also relates to image retrieval and display, where the spatial reference information associated with each image facilitates browsing through the images in an organized manner.

BACKGROUND OF THE INVENTION

The editing of films and video images, i.e., to rearrange action sequences, is well known. However, the movie and video cameras used to capture the images that are later edited do not store with those images any machine-understandable record of image and camera position. Accordingly, the edited films and videos permit one to view the images in only one predetermined order. determined by the editor. If some other ordering of the image presentation is desired, it must be achieved through a difficult manual editing process.

A computerized, interactive editing process is described in a doctoral thesis "Cognitive Space in the Interactive Movie Map: An Investigation of Spatial Learning in Virtual Environments", by Robert Mohl, 1981, submitted at MIT. In a demonstration carried out using images recorded at Aspen, Colo., the viewer is permitted to select film clips taken by a camera that is arranged to simulate driving down a street. At each intersection, the viewer chooses to turn left, turn right, or to proceed straight ahead. The viewer thereby simulates driving around streets in Aspen, Colo.

In other fields, it is known to gather, along with images, information concerning the position of the camera. Governmental and private agencies use satellites and airplanes to record images of positionally referenced data, such as land features or clouds. Each image frame contains positional references to the image tilt or plane of the camera. Present methods commonly either constrain the orientation of the camera to a fixed position, i.e. up and down, or use features captured in the image frames to derive relative positions and orientations of successive images when combining the image frames to form a map or the like.

Devices are known which combine images by matching features common to each of two or more images, i.e. superimposing.

One aspect of the present invention is recording positional data along with images. A number of methods are known whereby one may locate an object and describe the position of an object relative to a positional reference. For example, a magnetic device is known which can determine its position and orientation within a known magnetic field. Satellite systems and radio signal triangulation can also be used to determine position precisely. Inertial position determination systems are also known and are widely used in inertial navigational systems.

An object of this invention is providing an image data gathering device which encodes positional and/or spatial information by capturing both camera position and camera orientation information along with image data. This information permits images to be joined or sequenced for viewing without the distortions that can result from attempting to match the edges of adjoining images together.

A further object of this invention is providing three-dimensional image reconstruction of objects using frames shot from different viewpoints and perspectives through the provision of a triangulation reference.

Still another object of this invention is providing a camera path map which allows images to be selected based upon the position and orientation of the camera from the map. For example, an operator cam learn the location of an object in a film clip, such as an escalator. Images of the escalator may then be quickly and automatically located by selecting other frames which point to that same escalator from different camera positions.

Another object of the invention is providing a compact and practical image and positional data recording system which uses commonly available equipment. A system having accelerometers mounted directly upon the recorder, eliminating the need for a restrained or gimballed platform, permits greater freedom of motion for the recording device as well as reduced cost and complexity.

Briefly described, the invention resides in a video camera that is integrated with a tracking data acquisition unit containing accelerometers and gimbal-mounted gyroscopes, and optionally a rangefinder. As the operator of the video camera moves about taking a motion picture of the environment, a microprocessor and logic associated with the accelerometers and gyroscopes senses all rotational motions of the camera by means of sensors associated with the gimbals and senses all translational motions of the camera by means of sensors associated with the accelerometers. And the rangefinder provides information to the microprocessor and logic concerning the distance from the camera to the subject being photographed.

From data presented by these sensors, the microprocessor and logic compute and generate a modulated audio signal that is encoded with a continuous record of acceleration in the X, Y and Z directions as well as with a continuous record of the pitch, roll, and yaw of the camera and of the distance to the subject. This audio tracking information data signal is recorded on the audio track of the same video tape upon which the video images are being recorded by the camera. In this manner, the video tape recording captures, along with the sequence of images. the tracking data from which the precise position of the camera, its precise orientation, and the position of the subject may later be computed.

Later on, the recorded audio tracking information data and video data is played back into a computer. Images are selected from the sequence of images and are retained, in compressed form, in a database. Each image is then linked to computed positional information that defines, for each image, the location and orientation of the camera and, optionally, the distance to the subject and the subject location. This positional information is derived through computation from the tracking information retrieved from the video tape audio track, as will be explained below.

Next, special computer programs can aid an individual using the computer in navigating through the images, using the positional information to organize the images in ways that make it easy for the user to browse through the images presented on the graphics screen. Several such programs are described below, and a complete description is presented of a movie mapper program which presents the user with a plan view and elevational views of the camera path plotted as a graph alongside views of selected images, with the path marked to show the position and orientation of the camera. The user, by clicking at any point on this path with a computer mouse, may instantly retrieve and view an image captured at the chosen point. Additionally, by clicking upon diamonds and arrows and the like displayed as overlays superimposed upon an image, the user may command the program to search for and find the nearest image which gives a view rotated slightly to the left or right or which maintains the same view but advances forward in the direction of the view or backward. One may also jump forward and turn simultaneously. A wider field of view may be assembled by assembling automatically chosen images and aligning them into a panorama. The user is thus enabled to navigate through the images in the manner of navigating a boat to the extent permitted by the nature and variety of the images in the data base.

Further objects and advantages are apparent in the drawings and in the detailed description which follows.

BRIEF DESCRIPTION OF THE DRAWINGS

FIG. 7 is a data flow diagram depicting the tracking and video data flow from playback of the video cassette recorder 130, through the demodulation circuit 155, into the personal computer 185 under the control of the data entry and storage program 305.

FIG. 8 is a data format diagram depicting alternative positional data record formats including the quaternion position notation record format 715 and the direct angular notation format 775.

DETAILED DESCRIPTION OF THE PREFERRED EMBODIMENT

Figure 1:
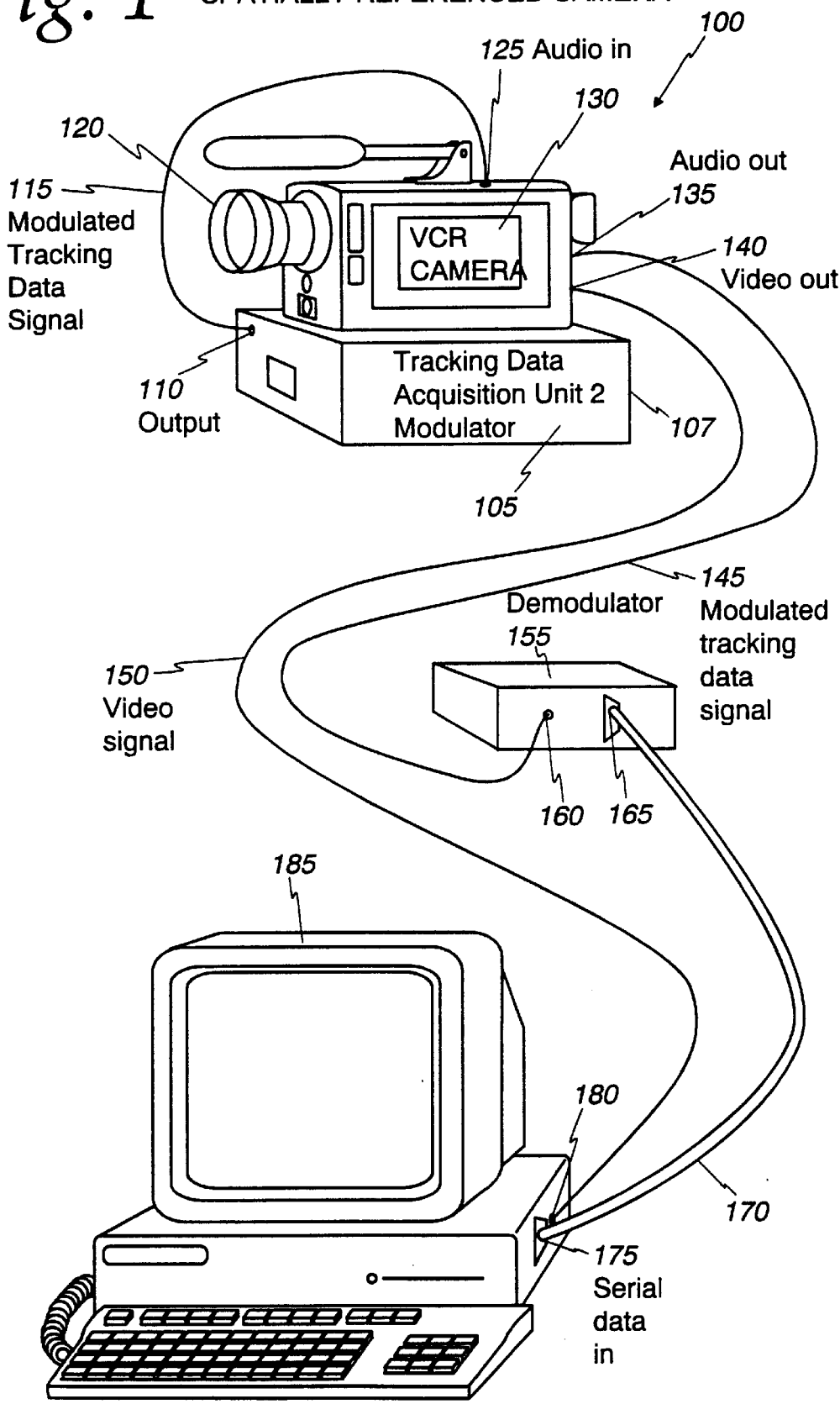
FIG. 1 is a rendering of the spatially referenced video camera 100, which includes a tracking data acquisition unit and modulator 105, a video camera 120 having a video cassette recorder 130, a demodulation circuit 155, and a personal computer 185.

Referring to the drawings and especially to FIG. 1, a spatially referenced video camera is shown embodying the present invention and generally identified by the numeral 100. The spatially referenced video camera 100 includes a tracking data acquisition unit 105 rigidly attached to a video camera 120 having a built-in video cassette recorder 130. As the spatially referenced video camera 100 is operated, video data from the video camera 120 and tracking data from the tracking data acquisition unit 105 are recorded onto a video cassette within the recorder 130. Once the desired recordings have been made, the information is transferred to a personal computer 185 for processing and display.

Figure 3:
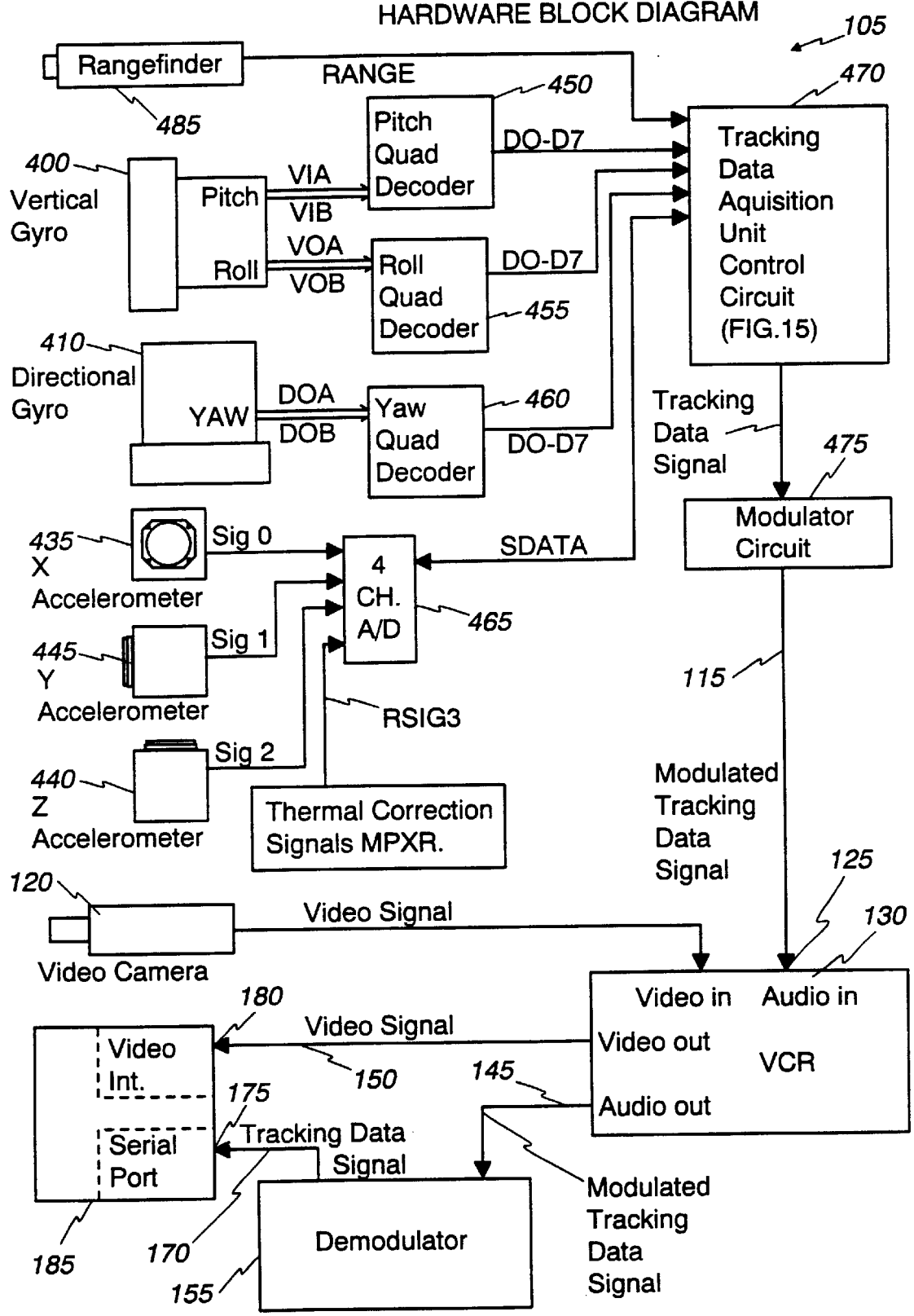
FIG. 3 is a block diagram showing the tracking sensors and the microprocessor based tracking data acquisition unit control circuit 470 according to the invention in the context of the spatially referenced video camera 100.

FIG. 3 presents a block diagram of the camera 100, illustrating its individual hardware components and how they are interconnected by signal paths. The tracking data acquisition unit control circuit 470 contains a data acquisition program 300 (FIG. 16), and the personal computer 185 contains a number of computer programs. All of these programs, and their data flow relationships, are shown in FIG. 5 which illustrates the camera 100's software components in overview.

Figure 5:
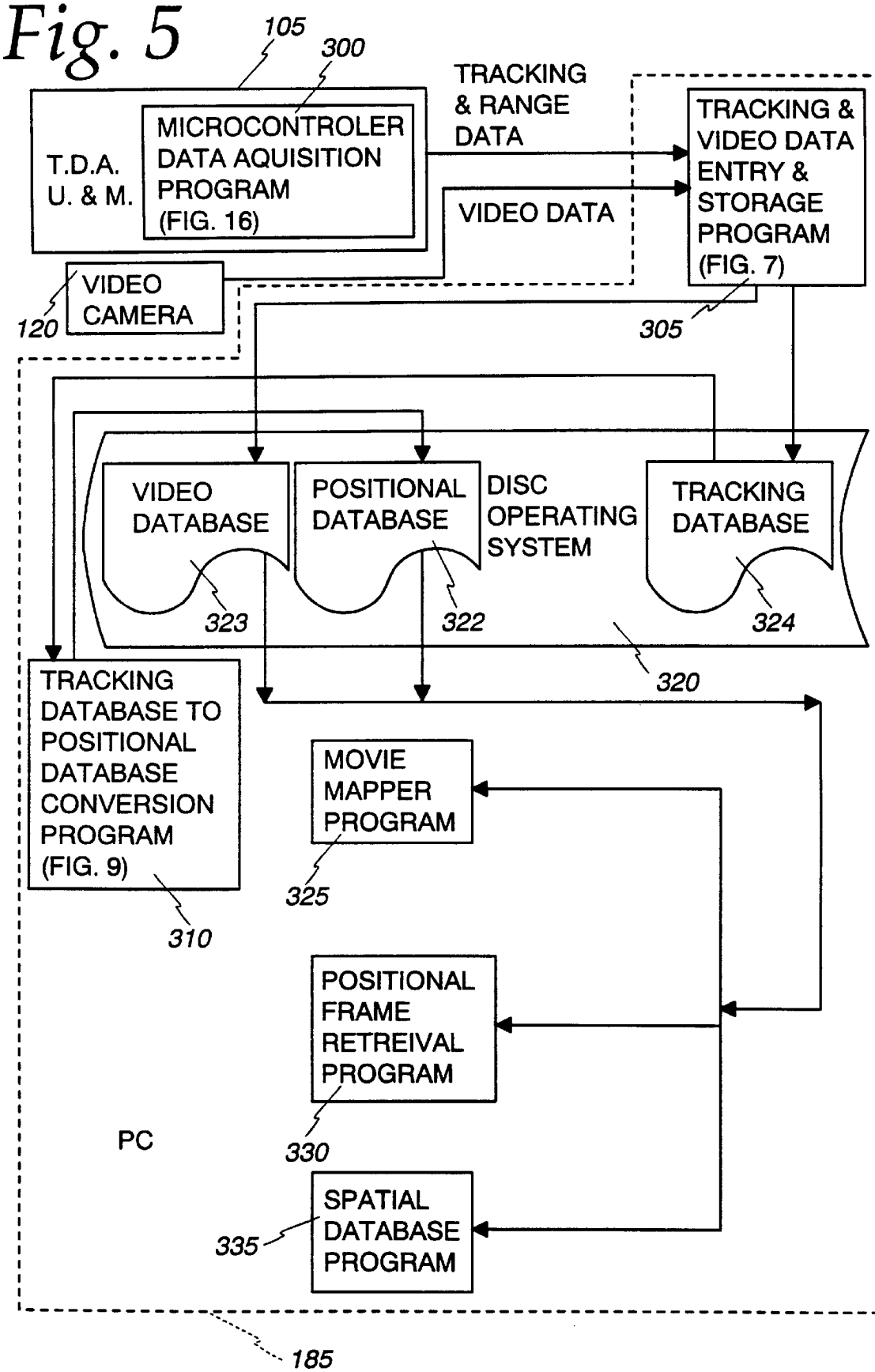
FIG. 5 is a block diagram of the program system modules that represent the major software components of the spatially referenced camera system.

With reference to FIG. 5, the video data gathered by the video camera 120 and the position and orientation data gathered by the tracking data acquisition unit and modulator 105 (under the control of the microcontroller data acquisition program 300) are first stored on videotape. Later, they are fed into the personal computer 185. The two data streams are captured by the tracking and video data entry and storage program 305 and are stored, respectively, in a tracking database 324 and in a video database 323.

Once safely stored within the personal computer 185, the tracking database 324 is reprocessed into a positional database 322 by a tracking database to positional database conversion program 310. Now the image retrieval programs 325, 330, and 335 may be called upon to search through the positional database 322, to retrieve images from the video database 323 based upon camera location, camera orientation, and even object location, and to display the images upon the face of the computer 185.

Tracing the data flow through the system components at a more detailed level will explain the functionality of the preferred embodiment of the spatially referenced camera.

Figure 2:
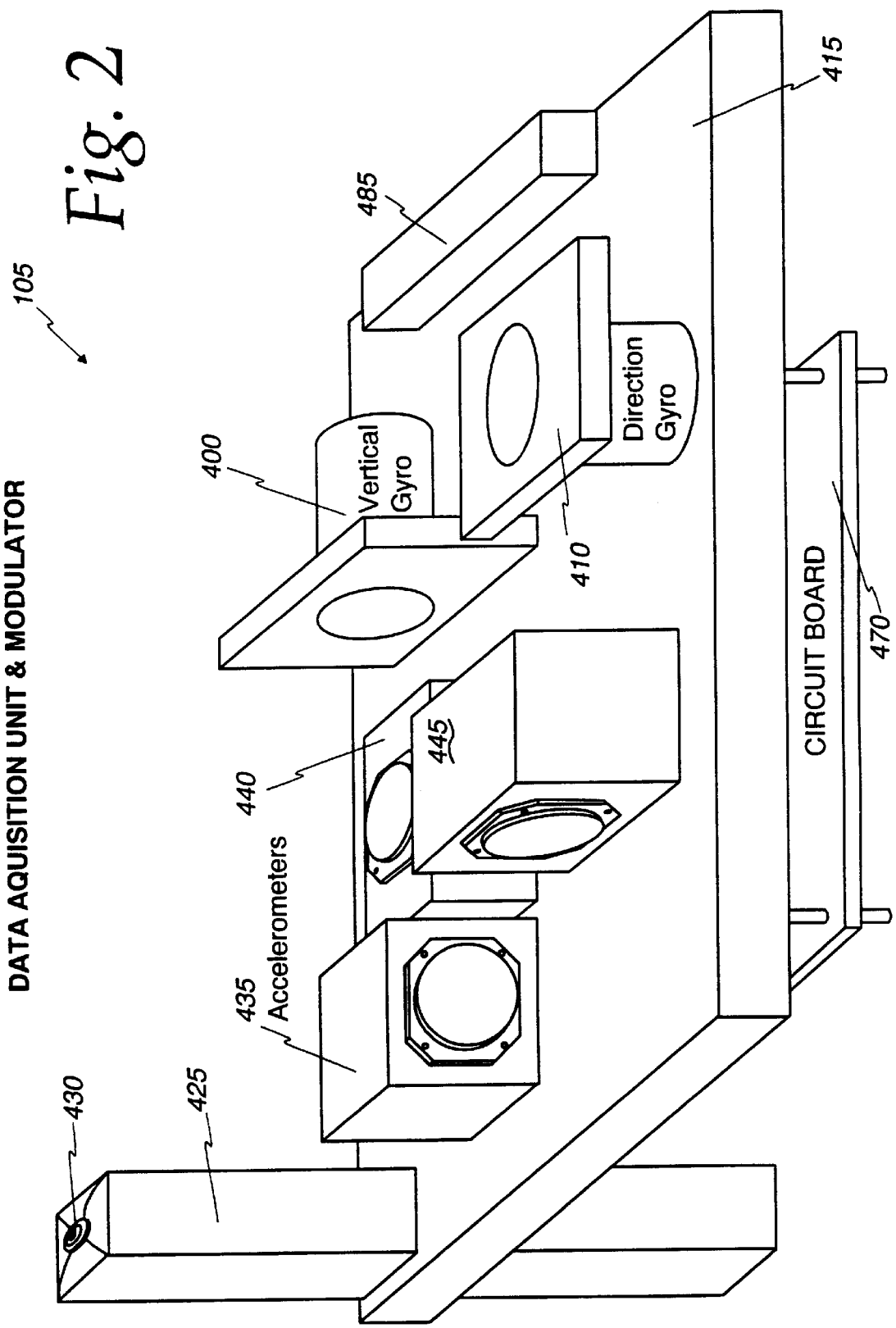
FIG. 2 is a perspective drawing of the tracking data acquisition unit and modulator 105.

First, the video camera 120 (FIG. 1) produces a standard video signal that is recorded on the video track of a video cassette by the camera's video cassette recorder 130. Referring to FIG. 2, the tracking data acquisition unit 105 contains three orthogonally positioned translational accelerometers 435, 440, and 445; two orthogonally arranged gyroscopes 400 and 410; and a laser rangefinder 485. All six of these sensors are rigidly mounted to an inertial platform 415. Referring to FIG. 3, a control circuit 470 polls the output signals of these sensors and assembles tracking data frames 535 (FIG. 4) which describe the instantaneous, real time orientation and translation acceleration experienced by the spatially referenced video camera 100. A serial bit stream comprised of these tracking data frames is modulated to produce an audio line level modulated tracking data signal 115 which is fed into the audio input 125 of the video cassette recorder 130 and recorded on the audio track of the video cassette alongside the corresponding video information.

Second, the completed recording, stored on the video cassette, is played back to the personal computer 185 on any standard video cassette player or directly from the camera 120 (FIG. 1). The tracking data is demodulated by a demodulator circuit 155 and is input to the personal computer 185 through a standard serial I/O serial port 175. Simultaneously, the video data is input to the personal computer 185 via a video digitizer input 180. Referring to FIG. 5, a data entry and storage program 305 stores the tracking and video data on the personal computer's disk operating system 320 in a tracking database 324 and in a video database 323. A second program 310 converts the tracking database 324 into a positional database 322.

Third, the set of three display programs 325, 330, and 335 allow a user to view and select video frames based on the relative position or absolute orientation of the camera.

Tracing the data flow through the individual parts of the spatially referenced video camera 100 at the most detailed level discloses how to build the preferred embodiment of the invention.

Referring to FIG. 3, the tracking data acquisition unit 105 continuously measures the translational acceleration and rotational orientation experienced by the spatially referenced video camera 100. To achieve the most accurate measurement of translational acceleration, three accelerometers 435, 440 and 445, such as SUNDSTRAND Model QA-700, are positioned orthogonal to each other and are mounted on a stable inertial platform 415. The accelerometers measure acceleration in each of three dimensions: accelerometer 435 measures acceleration in the X direction, accelerometer 445 measures acceleration in the Y direction, accelerometer 440 measures acceleration in the Z direction. Each accelerometer outputs a voltage signal with an amplitude proportional to the acceleration detected. A multi-channel analog to digital converter 465, such as ANALOG DEVICES Model AD7716, receives each accelerometer's output and generates a 24-bit numerical representation of the acceleration experienced in each direction.

Two gyroscopes, such as GYRATION Model GE9100A, a vertical gyroscope 400 and a directional gyroscope 410 are also orthogonally mounted on the stable inertial platform 415 relative to each other. The vertical gyroscope 400, aligned along the X or Y axis, measures yaw (rotation about the Z axis). while the directional gyroscope 410, aligned along the Z axis, measures both roll (rotation about the Y axis) and pitch (rotation about the X axis). (The Y axis is assumed to point in the direction of the camera.) The gyroscopes are dual gimballed electronic components that generate a pair of square wave signals which are locked out of phase with respect to each other. The sequence of the rising and falling edges of the square waves relative to each other indicates the angular rotation about the gyroscope's measurement axis experienced by the spatially referenced camera 100. Quadrature decoders 450, 455, 460, such as HEWLETT PACKARD Model HCTL2020, receive the three paired square wave signal outputs of the gyroscopes 400, 410; and for each signal pair, they count the relative sequence of rising and falling edges between the two square wave signals to generate a 16-bit numerical representation of the rotation experienced about each axis. An interrupt is generated following any change in these signals. This interrupt causes a central processing unit 480 (FIG. 15) within the tracking data acquisition unit 105 to capture the new status of the counts within the decoders 450. 455, and 460.

The inertial platform 415 (FIG. 2) is connected to a post 425 that is threaded at one end 430 such that the entire data acquisition unit 105 can be rigidly attached to the tripod mounting hardware of a standard camcorder 120.

Figure 4:
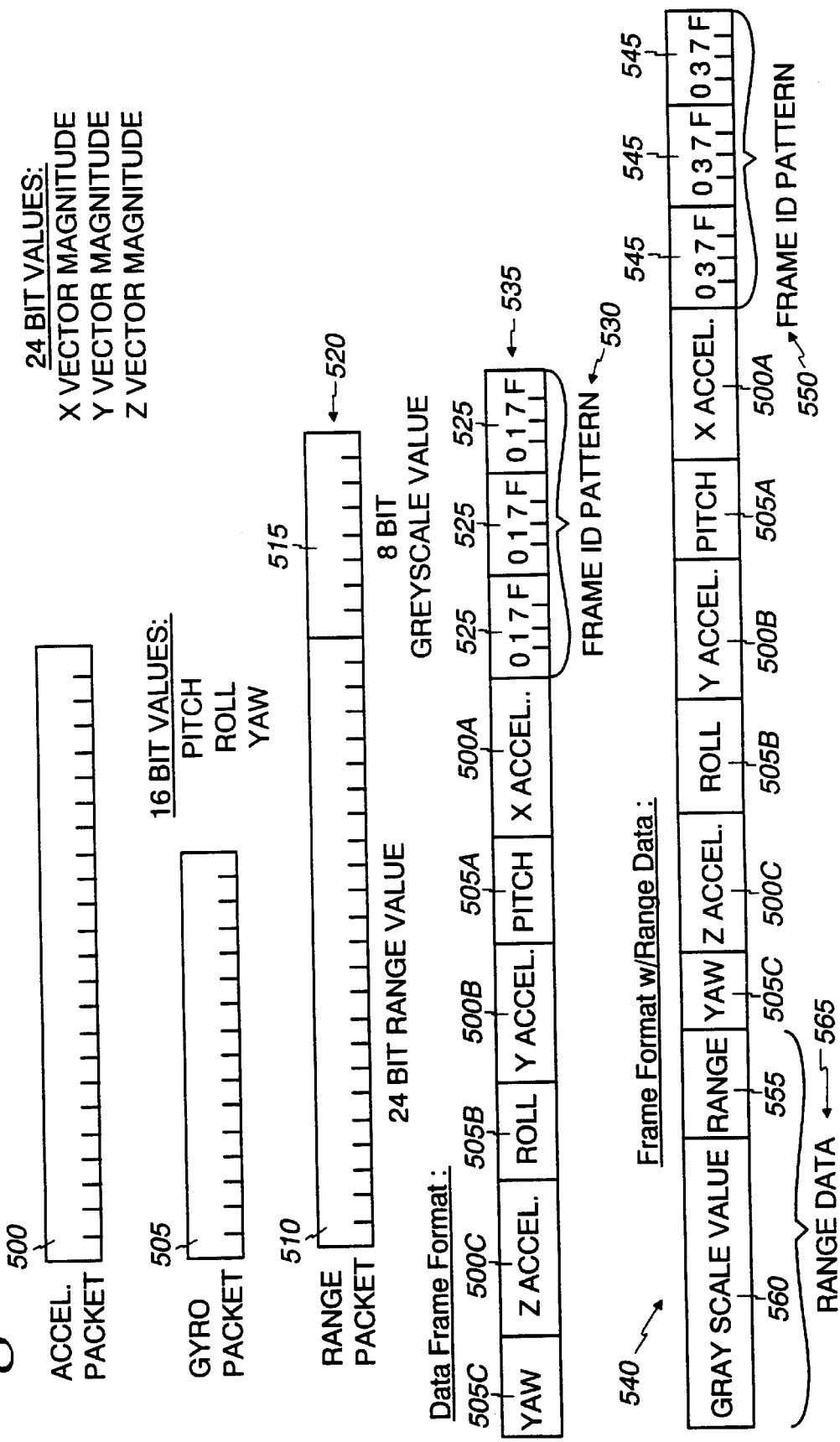
FIG. 4 is a data format diagram showing the tracking data acquisition unit output packet format.
Figure 6:
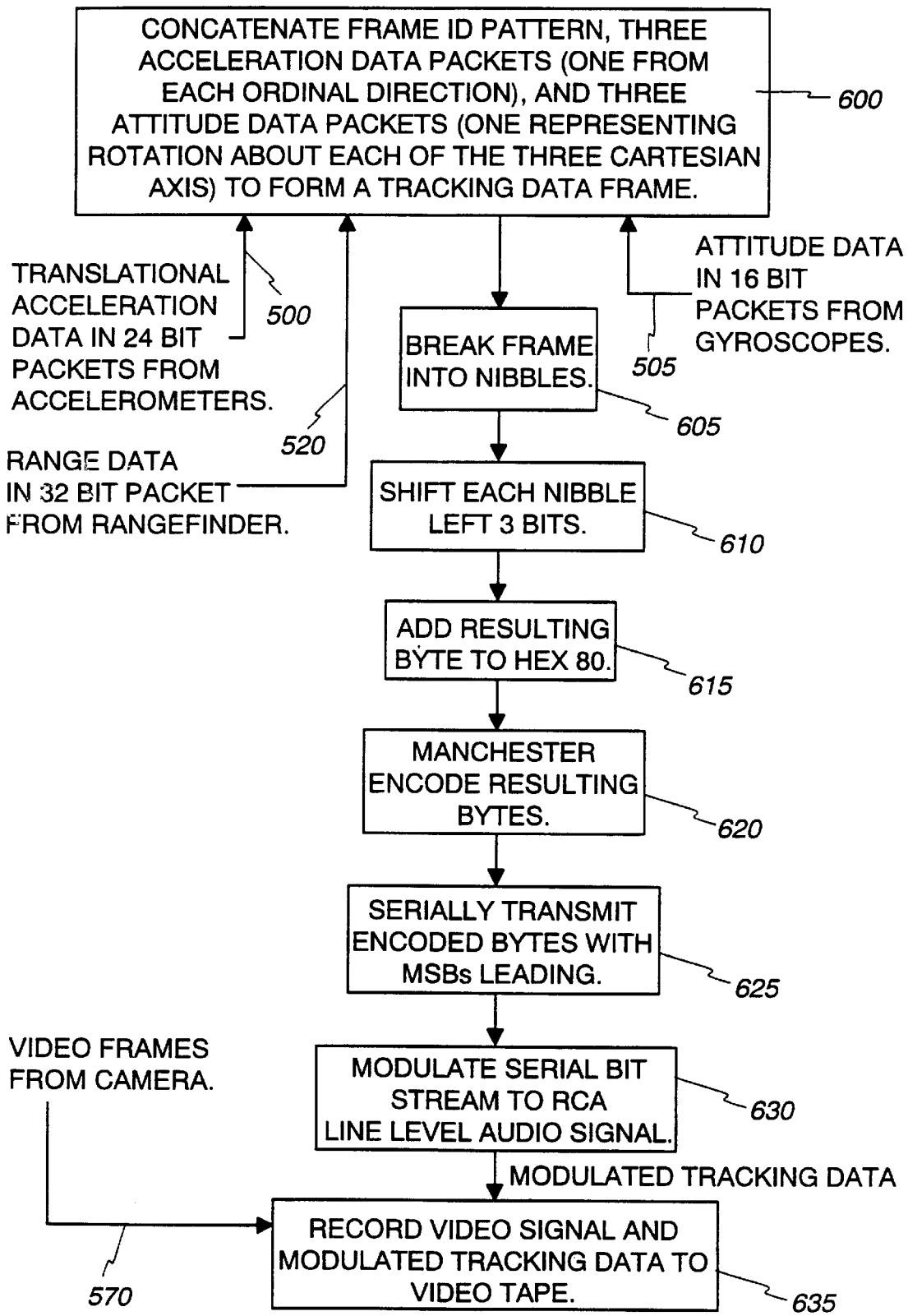
FIG. 6 is a data flow diagram depicting the data flow through the tracking data acquisition unit and modulator 105.

In addition to the accelerometers and the gyroscopes there is a control circuit 470 (FIGS. 2, 3, and 15) mounted to the bottom of the inertial platform 415 (see FIG. 2). This microcontroller based circuit (Z-WORLD SMARTBLOCK Model SB-DEV-32) polls the quadrature decoders 450, 455, 460 and the analog to digital converter 465 in sequence. Referring to FIGS. 4 and 6, the respective data packets 500, 505, and 520 from each sensor and a frame identification pattern (530 or 550) are compiled to form the tracking data frame 535 (or 540) as the first step 600 (FIG. 6) in the data flow through the spatially referenced video camera 100. In the next few steps, 605, 610, 615, and 620, the data frame resulting from the first step 600 is broken into 4-bit nibbles which are encased within message byte having a "1" start bit and three "0" stop bits, as in "1XXXX000" where "XXXX" is the 4 bits of data. The message bytes are then subjected to encoding (HARRIS Model HD6409). The control circuit transmits a continuous stream of the tracking data frames to a modulator circuit 475 (FIGS. 3 and 15) that modulates the data on to an audio line level signal. The inertial platform 415, the circuitry 420, the gyroscopes 400, 410 and the accelerometers 435, 440, 445 are all contained within a case 107 (FIG. 1). The single output 110 from the case 107 produces an audio signal 115 containing the encoded bit stream of acceleration and orientation data. The output of the tracking data acquisition control circuit 470 is thus recorded to video tape alongside the corresponding video data signal from the video camera 120.

The spatially referenced camera 100 can be configured and used with a laser rangefinder 485 (FIG. 2), such as an Acuity Research Inc. ACCURANGE Model 3000 in addition to the video camera 120. In this configuration, the instantaneous distance between the spatially referenced camera 100 and a pinpointed location on the surface of an object that is being recorded is also captured and stored as a binary numerical representation of distance along with tracking data from the other sensors. As shown in FIG. 4 at 540, range data derived from the rangefinder 485 is appended to the data frame and recorded to video tape alongside the corresponding video data signal from the video camera 120. (If the camera 120 is of an "autofocus" design, it may be possible to derive a range signal from the camera's autofocus mechanism.)

The rangefinder 485 (FIG. 2) is rigidly mounted to the inertial platform 415 and generates a continuous serial data output signal containing two alternating values. The rangefinder 485 output signal RXA1 is directly input to the tracking data acquisition unit control circuit 470 as a serial data signal. The first value contained in the signal output by the rangefinder 485 is a 24 bit numerical representation of the distance between the precise spot on the surface of the object being recorded and the spatially referenced camera 100. The second value is an 8 bit gray scale value that indicates the reflectivity of the object's surface at the measured location. In this configuration, the control circuit 470 is configured to be interrupted by a signal from the quadrature decoders 450, 455, & 460 whenever there is a change in the inertial platform's orientation detected by the gyroscopes 400 and 410. Upon detecting an interrupt signal, the control circuit reads the range and reflectivity values presented serially by the rangefinder 485. In this alternative configuration, a range data packet 520 (FIG. 4) is compiled along with the accelerometer data packets 500 and the gyroscope data packets 505 to form the tracking data frame with range data as indicated at 540 in FIG. 4.

Referring to FIG. 4, the tracking data frame format 535 output by the tracking data acquisition unit 105 is essentially comprised of two or three different kinds of packets: acceleration packets 500, gyroscopic packets 505 and optionally, range packets 510. An acceleration packet 500 is a 24 bit value that represents the magnitude of an acceleration vector in the X, Y or Z direction. A gyroscopic packet 505 is a 16 bit value that represents degree of pitch, roll or yaw. A range packet 520 is a 24 bit value plus an eight bit value. The 24 bit value 510 represents a range distance and the eight bit number 515 represents relative surface reflectivity in terms of a gray scale value.

The format of a complete data frame 535 (without range information) is composed of a frame identification pattern 530, which is formed from three repetitions of the 16 bit value 017F hex (at 525). This is followed by data: a 24-bit acceleration value in the X direction 500A, a 16-bit pitch value 505A, a 24-bit acceleration value in the y direction 500B, a 16-bit roll value 505B, a 24-bit acceleration value in the Z direction 500C, and a 16-bit yaw value 505C. The tracking data frame format with range information included 540 starts with a frame identification pattern 550 composed of three repetitions of the value 037F hex (at 545), followed by a 24-bit acceleration value in the X direction 500A, an 8-bit delta (or incremental change) pitch value 505A, a 24-bit acceleration value in the Y direction 500B, an 8-bit delta roll value 505B, a 24-bit acceleration value in the Z direction 500C, an 8-bit delta yaw value 505C, and finally the range data 555 and a gray scale reflectivity value 560. The records 540 containing range information are generated whenever an interrupt from the decoders 450, 455, and 460 indicates that the camera orientation has changed.

Once the video tape is filled with modulated tracking and video data, it is played back. The video output is directly connected to a conventional video digitizer input 180, such as the INTEL SMART VIDEO RECORDER, that is inserted into the ISA, EISA, VESA, PCI, or other accessory port or slot of the personal computer 185. As the video cassette is played back on the video cassette player 130, the video digitizer input 180 captures the video frames of the recorded images and passes digitized video frame data on to the tracking and video data entry and storage program 305 shown in FIG. 7. The audio output of the video cassette recorder 135 is fed into a demodulator circuit 155 which converts the modulated tracking data signal back into a serial bit-stream of tracking data. The demodulation output 165 is connected to a conventional serial data input port 175 of the personal computer 185. As the video cassette is played back on the video cassette recorder 130, the demodulation circuit 155 converts the modulated tracking data signal into an RS-232 serial data signal which is read into the personal computer 185 by the tracking and video data entry and storage program 305 through the serial port 175.

FIG. 7 shows the tracking and video data entry and storage program 305 data flow diagram. The modulated tracking data signal 145 from the audio output 135 of the video cassette recorder 130 or is ted into the demodulator 155, where the audio signal is demodulated into a serial bit stream (step 640). The output of this process flows into a manchester decoder (step 645). Every other nibble following an initial leading one of the decoded bit stream is then serially transmitted by the demodulator circuit 155 to the personal computer's serial port 175 (step 650). In the next step 655, the personal computer receives the bit stream and encodes each nibble as a ASCII hex digit 655. The ASCII digits are then assembled into lines of tracking data 660.

Simultaneously, the video signal 150 from the video output 140 of the video cassette recorder 130 is captured (step 680), and video frames are selected (step 685). Frame numbers are assigned to the selected video frames (step 690), and at step 665 these frame numbers are concatenated to the lines of tracking data to form tracking data lines. Finally, at step 675 a database of numbered tracking data lines is created and is stored on the disk in a database file called the tracking database 324.

At step 695, the video frame is fed into a video compression program, and the outputted compressed video frame is concatenated or otherwise linked to the same video frame number at 695. Finally, at step 700, a database of numbered and compressed video frames is created and is stored on the disk in a file that is called the video database 323.

The tracking and video data entry and storage program 305, residing on the personal computer 185, essentially builds two related databases. The first is a tracking database 324 composed of enumerated records containing the orientation, the translational acceleration, and optionally the range data originally generated by the tracking data acquisition unit 105. The second is a video database 323 composed of enumerated records containing digitized and compressed images of video frames captured from the video tape originally generated by the video camera 120.

Figure 9:
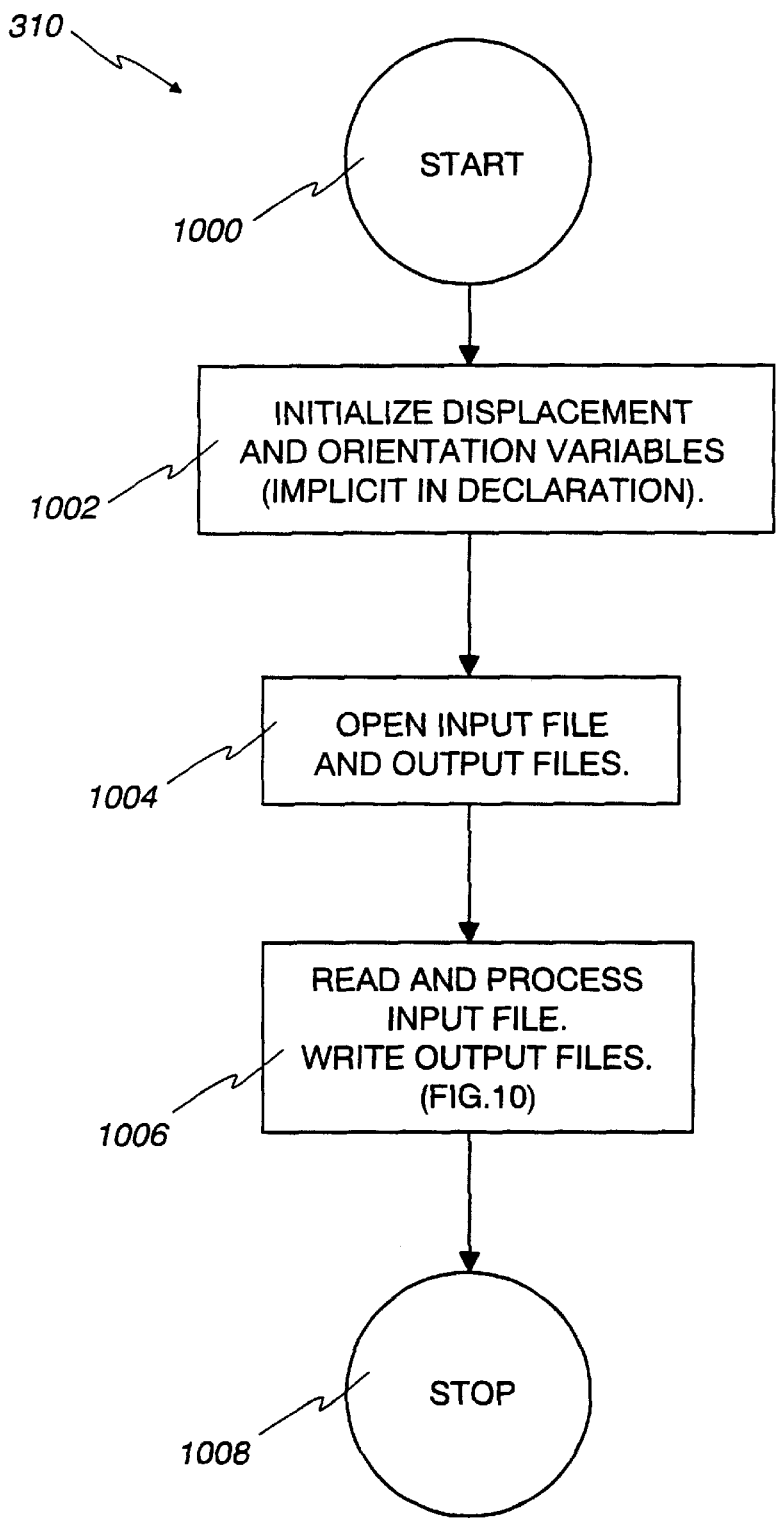
FIG. 9 is a block diagram of the tracking database to positional database conversion program 310.

Once all of the recorded tracking and video data are stored, the personal computer 185 converts the tracking database 324 into a positional database 322 via a software module called the tracking database to positional database conversion program 310 (FIGS. 5 and 9).

In the preferred embodiment, an existing image capture computer program is adapted for use to capture, compress, and store selected images in the video database 323, as indicated in steps 680, 685, 690, 695, and 700 of FIG. 7. This is a conventional program for video capture that can capture and store a video image every 1/10th or 1/20th of a second or so (whatever the human user of the system specifies). This program is also capable of linking to and calling as a subroutine a separate program which performs the steps 655, 660, 665, 670, and 675 in FIG. 7 every 1/10th or 1/20th of a second, passing to this separate program the index value into the video database 323 that can later be used to find and retrieve the most recently captured image. This index value is stored in the tracking database 324 along with the associated tracking data extracted from the signal 170.

To implement the step 655, the computer 185 is equipped with a conventional, serial port interrupt driven program that is called upon automatically, whenever the serial input port 176 receives a serial byte of the tracking data signal 170, to retrieve the byte from the serial port UART and to store the byte in some form of circular buffer in RAM from which the bytes may be readily retrieved.

Each time the step 660 is performed (every 1/10th or 1/20th of a second or so), all the bytes currently in this circular buffer are retrieved, combined with historical data, and separated from any partial data frame that is retained as historical data. In this manner, several data frames in the format illustrated at 535 or 540 in FIG. 4 are retrieved from the circular buffer, combined with the current image retrieval index supplied by the image capture computer program, and stored in the tracking database 324 (FIG. 5). Note that even though not all of the video image frames are normally retained, every piece of tracking data information must be retained so that the position and orientation of the inertial platform can be computed by a "dead reckoning" process. Accordingly, the same video image number is typically combined with several sets of tracking data information.

FIG. 5 illustrates the creation of the positional database. Numbered tracking data frames from the tracking database 324 are input to the program 310 which, using well known principles of Newtonian mechanics, converts the tracking data lines into positional data records. The positional data records are stored to the disk in a database file called the positional database 322. The format of the positional data records is dependent upon the method of conversion used in the conversion program 310. As shown in FIG. 8, there are two possible formats for the equivalent positional data. The quaternion position notation record format is composed of position number 720, video frame number 730, X displacement from the origin 735, Y displacement from the origin 740, Z displacement from the origin 745, and a unit vector defined by an X component 755, a Y component 760, a Z component 770 and a twist component 750. This data completely defines the position and orientation of the spatially referenced video camera 100 with respect to the point of origin. The other equivalent format is the direct angular notation representation. It is composed of the position number 720. video frame number 730, X displacement from the origin 735, Y displacement from the origin 740, Z displacement from the origin 745, and angular coordinates Rx 780, Ry 785 and Rz 790. These numeric values are separated by space characters 725, as shown.

The details of the tracking database to positional database conversion programs 310 are shown in FIG. 9.

The program 310 begins at 1002 by initializing the variables. Then at 1004, it opens the input tracking data file 324 (FIG. 5), the output position file 322 (FIG. 5), and an alterative output position file (not shown—this alternative file has the orientation represented in quaternion form, rather than as yaw, pitch, and roll values). At 1006, the data is retrieved, processed, and placed in the output file.

Figure 10:
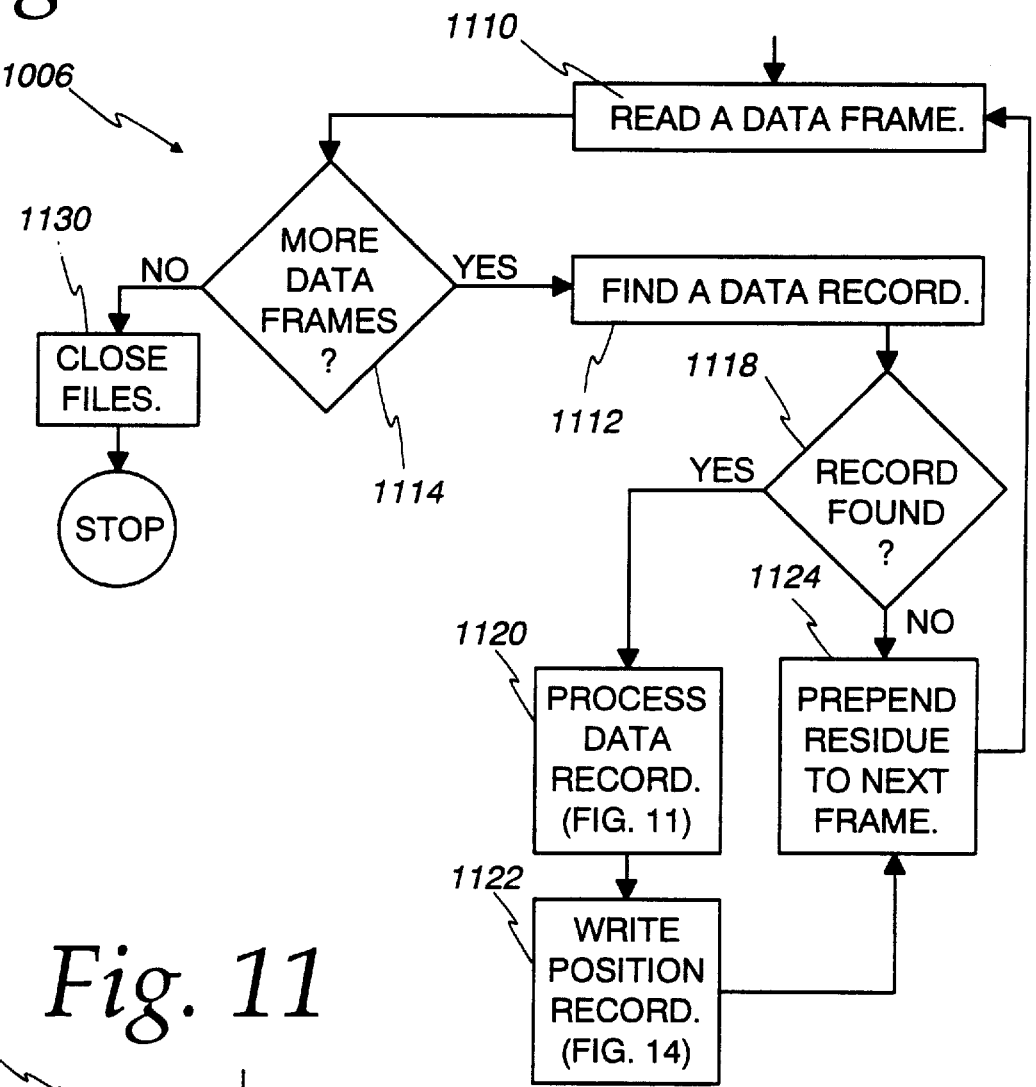
FIG. 10 is a more detailed block diagram of the step 10006 in FIG. 9.

The data processing steps 1006 are described in FIG. 10.

The program steps 1006 control the reading of the input file and enforce the formatting of the output file. In particular, these steps buffer the position records in such a manner that each record processed is complete even though the input records may have been broken up, as described above. In this manner, the program generates one and only one output position record for each frame.

The program begins at 1110 by reading in a data frame. At 1114, if there are no more frames, then at 1130 the files are closed and we are done. If a frame is found, a data record is retrieved from the frame at 1112. At 1118, if a record is found, it is processed at 1120 and written out to the positional database 322 at step 1122. Whether or not a record is found, program control continues at step 1124 where any unprocessed residual data is prepared (or added to) the next frame. Program control then returns to 1110 where the next frame is read.

Figure 11:
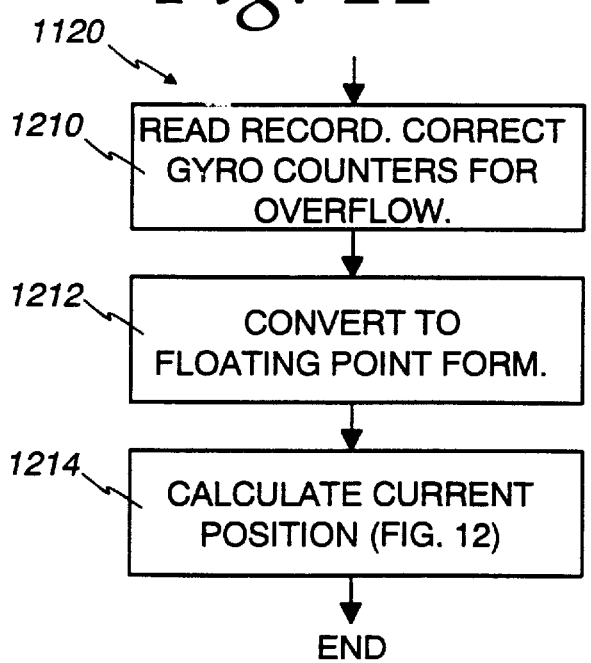
FIG. 11 is a more detailed block diagram of the step 1120 in FIG. 10.

The data record processing routine 1120 is described in FIG. 11. First at 1210, a record is read and is corrected for gyro counter overflow. Since the pitch, roll, and yaw numbers are 16-bit numbers that increase continuously if the camera rotates, they will occasionally overflow to zero. These numbers are thus converted into a 32 bit numeric format that never overflows.

Next, the acceleration values are converted into a floating point form at step 1212. Gain and offset errors can be corrected in this step. This routine also computes the magnitude of the acceleration as the square root of the sum of the squares of the three components.

Figure 12:
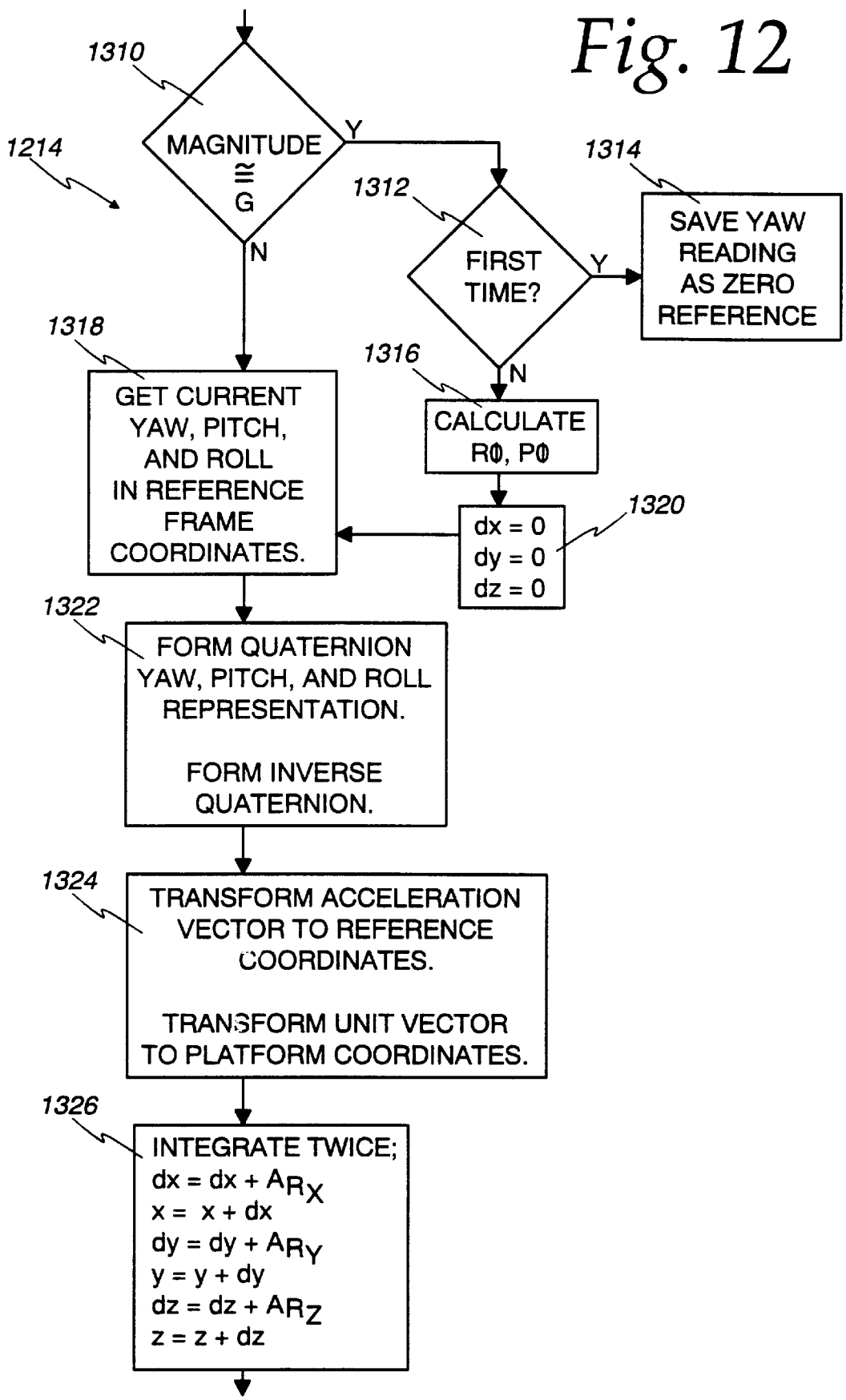
FIG. 12 is a more detailed block diagram of the calculate current position step 1214 in FIG. 11.

Step 1214 calculates the current position from the acceleration data. With reference to FIG. 12, first we test the magnitude to see if it is close to the gravitational constant (step 1310). If so, and if this is the first time that this condition has been met (step 1312), then the current yaw reading is saved as the zero directional reference for the data. In any case, at 1316, the gravity acceleration vector is used as a vertical reference for the purpose of determining how tilted the camera platform is. Valves of pitch and roll, P0 and RV, are computed which, when applied to the camera's present pitch and roll, give a level reference platform. The program that performs this calculation is set forth below.

In the following short program, the values of acceleration are "ac->p.f" for the y value of acceleration and "ac->p.1" for the X value of acceleration (the z value is not needed). This program computes P0 and R0, and it acquires the initial yaw value as W0.

```
// acquire reference for pitch and roll gyros. Used to
// correct for G later
void GetRollPitchZero (PositionAttitudeRecord * ac,
            long double magnitude)
{
    long double xmag, ymag, numAvg;
    xmag = ac->p.f/magnitude;
    ymag = ac->p.1/magnitude;
    numAvg = GO; // for backward average of all samples
    // numAvg = 1; // for no averaging
    rref = -asinl (ymag);
    pref = asinl (xmag);
    // average over all samples, equal weights for all
    p0 = ((p0 * (numAvg-1)) + (deg(pref)+ac->a.p))/numAvg;
    r0 = ((r0 * (numAvg-1)) + (deg(rref)+ac->a.r))/numAvg;
    if(GO == 1)//this one is the first
    {
        w0 = ac->a.w; // init to current yaw count
    }
}
```

Acquisition of r0 and p0 values allows the definition of a reference frame for integration in which the transformed X and Y acceleration components have no contribution from the gravitational force. X and Y in the reference frame are perpendicular to the direction of the gravity vector, while Z in the reference frame is parallel to the gravity vector.

GetRollPitchZero also averages P0 and R0 readings on all subsequent calls after the first call to achieve better and better estimates for these values.

At step 1320, since the only acceleration is that of gravity, we assume that the camera is motionless, and we arbitrarily set the velocity values in all three directions to zero. This assumption holds because the camera is hand-held and is never stable when the human carrier is in motion. If the camera were mounted upon some conveyance that can move very smoothly at a uniform velocity, then this assumption would not hold, and some additional data indicating the velocity of the camera would have to be recorded. In an airplane or automobile, for example, the speedometer reading or ground speed reading could be recorded to assume that this algorithm functions properly.

Next, at step 1318, the current pitch, yaw, and roll are transformed into coordinates that indicate these parameters relative to the newly-defined reference frame. This step 1318 is always performed regardless of whether the magnitude of the acceleration matches that of gravity.

To facilitate, the following computations, the yaw, pitch, and roll values, which are presently referenced to a horizontal plane, must be converted into what is called the quaternion form. This is a four dimensional vector with three imaginary components and one real component. This is done to facilitate the transformation of the acceleration values, which are presently referenced to the tilted camera plane, into valves referenced to the horizontal reference plane (just defined, preparatory to integrating the acceleration values to produce velocity and displacement values.

This calculation is performed by the following program. In this program, the input variable is a record "AttitudeRecord" which contains yaw "w", pitch "p", and roll "r". The returned quaternion values are "s", "i", "j", and "k", where "s" is the real value and the others are the imaginary values.

```
// convert yaw,pitch,roll to quaternion form
void AttitudeQuaternion (AttitudeRecord * p,
        QuaternionRecord * qcos)
{
    long double cw,cp,cr,sw,sp,sr; /* sine and cosine */
    long double rp, rw, rr;
    long double trace, c[3][3];
    rw=rad(p->w);
    rp=rad(p->p);
    rr=rad(p->r);
    cw=cosl (rw);
    cp = cosl (rp);
    cr = cosl (rr);
    sw = sinl (rw);
    sp = sinl (rp);
    sr = sinl (rr);
// use cosine matrix form for calculation
    c[0][0]=cw*cp; c[0][1]=sw*cp; c[0][2]=-sp;
    c[1][0]=(-cr*sw) + (sr*sp*cw); c[1][1]=(cr*cw)*(sr*sp*sw);
        c[1][2]=sr*cp;
    c[2][0]=(sr*sw) + (cr*sp*cw); c[2][1]=(sr*cw) +(cr*sp*sw);
        c[2][2]=cr*cp;
    trace=c[0][0] + c[1][1] + c[2][2];
    qcos->s=sqrtl(1 + trace)/2.;
```

```
    qcos->i=(c[1][2] - c[2][1])/(4.*qcos->s);
    qcos->j=(c[2][0] - c[0][2])/(4.*qcos->s);
    qcos->k=(c[0][1] - c[1][0])/(4.*qcos->s);
```

At step 1324, the acceleration vector is transformed from the camera body coordinate frame into the stable reference frame.

```
// rotate accel vector to platform coordinates
// using inverse quaternion
posqInverse.q.s=posqFwd.q.s;
posqInverse.q.i=-posqFwd.q.i;
posqInverse.q.j=-posqFwd.q.j;
posqInverse.q.k=-posqFwd.q.k;
QuaternionRotate (&pos->p,&posqInverse.q,&prec);
```

In the above, the acceleration vector is represented by a three component vector "&pos->p". The four element quaternion value (computed above) is "posqFwd.q.s", "-.i", "-.j", and "-.k". In the above routine, this quaternion value is first inverted, giving "posqInverse.q.s,", etc. Next, this inverted quaternion and the acceleration vector are passed to the "QuaternionRotate" routine which returns the transformed acceleration values in a vector "&prec".

At step 1326, the integration of the transformed acceleration values is carried out as follows:

dx+=(prec.1)/G;
    dz+=(prec.u)/G;
    dy+=(prec.f)/G;
    x+=dx;
    y+=dy;
    z+=dz.

In the above routine, "dx", "dy", and "dz" are the velocity values in the x, y, and z directions. "x", "y", and "z" are the distance values. The incoming acceleration values are "prec.1" for the "x" axis acceleration, "prec.f" for the "y" axis acceleration, and "prec.u" for the "z" axis acceleration. Note that the acceleration values are normalized with respect to the value of gravity.

The quaternion coordinate transformation process is carried out by using two cross multiplications, and is illustrated below:

```
//returns rotated vector in rp
void QuaternionRotate (positionRecord *v,
        QuaternionRecord *q,
        PositionRecord *rp)
{
    QuaternionRecord vq,qi,rq;
    // quaternion multiplication qi v q
    // from the book.
    // qi is -i -j -k ...
    vq.s=0; vq.i=v->f; vq.j=v->l; vq.k=v->u;
    qi.s=q->s;
    qi.i=-q->i;
    qi.j=-q->j;
    qi.k=-q->k;
    QuaternionMultiply (&qi, &vq, &rq);
    QuaternionMultiply (&rq, q, &vq); //reissue vq
    rp->f=vq.i;
    rp->l=vq.j;
    rp->u=vq.k.
}
```

The incoming arguments to this function are a three-dimensional vector "v" that is to be rotated and a four-dimensional quaternion vector "q" that defines the rotation. The three-dimensional vector "v" is first transformed into a four-dimensional vector "vq" with the fourth component "vq.s" set to zero.

First, an inverse "qi" is formed of the quaternion "q". Next, the incoming vector "vq" is quaternion multiplied by the inverse quaternion vector "qi;". The result of this multiplication "rq" is then quaternion multiplied by the quaternion vector "qi". Three components of the resulting vector, which is returned as "vq", are transferred back into the vector "rp" which is returned as the transformed result.

The quaternion multiplication is defined by the following program: void QuaternionMultiply (QuaternionRecord *q,

```
        QuaternionRecord *s,
        QuaternionRecord *r)
{
    r->s=(q->s*s->s)-(q->i*s->i)-(q->j*s->j)-(q->k*s->k);
    r->i=(q->s*s->i)+(q->i*s->s)+(q->j*s->k)-(q->k*s->j);
    r->j=(q->s*s->j)-(q->i*s->k)+(q->j*s->s)+(q->k*s->i);
    r->k=(q->s*s->k)+(q->i*s->j)-(q->j*s->i)+(q->k*s->s).
}
```

Figure 14:
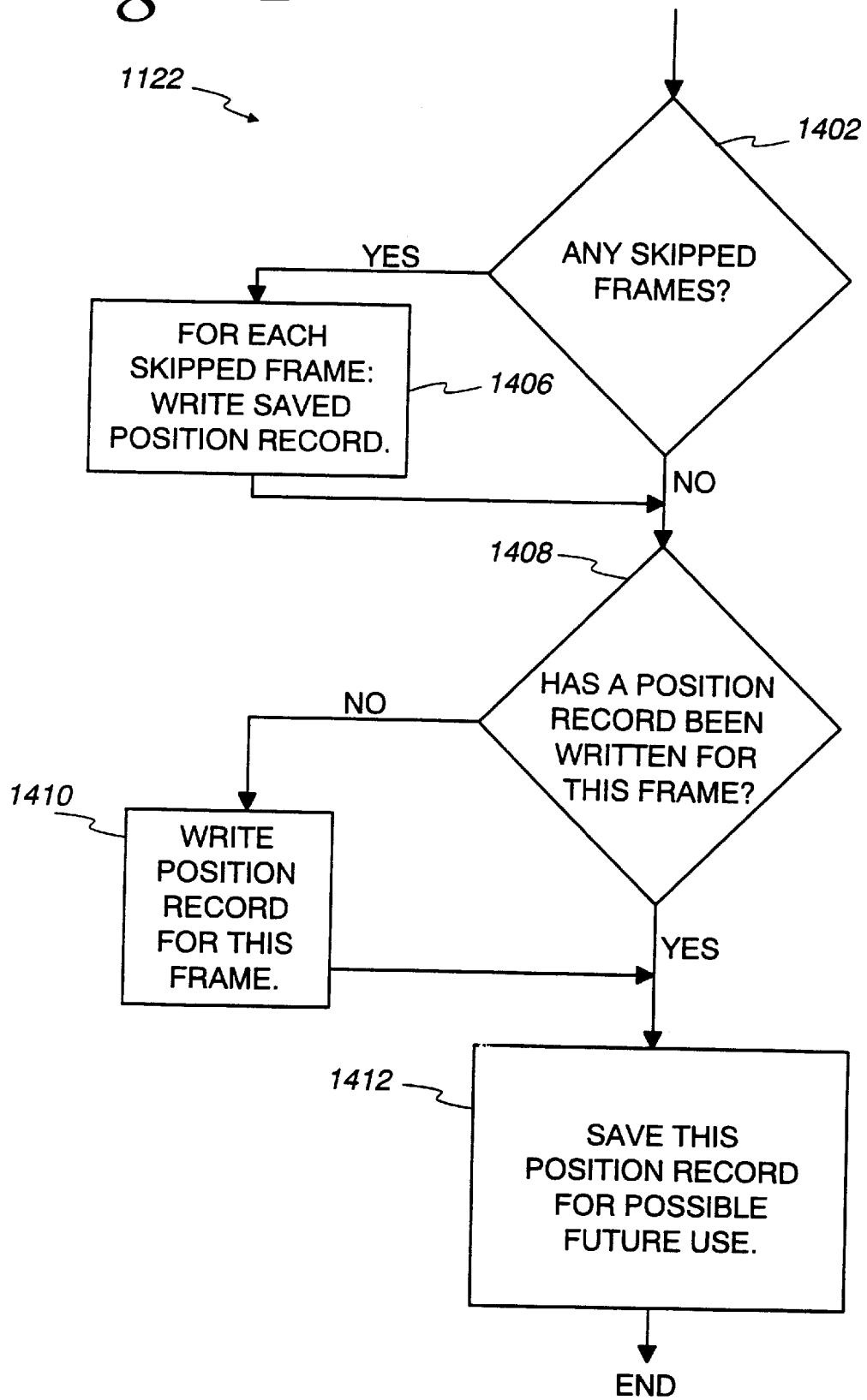
FIG. 14 is a more detailed block diagram of the write position record step 1122 in FIG. 10.

The details of the step 1122 in FIG. 10 relating to the writing out of a record 775 (FIG. 8) are set forth in FIG. 14. At step 1402, if any frame numbers were skipped, at step 1122 a position record is generated and saved for each such skipped frame. Since there are more acceleration records than there are video frames. step 1408 tests to see if the current frame number has already been written out as a position record. If not, then a new position record 775 is written out at step 1410 along with the frame number. In any case, at step 1412, the position record is saved for possible future use if any frames were skipped (at step 1402 during a future iteration).

In addition to writing out the records 775 (FIG. 8) into the positional database 322 having the file name extension "*.TLA", the preferred embodiment of the invention simultaneously writes out records of the type 715 (FIG. 8) into a separate positional database (not shown) having the file name extension "*.TEL". In this manner, two positional databases are created, one specifying camera attitude using the direct angular notation format, and the other specifying camera attitude using the quaternion notation format.

An alternative method of position estimation using the inertial platform is now described. The accelerometer inputs described above as the vector "pos" in the program "acc2pos.c" is replaced by a vector of constant velocity as shown in this program fragment:

```
if (magnitude < G + DELTA_MAG//+DELTA
    && magnitude > G - DELTA_MAG//-DELTA
    )
{
// for velocity estimation method
// dx = dy = dz = 0;
pos->p.f=0;
{
else
{
pos->p.f=500; // assume motion is in direction
        // camera is pointing
{
pos->p.l=0; pos->p.u=0;
```

This sets the velocity vector to one of two values, depending upon the magnitude of instantaneous acceleration being experienced. The vector component "pos->p.f" is the component pointing in the direction of the camera.

If the magnitude is below the threshold G+ or −DELTA⎯ MAG (the force of gravity plus or minus a small deviation, determined by empirical measurement), the camera is assumed to be at rest. If the magnitude is outside this range the velocity is set to be the average velocity of a person walking. The camera is pointed in the direction the operator is walking whenever the operator moves, and this velocity vector is transformed using the same quaternion as the acceleration measurement above.

The velocity vector is rotated in the following code fragment:

QuaternionRotate(&pos->p,&posqInverse.q,&prec);

The position is then calculated by summing each resultant component:

x−=prec.l;
y+=prec.f;
z+=prec.u;

The full text of the alternative "acc2pos.c" file is given in Appendix F. This file is to be substituted for the "arc2pos.c" file listed in Appendix B.

Figure 13:
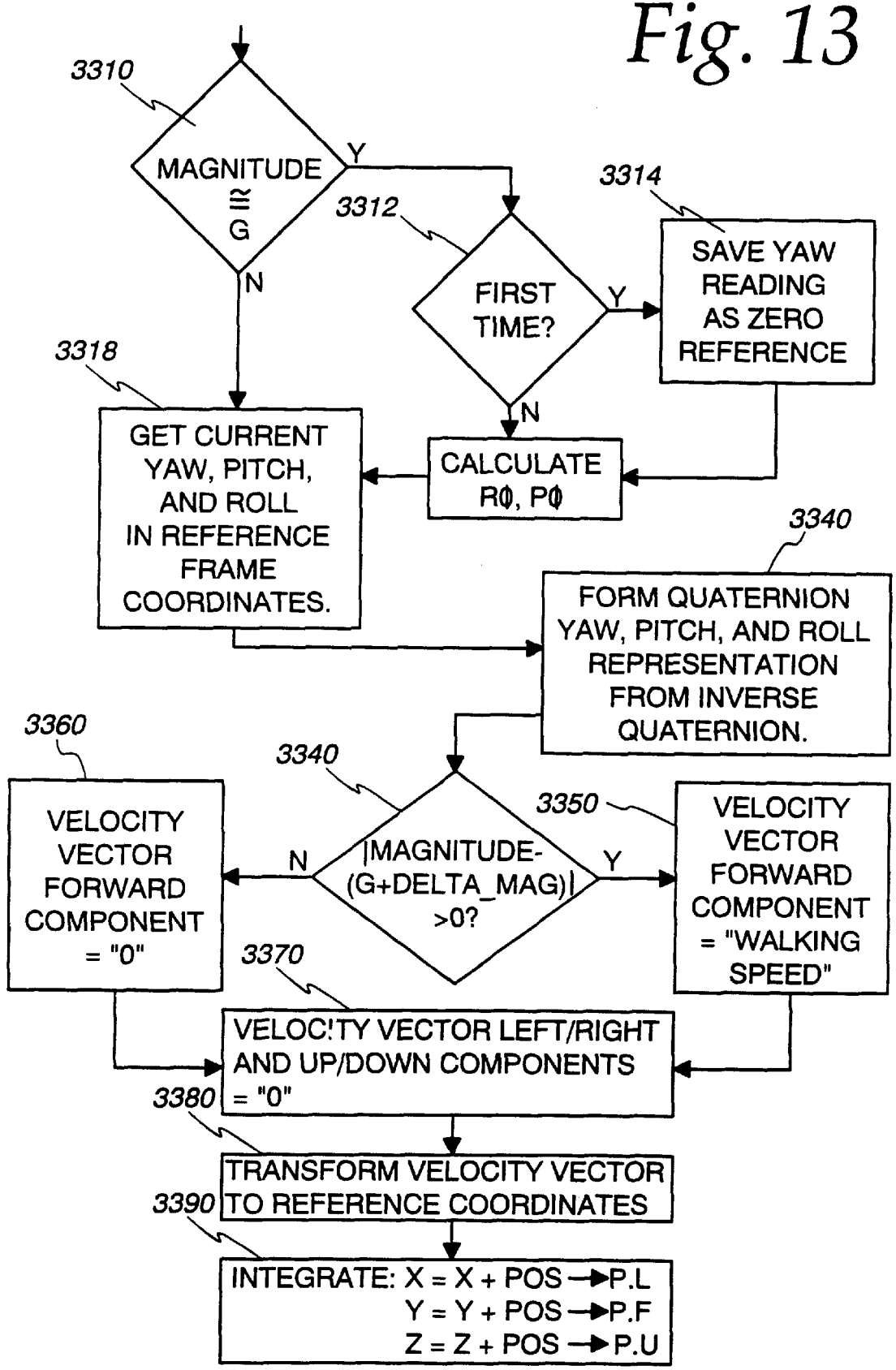
FIG. 13 is a block diagram of an alternative method for converting tracking data to position data.

FIG. 13 shows the flow diagram for the alternate position calculation method. FIG. 13 is to be substituted for FIG. 12 in the program flow described above. In particular, the box in FIG. 12 labeled 1324 is replaced by a box 3380, and the box labeled 1326 is replaced by a box 3390.

In FIG. 13 box 3340 the absolute value of acceleration magnitude is compared to that of gravity plus a constant value. If the absolute value of the difference of these quantities is greater than zero, movement is indicated. The forward velocity component pos->p.f is then set to a velocity value of "walking speed" in box 3350. Otherwise forward component is set to 0 in box 3360. In either case the left-right and up-town components are set to 0 in box 3370.

The velocity estimate is then transformed from platform coordinates to reference coordinates in box 3380. The resulting transformed velocity is summed component-wise to produce the position estimate in box 3390.

These boxes in FIG. 13 are identical to their counterparts in FIG. 12:

FIG. 13 box 3310 is identical to FIG. 12 box 1310.
FIG. 13 box 3312 is identical to FIG. 12 box 1312.
FIG. 13 box 3314 is identical to FIG. 12 box 1314.
FIG. 13 box 3322 is identical to FIG. 12 box 1322.

Figure 15A:
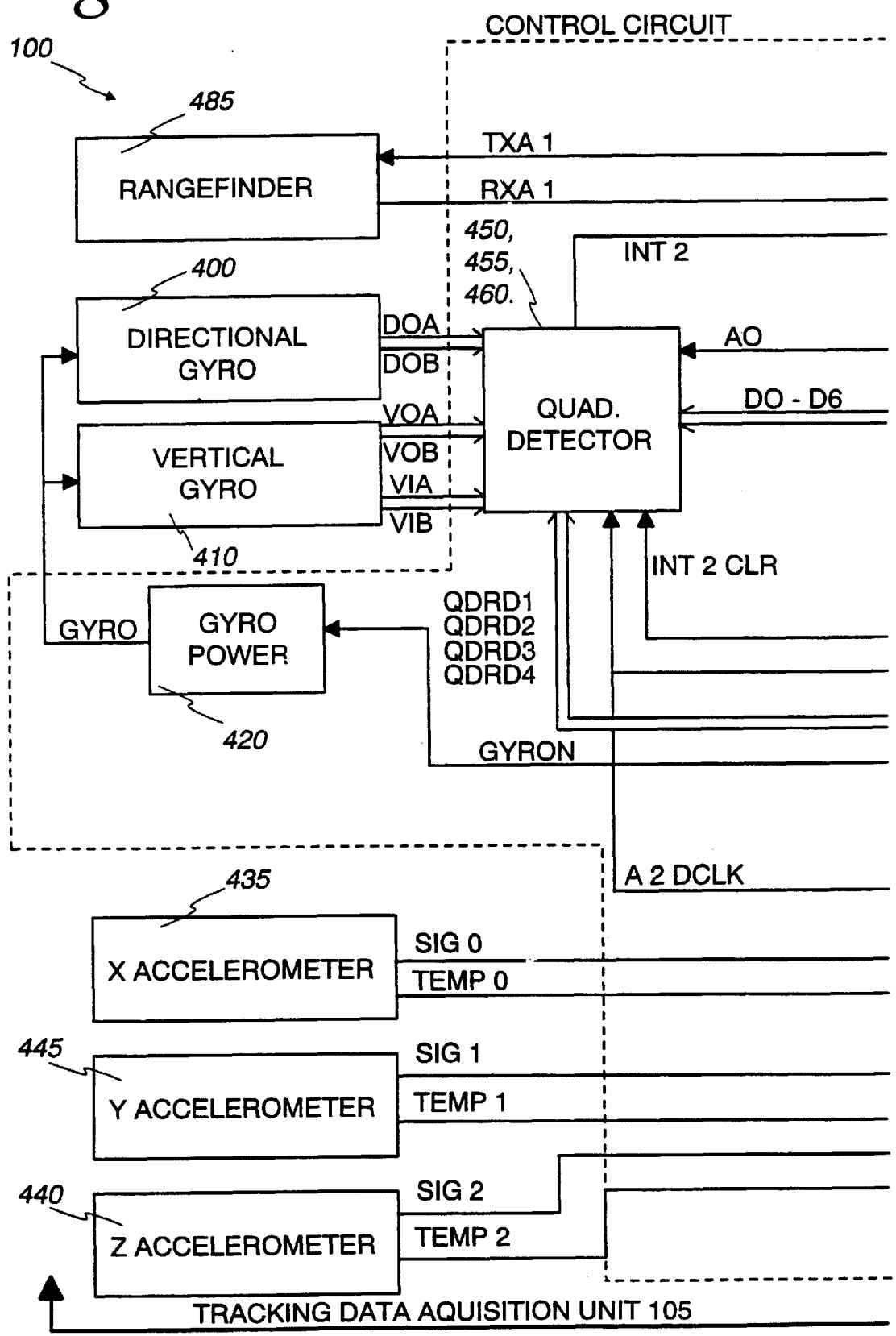
FIG. 15 is a block diagram of the tracking data acquisition unit control circuit 470 illustrating in particular its electrical interconnections to the remaining elements of the spatially referenced video camera 100.
Figure 15B:
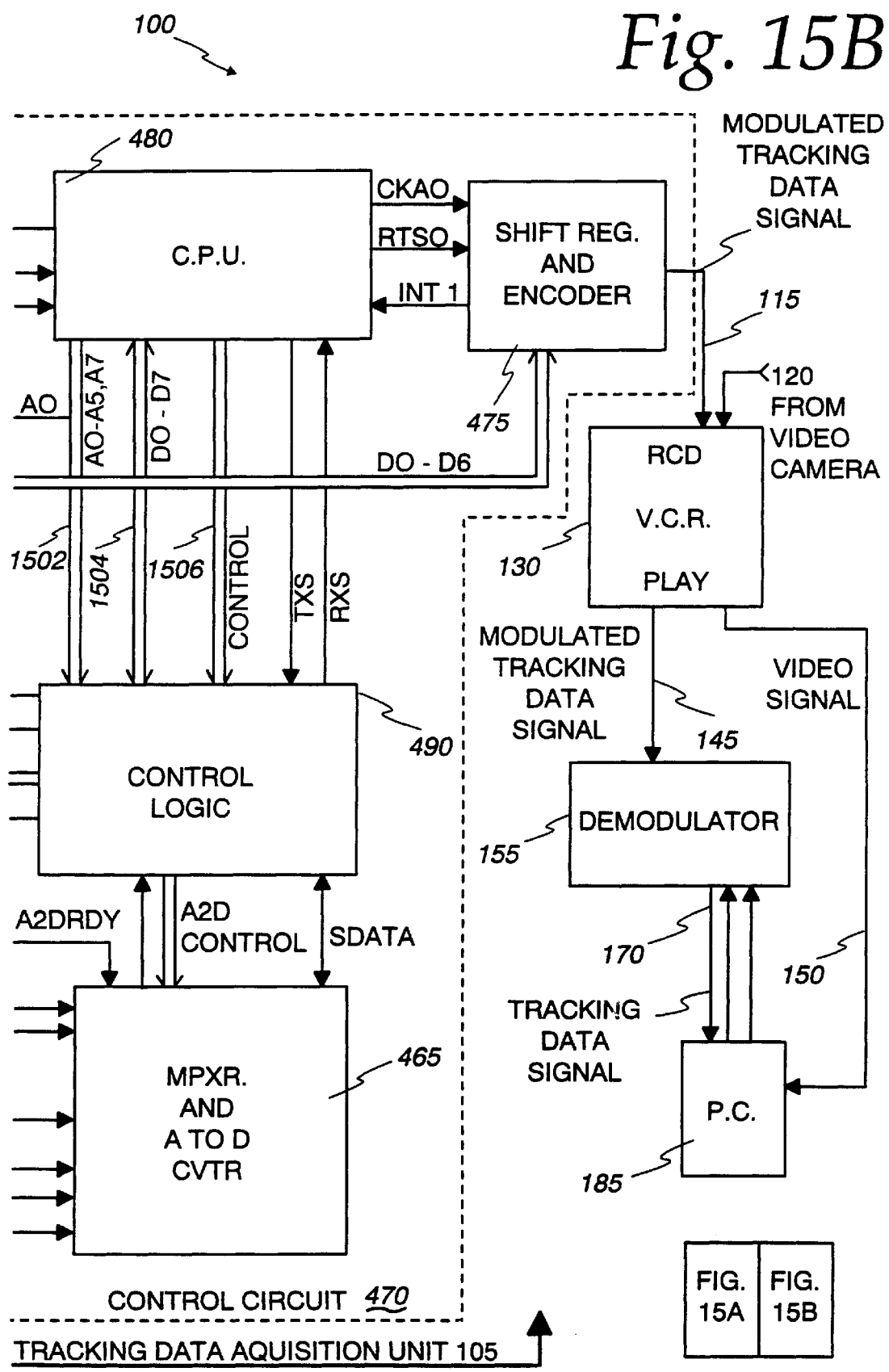

Referring now to FIG. 15, the hardwire circuitry portions of the invention are shown in block diagram form. FIG. 15 sets forth all of the significant signal interconnections between the circuitry blocks.

As shown in FIG. 15, the heart of the tracking data acquisition unit 105 is a control circuit 470 which contains a central processing unit 480. This central processing unit, in the preferred embodiment, is a Z-WORLD SMART BLOCK, Model SB-DEV-32, programmable computer.

In FIG. 15, the central processing unit 480 provides addressing signals 1502, data signals 1504, and control signals 1506 to a control logic 490. The control logic 490 contains two programmable logic units PALS which respond to the signal from the CPU by generating all of the various control signals that are needed to run the tracking data acquisition unit 105.

The rangefinder 485 is shown connected to the CPU 480 by means of two serial communication lines, an outgoing serial communication line TXA1 carrying commands from the CPU 480 to the rangefinder 485, and a return serial communication line RXA1 carrying serial information from the rangefinder 485 back to the CPU 480. The rangefinder 485 returns gathered information periodically, at its own rate of speed. The CPU 480 formulates a range packet 520 (FIG. 4) containing a 24 byte range value 510 and an 8 byte gray scale value 515, and adds it to the telemetry stream of data.

The two gyroscopes, the directional gyroscope 400 and the vertical gyroscope 410, are designed so that when they are deprived of power, they return to rest positions with the vertical gyroscope 410 having its axis vertically disposed and with the directional gyroscope 400 having axis horizontally disposed.

When the camera 100 is placed into operation, the central processing unit 480 causes the control logic 490 to generate a GYRON signal and to feed it to a gyroscope regulated power supply 420. In response, the gyroscope power supply 420 generates a plus 10 volt, regulated +GYRO signal which feeds power to both of the gyroscopes 400 and 410. In response, the gyroscope motors begin to spin so their axis are stabilized and so that the gimbals associated with the gyroscopes begin to generate pairs of quadrature modulated signals indicating the rotational motions of the tracking data acquisition unit 105.

The directional gyroscope 400 generates two square wave signals in quadrature as the platform 415 is rotated about a vertical axis to the left or to the right. These quadrature signals, which may be called collectively the yaw signal, appear on the two wires D0A and D0B. These signals arise from sensors associated with the gimbals within the gyroscope 400 in response to rotation of the gimbals.

The vertical gyroscope 410 is similarly equipped with two sets of sensors associated with its gimbals to generate pitch and roll quadrature modulated signals. The pitch signal, which appears on the two wires V1A and V1B, indicates the rate at which the camera 100 is pointing more upwards towards the ceiling or more downwards towards the floor. The roll, signal which appears on two wires V0A and V0B, indicates the rate at which the camera is tilting to one side or to the other, away from or towards the vertical.

These quadrature modulated pairs of signals require brief explanation. Assume for the moment that the camera is being rotated horizontally from left to right. This will cause a yaw signal to appear on the two wires D0A and D0B. Each wire bears a square wave signal, and the square waves are at quadrature with each other. This means that a negative going transition of the first of the square wave signals is followed by a negative going transition of the second of the square wave signals. Likewise, a positive going transition of the first signal is always followed by a positive going transition of the second signal. The speed of these transitions indicates the speed with which the camera is being rotated from left to right. If the camera motion stops, then the signals remain stationary until camera motion proceeds once again.

If the direction of rotation is reversed, then again square wave signals are generated—but this time in the opposite phase of quadrature. Thus, if a left-to-right motion causes a first signal to make its transitions ahead of the second signal, then a right-to-left motion will cause the second signal to make its transitions ahead of the first signal. This is identical to the way in which the motion signals work in a mouse pointing device of the type commonly used with digital computers.

The pitch and roll signals, represented respectively by the V1A–V1B and by the V0A–V0B signal lines, operate in a manner identical to the yaw signal just described, with the information being conveyed by quadrature modulated square waves. The three pairs of quadrature modulated signals V1A, V1B, V0A, V0B, and D0A, D1B are fed into respective quadrature decoders 450, 455 and 460. The quadrature decoders 450, 455 and 460 are conventional models, in this case Hewlett Packard Model No. HCTL 2020. The three accelerometers 435, 440, and 445 are shown each generating an analog accelerometer output signal SIG0, SIG1, and SIG2 and also a temperature signal TEMP0, TEMP1, and TEMP2. These signals flow into the multiplexer and A-to-D converter 465.

In the manner described above, the central processing unit 480 is enabled to obtain data indicating the distance of the subject from the rangefinder 485; it is enabled to obtain pitch, roll, and yaw data values from the vertical and directional gyroscopes 400 and 410; and it is enabled to obtain data defining the instantaneous acceleration of the tracking data acquisition unit 105 from the accelerometers 435, 440 and 445 in all three coordinate directions. The CPU 480 continuously packages this information, as explained in steps 600 to 615 in FIG. 6, into the frame data format that is illustrated at 535 or 550 in FIG. 4. This frame data format information is presented in parallel, one byte at a time, over the data bus D0–D6 to shift register and encoder 475.

The shift register and encoder 475 converts the signal into a modulated serial tracking data signal which is presented over the audio data line 115 to the audio record input 125 of the VCR 130.

To summarize the operation of the tracking data acquisition unit 105 as shown in FIG. 15, the central processing until retrieves from the rangefinder 485 in serial form an 8 bit gray scale value 515 and a 24 bit range value 510, as shown in 520 in FIG. 4. It retrieves from the quadrature decoders 450, 455, and 460 associated with the directional and vertical gyroscopes 400 and 410 16 bit data values representing the current pitch, roll, and yaw as stored within counters within the quadrature decoders 450, 455 and 460. It retrieves from the X, Y, and Z accelerometers 435, 445, and 440, 24-bit values representing the current instantaneous acceleration to which the tracking and data acquisition unit 105 is being subjected.

It then combines all of this information into a packet, with each byte in the packet containing a "1" start bit, a nibble of data, and three trailing "0" stop bits, with a 3 byte header 530 and 550 such as those shown at 535 or 540 in FIG. 4. Each packet thus begins with the frame ID pattern elements shown at 525 or 545 as three bytes of information. This is followed by the X acceleration data 500A, the pitch data 505A, the Y acceleration data 500B, the roll data 505B. the Z acceleration data 500C, the yaw data 505C, the range data 555, and the gray scale data 560, as shown in FIG. 4. This information is sent through to the shift register and encoder 475 and appears as a modulated tracking data signal on the audio line 115 which is then recorded by the VCR 130 along with the images flowing from the video camera 120.

Upon playback, the video signal 150 flows directly into the personal computer 185. The modulated tracking data signal 145 flows to a demodulator 155. Following demodulation, the unmodulated tracking data signal flows over a signal line 170 to the PC 185.

Figure 16:
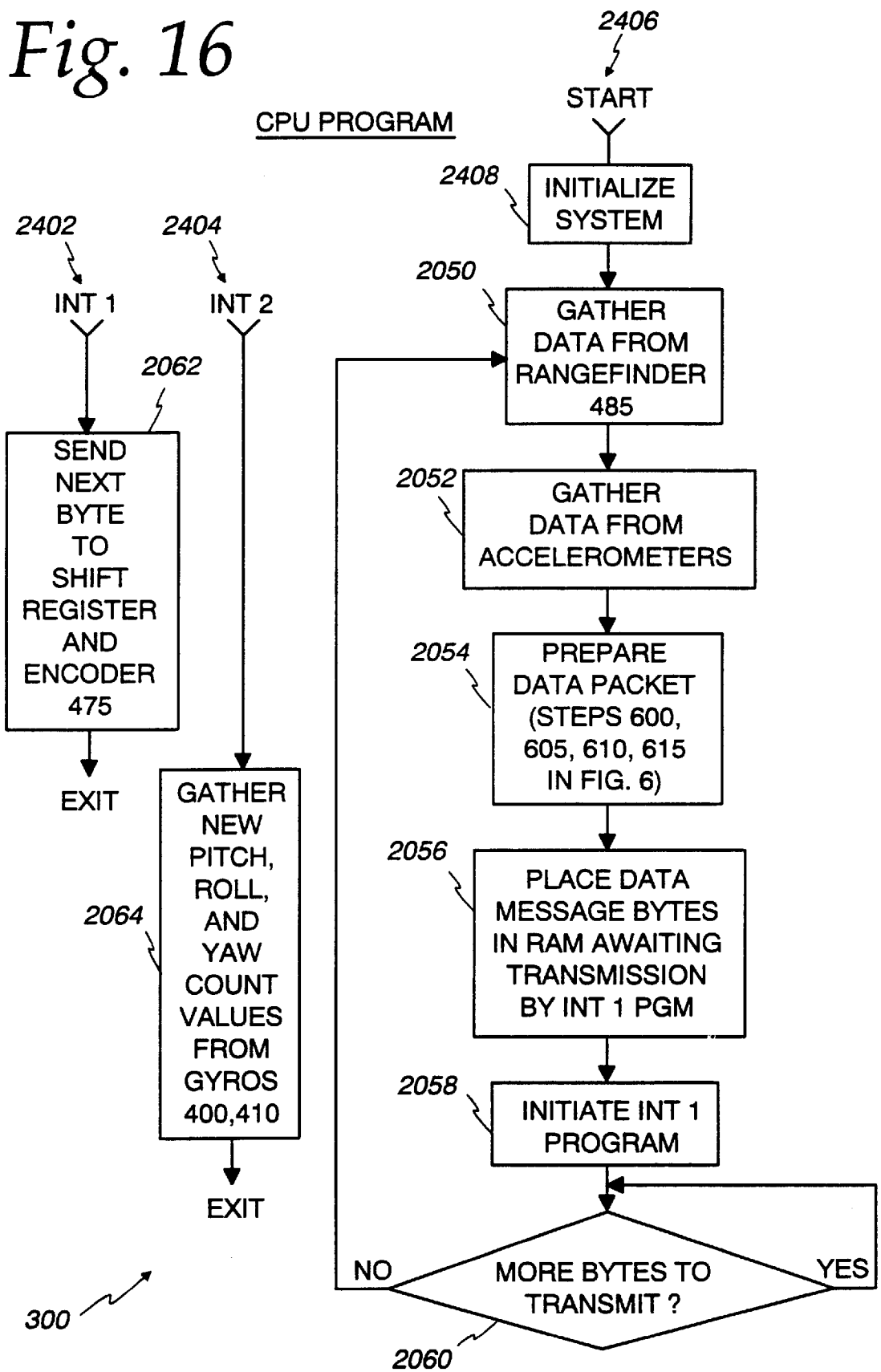
FIG. 16 is a block diagram of the programs which control the central processing unit 480 in FIG. 15.

FIG. 16 presents a block diagram view of the three programs that control the operation of the central processing unit 480 shown in FIG. 15. Two of these programs 2402 and 2404 are interrupt driven, and the third program 2406 either runs continuously, or it is called into operation periodically by a timer triggered interrupt or other similar mechanism.

The program 2406 begins at 2408 by initializing the system. Initialization includes such steps as turning on the power supply 420 for the gyroscopes, programming and initializing the three quadrature decoders 450, 455, and 460, and setting up the analog to digital converter (within the block 465 in FIG. 15).

Next, at 2050, data is gathered from the rangefinder 485. At 2052. the analog to digital converter is commanded to gather from the accelerometers 435, 445, and 440 the current acceleration of the tracking data acquisition unit 105.

At step 2054, the above data, together with previously stored values of yaw, roll, and pitch are combined into a data packet, with 4 bits of data per byte, as has been explained above (steps 600, 605. 610, and 615 in FIG. 6; and see the data formats presented in FIG. 4).

At step 2056, the resulting data packet is placed into RAM memory as a series of bytes to await transmission to the shift register and encoder 475.

At step 2058, the interrupt driven program 2402 is placed into service to transmit the bytes of data to the shift register and encoder 475.

At step 2060, the program 2406 tests to see if all of the data bytes have been transmitted. Alternatively, the program simply suspends itself until a fixed time interval has expired. In either case, after transmission is completed or after the expiration of the time interval, program control recommences with step 2050.

The program 2406 thus continuously operates to assemble data packets and to transmit them to the shift register and encoder 475 where the data is modulated onto an audio signal suitable for recordation on the audio soundtrack of a VCR.

The program 2402 is an interrupt driven program placed into operation by the interrupt signal INT1 every time the shift register and encoder 475 successfully transmits a byte of information. At 2062, this program simply sends a data byte from RAM to the shift register and encoder 475 until there are no more data bytes that remain to be transmitted. This interrupt driven routine frees up the program 2406 from the time consuming task of continuously monitoring for when to transmit the next byte of data.

The program 2404 is also an interrupt driven program. It is placed into operation every time one of the three quadrature decoders receives a signal fluctuation from one of the gyroscopes.

In response to INT2, this program gathers pitch, roll, and yaw values from the two gyroscopes and stores them in RAM for later transmission at step 2064.

Three display programs are available for viewing the information stored in the positional database.

The spatial database program 335 (FIG. 5) is controlled by a three-dimensional navigation tool, such as the SUN COM FLIGHT MAX JOY STICK, or any three-dimensional, commercially available game control device. Each frame is displayed, and the user is asked whether he wants to select it. A database of frames selected for display is created. For each frame, a two-dimensional rectangle of fixed size is drawn using the WORLD TOOLKIT in a perspective view of three-dimensional space. The rectangle is displayed in the simulation space in the orientation specified by the attitude of the camera positional frame record that corresponds to the video frame. The rectangle is then textured with the video frame so the frames appear to float in space before the user.

The movie mapper program 325 is described in detail below.

The positional frame retrieval program 330 allows the user to identify a region in space on the camera path using the WORLD TOOLKIT. The program defines a rectangular solid in space about each imaged object. The location of each item imaged is computed from the data in each record. All the image records where the location of the item image falls outside of the rectangular solid for an item are discarded, and all remaining records are displayed as a movie view of the item from different perspectives. In essence, all available frames showing the item or the volume indicated are displayed sequentially, giving all the views available of the desired item or volume.

The data tracking and acquisition unit and modulator 105 has illustratively been shown connected to a rangefinder, receiving therefrom a serial data signal which is conveyed to the central computer for possible use in a data retrieval system. The positional frame retrieval program 330 uses this range data to determine the position of imaged objects and to retrieve all images containing a designated object, as contrasted with the movie mapper program technique of retrieving images based upon camera position and orientation (described below).

Figure 18:
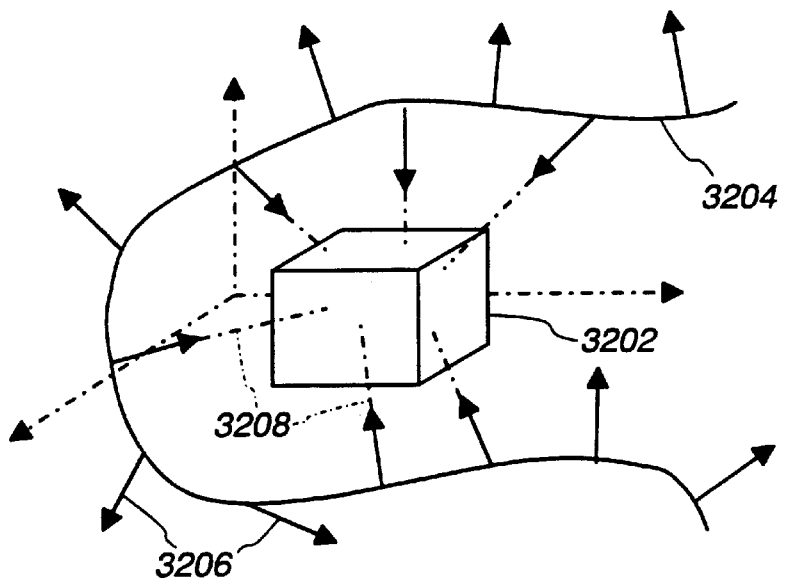
FIG. 18 illustrates the operation of the positional frame retrieval program 330 in which range information is added so that all of the images viewing a selected object 3202 may be located and retrieved, as a group.

For example, in FIG. 18, an object 3202 is shown within a camera path 3204 along which the camera orientation at the moment of image capture is indicated by vectors 3206. In FIG. 18, the vectors shown connected by dotted lines 3208 to the object 3202 represent the capture of an image of the object 3202. Range information is also captured indicating how far the object 3202 is from the camera at each of these points.

The range data is preserved in the positional database 322 for this embodiment of the invention. Accordingly, the retrieval program 330, in response to a mouse click at the position of the object, may locate all records 775 which, from position, camera angle, and distance to subject, relate to images of that object. These may be grouped into an object database and displayed as a video movie, as described above.

In addition to a rangefinder, other devices may be attached to the serial data input of the tracking data acquisition unit and modulator 105, and data may be captured from these other devices. For example. data may be captured from a gas chromatograph or from a chemical sniffer. Sound may be recorded from a microphone. Average light intensity may be recorded from a photo cell. Infrared records of motion in the vicinity may be recorded. Data may be gathered from stationary machinery or data collection devices, such as flow meters or temperature sensors. Any type of data that has a spatial reference may be gathered in this manner.

Figure 17:
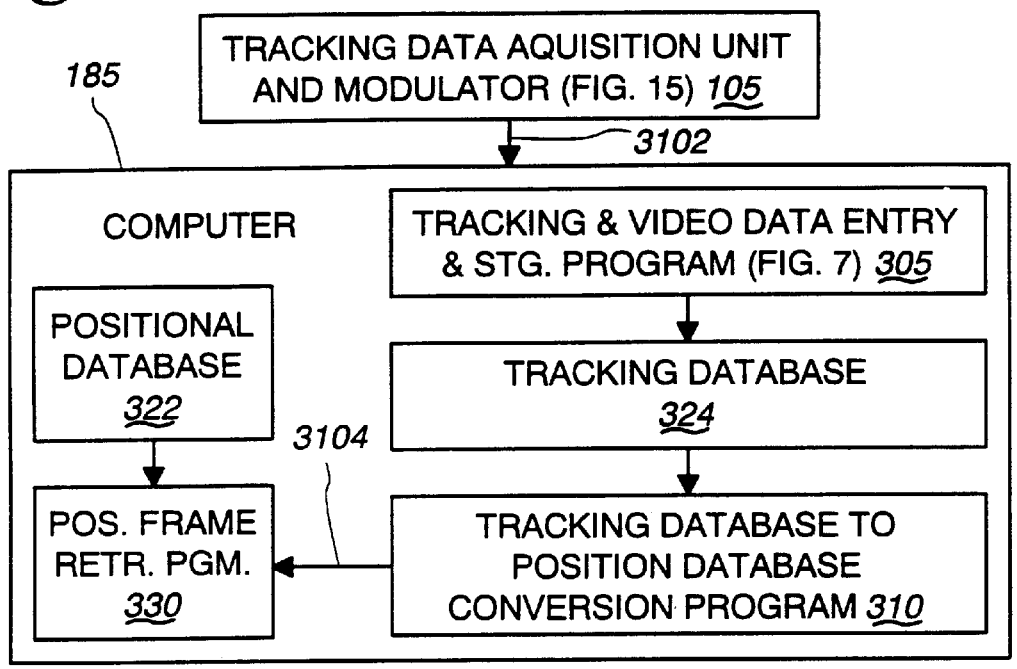
FIG. 17 is an alternate embodiment of the invention illustrating use of the tracking data acquisition unit and modulator 105 as a pointing and image retrieval device.

Another embodiment of the invention is shown in FIG. 17. The computer 185 contains a positional database 322 established previously, in accordance with the teachings set forth above. The positional frame retrieval program 330 is actively retrieving images from the databases 322 and displaying them.

In this embodiment, the tracking data acquisition unit and modulator 105 is not attached to the camera, but is attached by a serial communicator tether 3102 (which could include a radio linkage) directly to the serial port of the computer 185, such that the tracking and video data entry and storage program continuously accepts the data and stores it in the tracking database 324. The tracking data acquisition unit is thus enabled to be used as a mouse pointing device for the positional frame retrieval program 330 to guide in the retrieval and display of images—an inertial joystick.

The tracking database 324 may be on the hard disk as previously, but preferably it is a RAM circular buffer that is shared by the tracking database to positional database conversion program 310. Alternatively, the tracking data values may be sent as messages between the two programs running under Windows and subject to the standard Windows message dispatcher (not shown). Both of the programs 305 and 310 can be simplified, since neither is dealing with video or with frame numbers in this embodiment.

The tracking database to positional database conversion program operates continuously, receiving tracking data containing unnormalized acceleration and orientation data and converting it into normalized position and orientation data, and sending the resulting data directly to the positional frame retrieval program 330, thereby causing the program 330 to update the display continuously in response to manual movement of the tracking data acquisition unit and modulator 105 through time and space.

As an alternative, two computers can be utilized. A first portable computer (not shown) can be attached to the tracking data acquisitional unit and modulator 105 can contain the program elements 305, 324, 310 and 330, shown in FIG. 17. This computer continuously computes the coordinates and position of itself in time and space and broadcasts this information by means of a radio LAN or serial port, for example, to a stationary computer that contains the positional database 322. The stationary computer broadcasts back the database information to the portable computer, where it is displayed. In this manner, a virtual world can be created where the one carrying around the portable computer can view a universe that exists in virtual form on the disk and that was recorded earlier at this or some other location.

As a third alterative, the tracking data acquisition unit and modulator 105 in FIG. 17 can be equipped with a video monitor receiving video signals from the computer 185 (by television transmission over a radio link, for example). Then one may wander about with the television and tracking data acquisition unit viewing a virtual reality derived from the positional database 322.

The arrangement illustrated in FIG. 17 can also be used as a three-dimensional pointing device for programs other than the positional frame retrieval program. Any kind of three-dimensional software program requiring the assistance of a navigation tool having either three or six degrees of freedom may be readily modified to accept the positional data records generated at 3104 by the tracking data acquisition unit and modulator 105.

Another embodiment of the invention utilizes a movie mapper 325 (FIGS. 19 to 35) to assist the user in retrieving and displaying the images. The program structure, defined by a series of nested objects. is depicted in overview in FIG. 26. The dynamics of event message transmission between objects is depicted in FIG. 27, and the most important data structures are in accordance with previously-described FIGS. 5 and 8. The operation of the program, as seen by the user, the window dynamics, and the program resources are depicted in FIGS. 34 to 40 and 43 to 46, which disclose a series of operating states and menus of the program.

The program 325 is written in Microsoft C++ to run under Microsoft Windows, Version 3.1. Some of the programs call upon routines contained within the Microsoft Video For Windows Development Kit, Version 1.1. All of the above may be obtained from Microsoft Corporation, 1 Microsoft Way, Redmond, Wash. 98052. The Media Control Interface "MCIWind" 10944 (FIG. 26) from the Video For Windows package is used to control the scrolling through the playback of video images within the AVI (audio video interleave) video child window, MCIView 10940, described below. Many of the array processing routines presented within the program file TLA_FILE, as well as the vector, array, and tensor allocation programs are taken from the book Numerical Récipes in C, 2nd Edition, by Press, Vetterling, Teukolsky, Flannery (Cambridge University Press. 1992) and from the program diskette that accompanies this book. (These routines have been placed in the public domain by the authors of the book).

Figure 19:
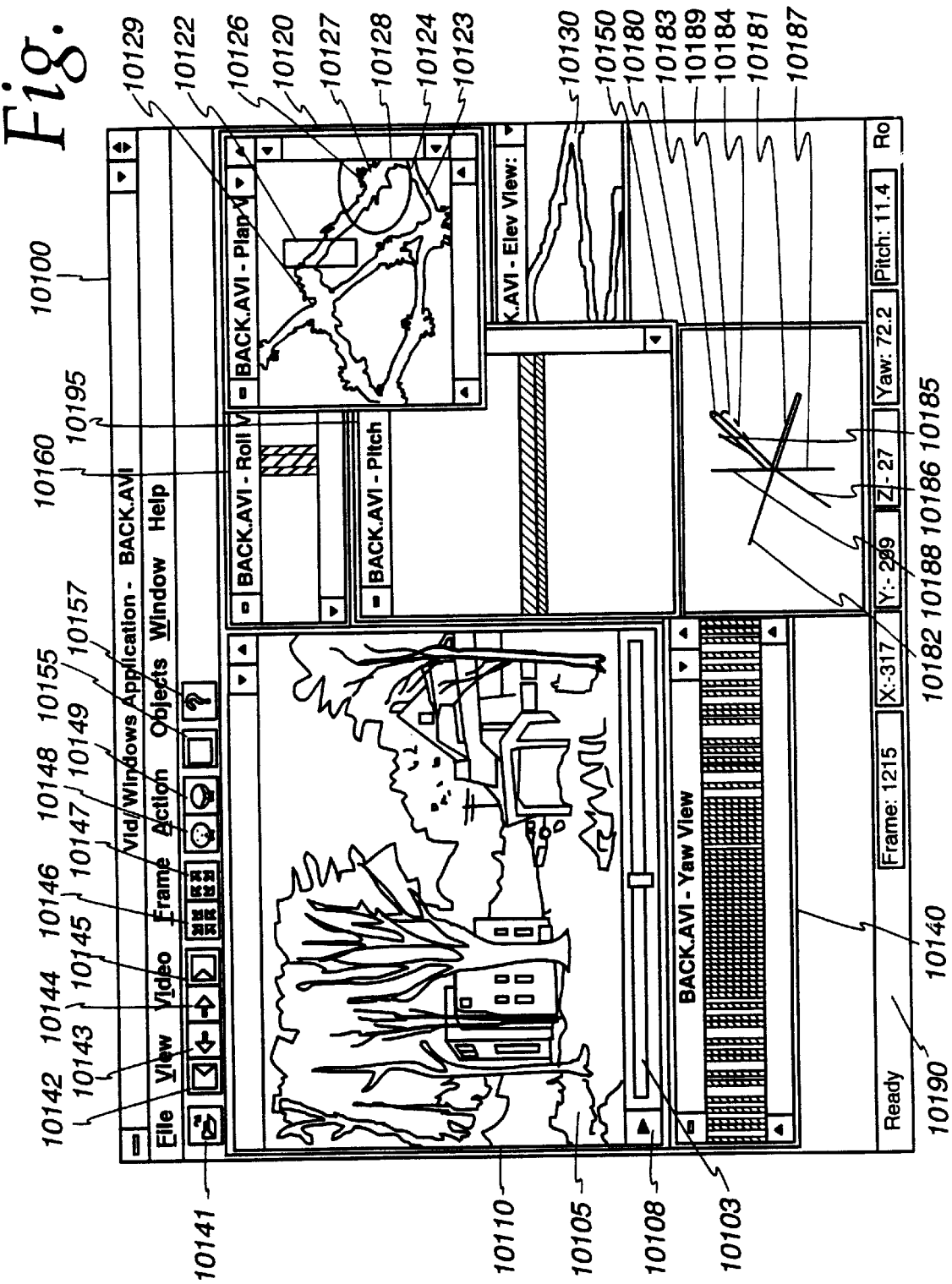
FIGS. 19 to 25 and 28 to 31 are computer screen snapshot views of the screens generated by the movie mapper program 325 in operation, including presentations of the captured images, of the path of the camera in plan and elevational views, and of various pop-down menus.

With reference to FIGS. 19 to 26, and beginning with FIG. 19, when the user turns on the movie mapper 325, a main frame window 10100 opens up. The user first actuates the File popdown menu and calls for the display of an AVI file (a Microsoft Audio Video Interleave file). These files, in the present version of the invention, have file names with the suffix ".AVI". In all respects, these files correspond to all of Microsoft's specifications.

The program 325 opens up the selected "*.AVI" file. It also looks for and attempts to open a telemetry file, containing the positional information, which has the same name and the file name suffix "*.TLA". The "*.TLA" file must be prepared for this program by adding to the beginning of the file a single line of text. The line is "HDR<tab> <last frame number>" where <tab> is the tab character, and <last frame number> is the first number on the last line of the file. If no "*.TLA" file is found, the system issues an error message but permits one to browse through the "*.AVI" file in the normal Microsoft manner. The program also looks for and attempts to open an "*.MTA" file for its own use in defining overlay characteristics. An empty "*.MTA" file should be supplied, since the program will issue an error message and quit if none is found. The File popdown menu contains the usual list of Microsoft options, including Open AVI, Print, Print Preview, Print Setup, Exit, and a numbered list of recently opened AVI files to facilitate recalling a file recently opened.

The figures illustrate what happens when an AVI file BACK.AVI and its corresponding telemetry file BACK.TLA were successfully opened. Upon opening this file, the program 325 causes a Video child window 10110 to be opened, displaying in this case a view of the back yard of a private home. This video window is labelled at the top with "BLACK.AVI-Video" to identify both the file and the fact that this is the child window. The child window 10110 provides controls that are standard Microsoft controls for scrolling through a sequence of video images. These include a VCR-like control 10108. Clicking on this control starts the video playback if it is stopped, and stops it if it is running. The control is marked with a square when the video is playing, and it is marked with a triangle (shown) when the video is stopped. The Video popdown menu contains selections for changing the size of the video window to the original size, half the original size, or double the original size. A mouse-actuated slider control 10103 (FIG. 19) permits the user to position the video playback to any frame of the temporal video sequence. All of these functions are provided by Microsoft's utilities.

A View pulldown menu permits additional child windows to be opened that relate to the position information. The View menu provides the following options, which are described below:

Triple MCI
Plan
Elevation
Yaw
Pitch
Roll
Orientation
Overlay Visibility
Toolbar
Status Actuating the Plan command causes a plan view: XY child window 10120 to open up, displaying the path 10123 over which the camera was moved during the process of recording the sequential images. This window is labeled: "BACK.AVI—Plan View: XY" to identify the file name as well as the nature of the view. While not clearly visible in FIG. 19, a large red dot 10128 identifies the precise position along the path 10123 where the camera was positioned when it recorded the image shown in the view window 10110. Smaller red dots 10126 and 10127 identify side frames which are shown to the left and right of the main frame when the "Triple Mci" View menu item is selected. Dark green dots show the field of view (fov) of the camera 10129, giving an indication of the direction the camera is pointing. When the "Play" button 10108 is pushed to commence a sequential playback of images, a series of red dots (again not clearly shown in FIG. 19) indicate the camera's track. These red dots are spaced apart to produce a dotted line effect following the path of the camera as it moves along the path in the X and Y directions. The color of the remaining points along the track is blue.

Activating the Elevation command causes an Elevational View: XZ child window 10130 to open up, displaying the camera path of movement as seen from the side, rather than from the top. The display in all other respects is identical to the plan view display just described.

Activating the Yaw command causes a Yaw View child window 10140 to open up, displaying the various yaw directions the camera assumed during the image recording process. Yaw may be thought of as compass direction.

Likewise, activating the Pitch command causes a Pitch View child window 10150 to open up, displaying pitch directions in a fashion analogous to the Yaw View above. Pitch is inclination of the camera in the vertical image plane, that is looking up and down. In this example, the images do not vary significantly in pitch.

Activating the Roll command opens a Roll View child window 10160. displaying roll directions as above. Roll is the tilt of the image plane from side to side, or leaning.

By clicking twice upon a point on the camera path in any of the child windows 10120, 10130, 10140, 10150, or 10160, the user may signal the program to switch to displaying the image closest to the point where the mouse pointer was clicked and having the desired position, angle, or orientation. This selection process provides a rapid method for retrieving and positioning the video for playback based upon the desired position of the camera when an image was captured.

Activating the Orientation View command causes a child window 10180 to open up, displaying the orientation of the camera (pitch, roll, arid yaw) graphically. Unfortunately, the absence of colors in FIG. 19 makes the figure less than clear. The positive Y direction is indicated by the line 10181, with the negative Y direction indicated by the line 10182. Note that the line 10181 indicating positive Y is Bold, to serve as a reference line. The positive X direction is indicated by the line 10185, and negative X is indicated by the line 10186. the positive Z direction is indicated by the line 10188, and the negative Z direction is indicated by the line 10187.

The actual direction of the camera, when it captured the image shown in the child window 10110, is indicated by the line 10183, which appears half in red and half in blue in the actual program display (and does not match the bold black line 10189). The dotted line 10184 is a projection of the camera direction line 10183 onto the X-Y plane. As a sequence of images is displayed in response to actuation of the play control 10108, the red-blue line 10183 swings about, indicating the orientation of the camera, and the dotted line 10184 swings about below (or above) the line 10183 like a shadow at noontime on the equator.

Roll is represented by the ratio of blue and red portions of the line 10183. If the roll value is zero, then the line is half red and half blue. Roll in a clockwise direction increases the blue, while roll in a counterclockwise direction increases the red. A positive roll gives more red.

A toolbar containing push button controls (10141, 10142, etc.) appears in the window 10101 and may be selectively displayed or hidden by actuating the Toolbar command in the View pulldown menu. The push button 10141 is an alternate way to open a file. The push buttons 10142 and 10145 respectively wind to the first and the last frames, and the push buttons 10143 and 10144 respectively move back and forward by one frame at a time.

Figure 28:
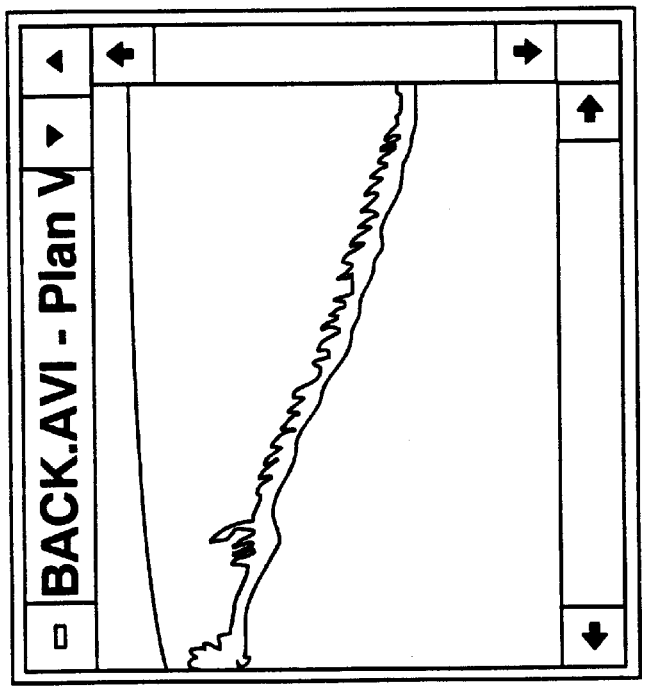

The push button 10146 zooms in, and the push button 10147 zooms out. These two push buttons control the portion of the video path that is displayed by the Plan View and Elevational View child windows 10120 and 10130, and the orientations shown in the Yaw View, the Pitch View, and the Roll View. To zoom in, and with reference to FIG. 19, the user uses the mouse to position the cursor and then, with the left mouse button held down, drags the cursor diagonally so that a mouse-defined rectangle 10122 is created within the child window 10120. The user then clicks the zoom in push button 10146. The Plan View: XY window's contents are then replaced by the contents of the marked rectangle, expanded out to fill the window (FIG. 28). The Elev View: XZ window's X axis is simultaneously zoomed, while the Z axis (vertical) is left as before. The points in the XY view which were outside the rectangle 10122 are excluded from the elevational view. Likewise, any angle not represented in the selected set of points is excluded from the Yaw View, the Pitch View, and the Roll View. This process may be repeated as often as desired, until only a few camera positions are shown individually in the display.

The user may also create a rectangle within the Elev: XZ window, if desired. When the zoom-in push button 10146 is actuated, the selected rectangle fills the XZ window, and the X axis of the XY window is zoomed in the X axis only. Points not within the XZ selection rectangle are then excluded from the elevational view.

The user may also create a rectangle in the Yaw View window 10140, the Pitch View window 10150, or the Roll View window 10160, if desired. When the zoom-in push button 10146 is actuated, the selected rectangle fills the window, and the Yaw, Pitch, or Roll values displayed within the selected rectangle expand to fill the display. Points in the Plan View: XY window 10120 and the Yaw View window 10140 which do not have yaw, pitch, and roll values within the resulting displayed Yaw View, Pitch View, and Roll View windows are excluded from the Plan View window and Elev XZ window.

Actuation of the zoom-out push button 10147 causes the plan and elevational displays to return to their original appearance (as shown in FIG. 19).

Figure 29:
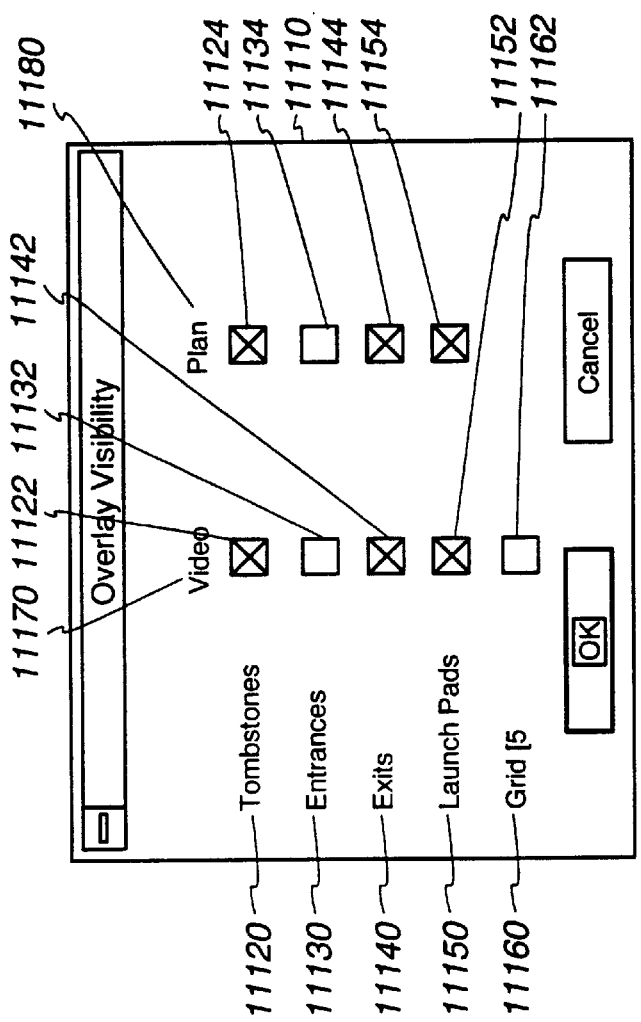

Actuating the Overlay Visibility . . . menu selection from the View menu causes the display of an Overlay Visibility dialog window 11110 (FIG. 29). The Overlay Visibility dialog lists five overlay items:—"Tombstones" 11120, "Entrances" 11130, "Exits" 11140, "Launch Pads" 11150, and "Grid (5" 11160—each of which may be selected for display in the Video windows or the Plan View window. A check box for each item is provided under the Video and Plan columns of the dialog 11122, 11124, 11132, 11134, i1142, 11144, 11152, 11154, 11162. Check boxes under the Video column 11170 control display of items in the Video window 10110. while those in the Plan column 11180 control display of items in the Plan View window 10120.

When the check box has an X in it, any overlay item of the corresponding type which may appropriately be displayed according to the current state of the program is displayed in the Video or Plan View window. Likewise, removing the X from the checkbox inhibits display of the corresponding line item.

The Overlay items listed above will be described later.

The final command in the View popdown menu is the Status command, which hides or displays a status line at the bottom of the window 10190 and which indicates such things as the frame number and the X, Y, Z, Yaw, Pitch, and Roll coordinates of the camera corresponding to the image that is being displayed.

The Frame pop down menu displays the following commands, all of which relate to simply positioning the video as if it were a continuous video tape recording:

Home
Back
Forward
End

Additionally, the Frame pop down menu displays the following commands which have a special meaning:

Loop Forward
Loop Backward

The Loop Forward and Loop Backward selections cause the Video display to update with the next frame of video (Loop Forward) or previous frame (Loop Backward) in temporal sequence, continuously. Upon reaching the end of the video sequence, the sequence continues playback with the frame at the other end of the sequence, as though the video were joined in a continuous loop of film. Frames not shown in the Plan View window are skipped in the playback. Also, after each frame is shown, the Overlay Items appropriate to the frame are rendered onto the video frame display. The Overlay Items are described below.

The Loop Forward function may alternatively be started and stopped by striking the space bar. Each strike toggles the Loop Forward function between the started and stopped state.

The Action Menu has functions corresponding to the Toolbar buttons Zoom In 10146 and Zoom Out 10147. It also has functions corresponding to the Head Forward button 10148 and Head Back button 10149 Finally the Adjust Parameters function brings up a dialog box 10310 (FIG. 21) by which various parameters to be described later are adjusted.

The Head Forward 10148 and Head Back 10149 buttons and functions allow the user to move forward or back up from the currently displayed frame. The Head Forward frame and Head Back frame are shown as green dots 10123 and 10124 on the Plan View window, and as green rectangles 10420 and 10422 (FIG. 22) superimposed on the Video window. The Head Forward rectangle 10420 is projected onto the Video window and is superimposed on a spot on the Video window which corresponds to its spatial location as determined by the database. The Head Backward rectangle 10422 encloses the entire video area of the Video window.

The Head Forward frame is chosen by the program such that when it is displayed the appearance to the user is that the user has moved forward. This frame is selected in the following manner. Search all the frames in the telemetry file (*.tla) and determine which are within the front field of view angle from the perspective of the current frame.

The front field of view is defined here. Define a ray with its origin at the current frame's x-y location and extending in the direction of the yaw angle, called the centerline of the frame. Define a pair of rays with the same origin, called left and right lines of the frame, which make an angle with the centerline specified by the user in the Action-Adjust Parameters dialog (FIG. 21) Field of View Angle +/− item 10312. Define a Field of View (fov) of the current frame between the left and right lines of the frame. All frame points which lie within the field of view are said to be frames within the current frame's field of view.

Of all the frames within the field of view (fov), determine which are within an operator specified radius (the Action-Adjust Parameters dialog Neighborhood Multiplier item 10320 (FIG. 21) times the Action-Adjust Parameters dialog Neighbor Radius item 10318 (FIG. 21) of the current frame location and have a yaw angle that is within a specified maximum angular difference from the yaw angle goal. Of these candidate frames, find the frame that has the lowest valued FovIndexRating, defined as the sum of:

1. the absolute angular difference between the yaw angles of the current frame and the candidate frame, and
2. a weighted rating based on the distance of the xy location of the candidate frame from any point on the neighborhood circle around the current frame.

Figure 21:
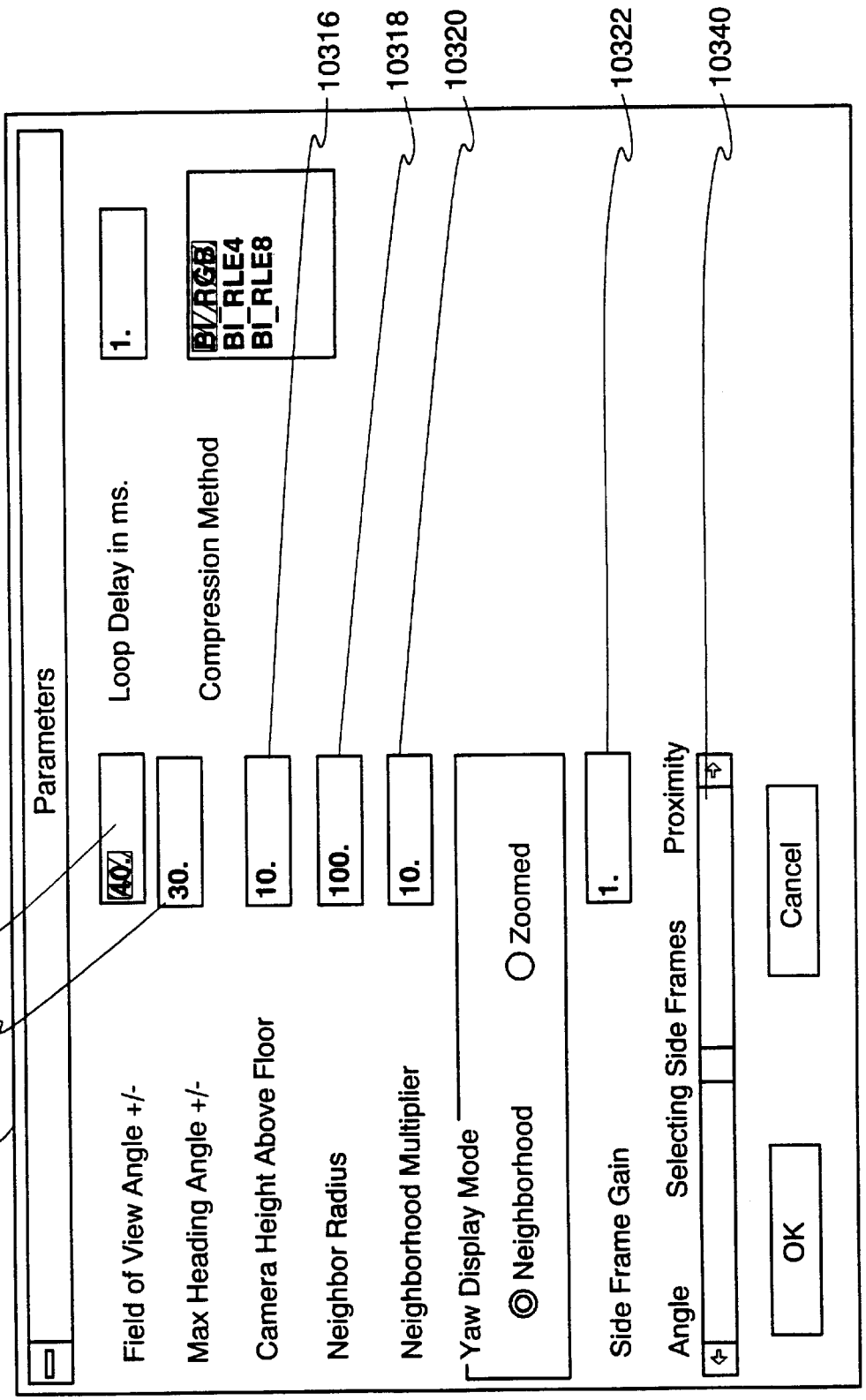
Figure 22:
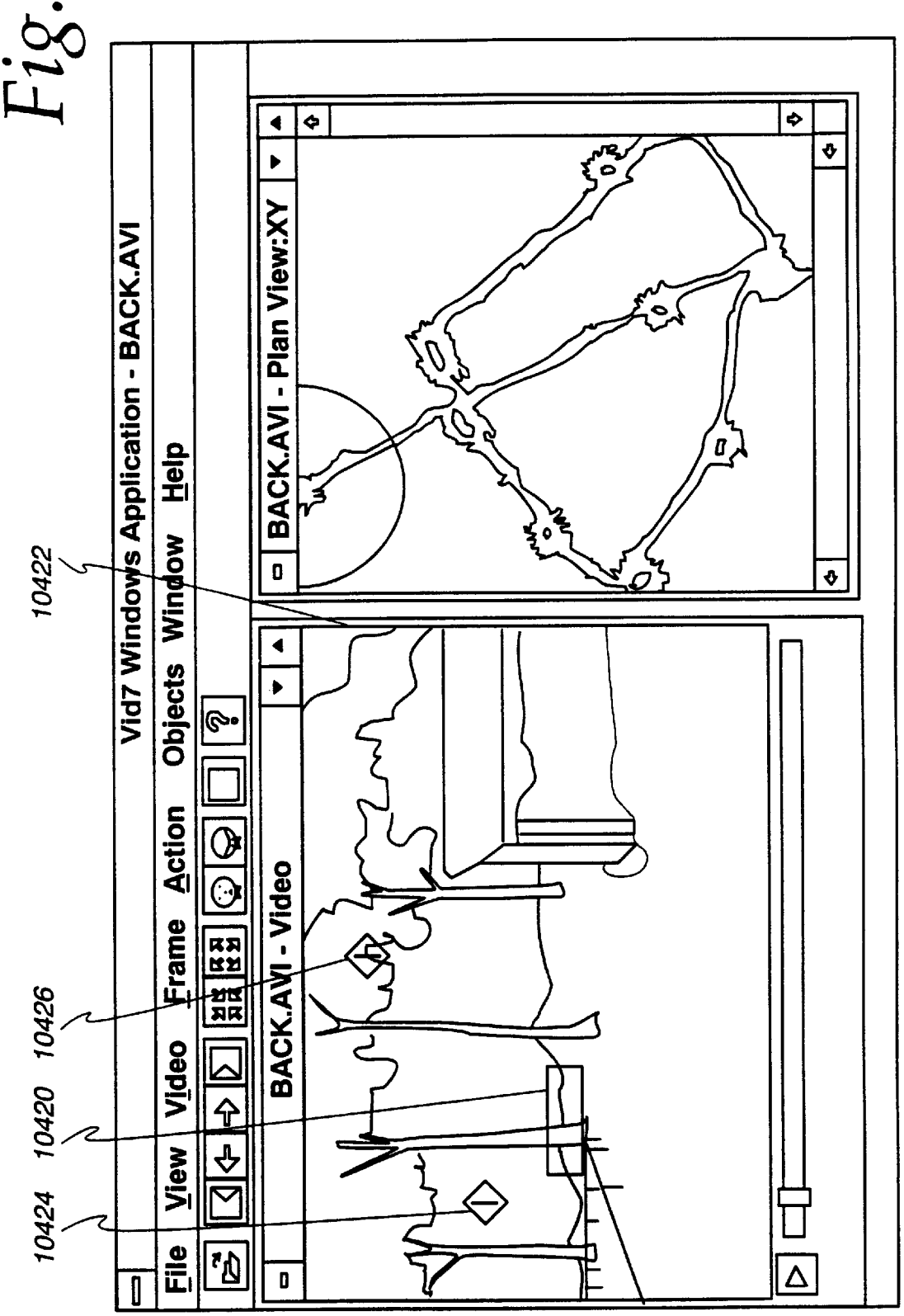

The weight given this distance error is proportional to the value of the Action-Adjust Parameters dialog Selecting Side Angles scroll bar item 10340 (FIG. 21). This allows the operator to adjust the importance of the minimization of yaw differences or distance from the circle.

Sometimes there is not an appropriate frame. In that case, none are selected and no corresponding overlay is displayed.

The Head Back frame is calculated in an similar manner to that used to the Head Forward frame with the exception that this frame must lie in the rear field of view. The rear field of view is a yaw angle range that can be found by reflecting the front field of view angle range to the back of the current frame. These fields of view are the same magnitude and face in opposite directions. For the case of jumping backward, the yaw angle goal is equal to the yaw angle of the current frame.

The keyboard Up-arrow-key and letter I key also execute the Head Forward function. the keyboard Down-arrow-key and letter K key also execute the Head Back function.

Figure 20:
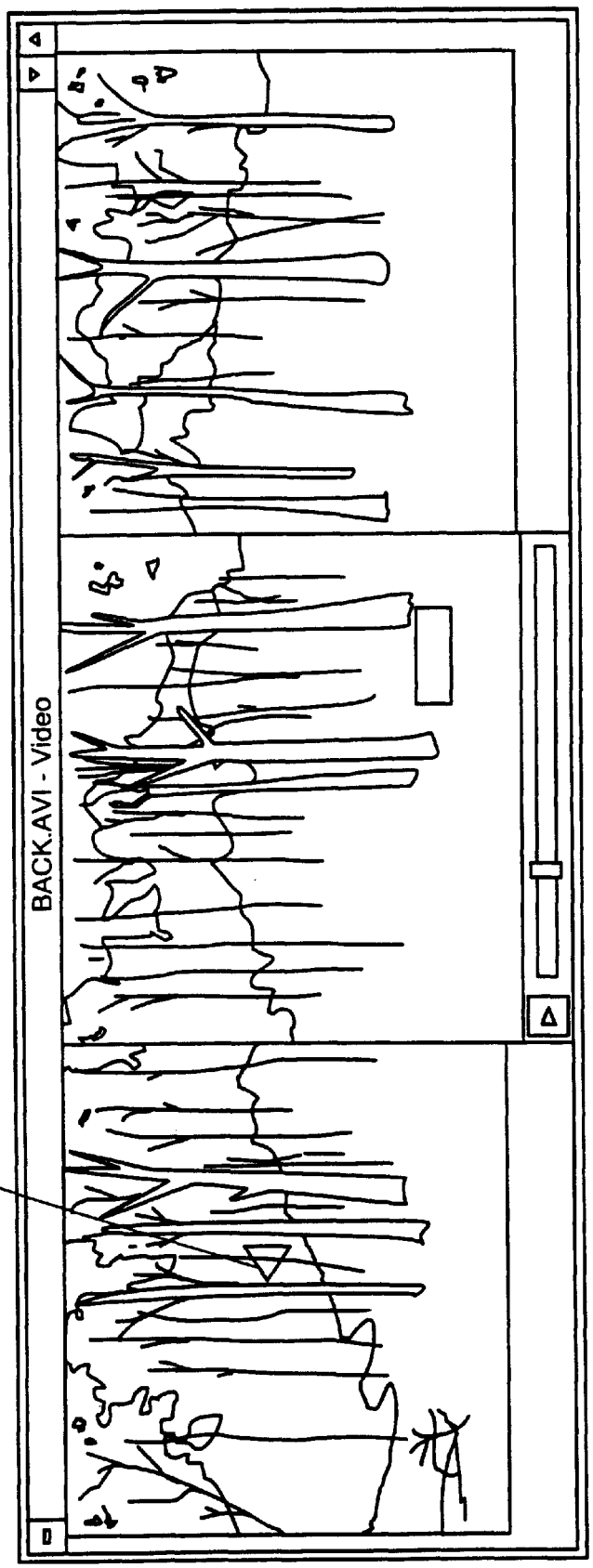

The View menu-Triple Mci function causes the MCIview window to expand to include three video windows (FIG. 20). The one in the center is the same. The left and right windows contain frames of video selected from the data set on the basis of their proximity to the best theoretical frames to display both in x-y-z and in centerline. The frame on the left is chosen so that its centerline is close to twice the fov of the center frame. Likewise the frame on the right is chosen so that its centerline is close to twice the fov of the center frame, but in a direction to the right of the center frame's centerline. For example, if the fov is 30 degrees (meaning that the left line is 30 degrees less than the centerline and the right line is 30 degrees greater than the centerline on a compass), a left frame would be searched for in the database with a center line of approximately 60 degrees less than the centerline of the current frame.

If no frame is found that meets the criteria for selection, no frame is displayed. If a frame has been chosen for the left frame or the right frame, that frame is displayed within its own MCIwnd. located to the left or the right of the center frame.

The left and right frames are aligned with the center frames based on the fov and on the yaw and pitch values of the centerlines of the frames. The fov defines a "pixel per degree" displacement on the screen. For each degree the left or right frame's centerline disagrees with the predicted centerline (center frame's centerline plus or minus twice the fov) the frame is shifted a corresponding number of pixels. likewise, the frame is shifted up or down by the pixel per degree amount by which the frame's pitch differs from the center frame's pitch.

The left arrow key and the J key on the keyboard select a new frame for viewing. Initially the frame selected is the displayed left frame described above. The 0 through 9 keys allow the selection of a frame (if one exists) which has a centerline less than twice the fov angle. Pressing the 1 key sets the goal centerline angle to the centerline angle of the current frame plus or minus 10 percent of twice the fov angle. The 2 key similarly sets the goal centerline angle to 20 percent of twice the fov angle. The 0 key sets the goal centerline angle to 100 percent of twice the fov angle. Note that this setting yields the frame which precisely abuts the center frame, since points on the edge of the center frame lie on a vertical plane extending from the current point of view which makes an angle of exactly "fov" degrees with the current frame centerline.

Figure 30:
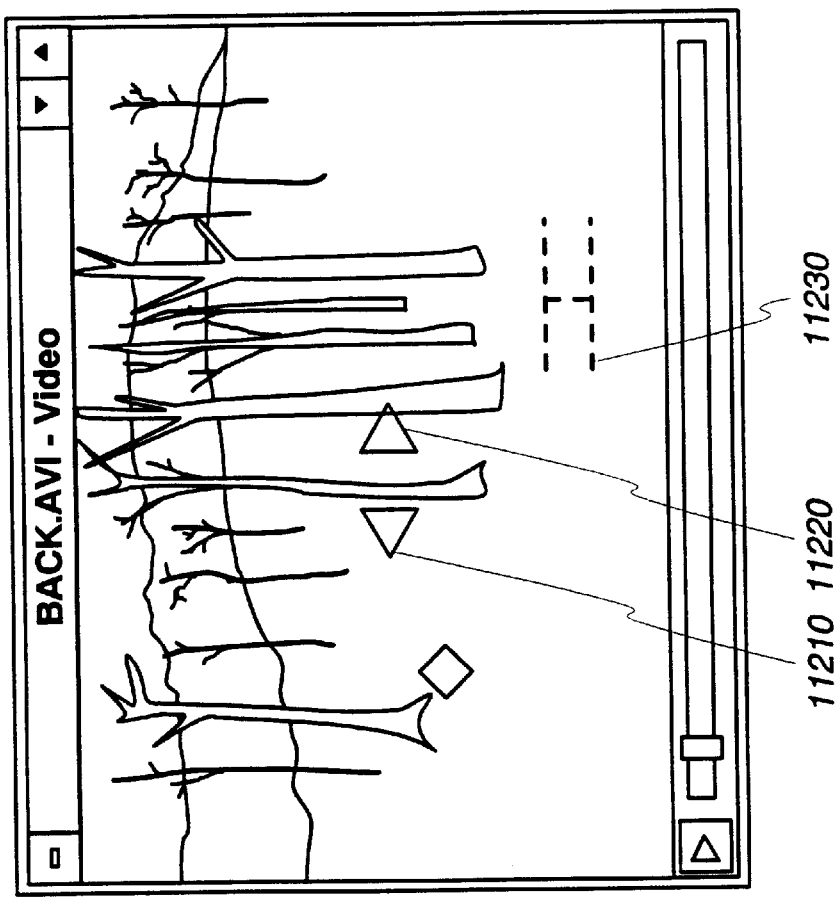

An overlay item represents a point or area of interest of the database as projected onto the current frame. Several overlay item types are defined by the movie mapper program. The overlay items which represent frames are the jump forward rectangle 10420 (FIG. 22), the jump backward rectangle 10422 (FIG. 22), the jump and turn left diamond 10424 (FIG. 22), the jump and turn right diamond 10426 (FIG. 22), the turn left triangle 11210 (FIG. 30), and the turn right triangle 11220 (FIG. 30). (See also 10220 in FIG. 20 where the left-turn triangle is shown in the panoramic view.)

Figure 31:
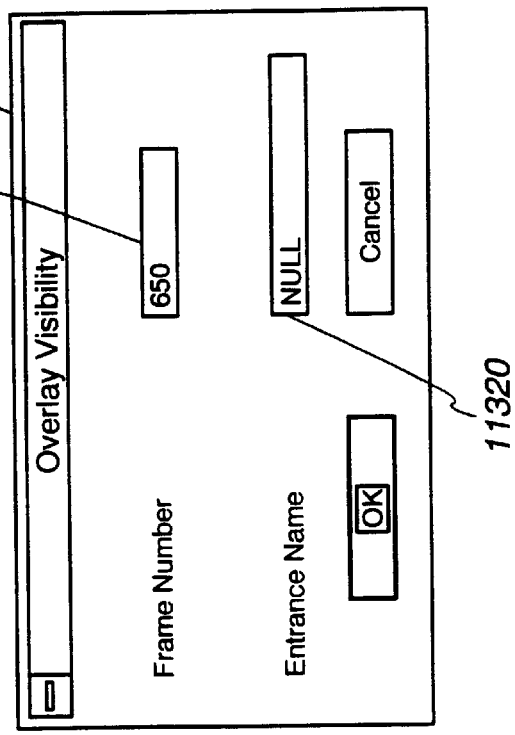

Additionally, one or more frames may be defined as Entrance frames, marked on the Video Overlay window with an Entrance item 11230 (FIG. 30). An Entrance frame is a frame which is displayed as a result of the operator causing the viewer program to access a frame indexed within an area of the database known as an Exit area. The Exit area is described below. Like the Jump Forward frame. for example, the Entrance frame replaces the current frame in the video display window. An entrance frame may be contained within the same database which is currently being viewed, or may be from a different database. An entrance frame may be identified by the operator at any time by invoking the Objects-Create Entrance dialog 11300 (FIG. 31). The current frame is marked in the *.mta file associated with the currently open database with the operator supplied tag entered by the operator in the Entrance Name item 11320 (FIG. 31) of the Objects-Create Entrance dialog 11300 (FIG. 31). The Frame Number 11310 (FIG. 31) is supplied by the program when the dialog is invoked.

Three overlay item types describe areas rather than points. An Exit item marks an area of the Plan View containing frames of the current database which when viewed will cause the display of an associated Entrance frame. A Launch Pad area item 10722 (FIG. 25) causes the execution of an associated application program whenever a frame is displayed whose coordinates lie within the area defined for the Launch Pad area.

Figure 23:
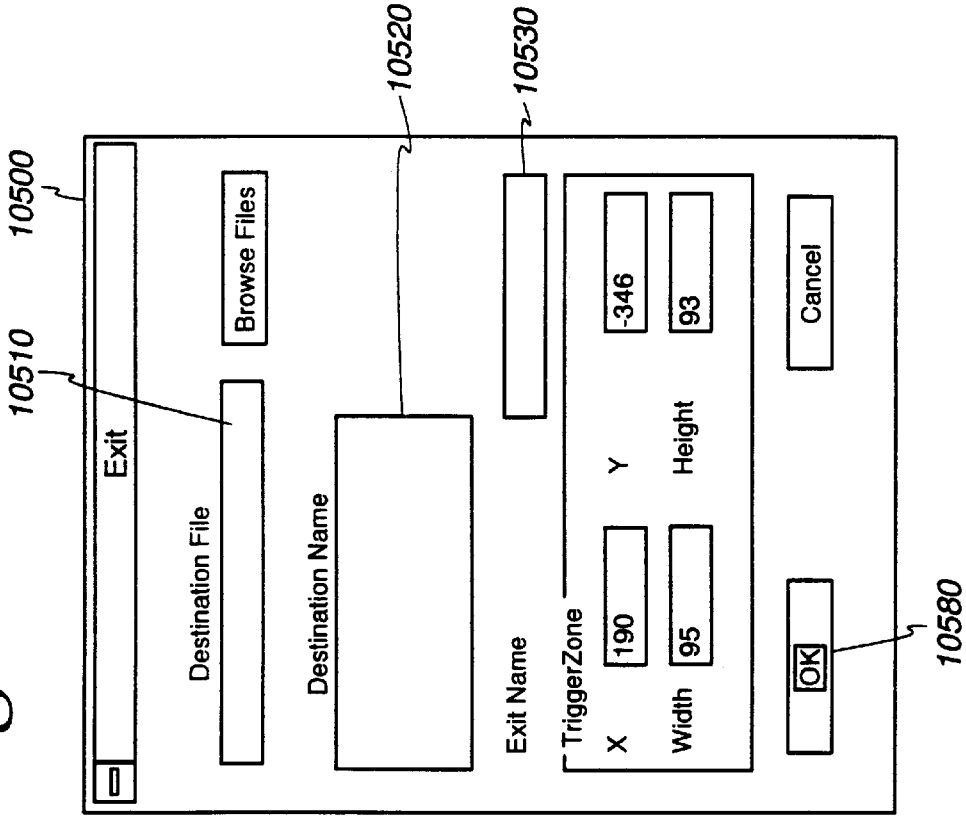
Figure 25:
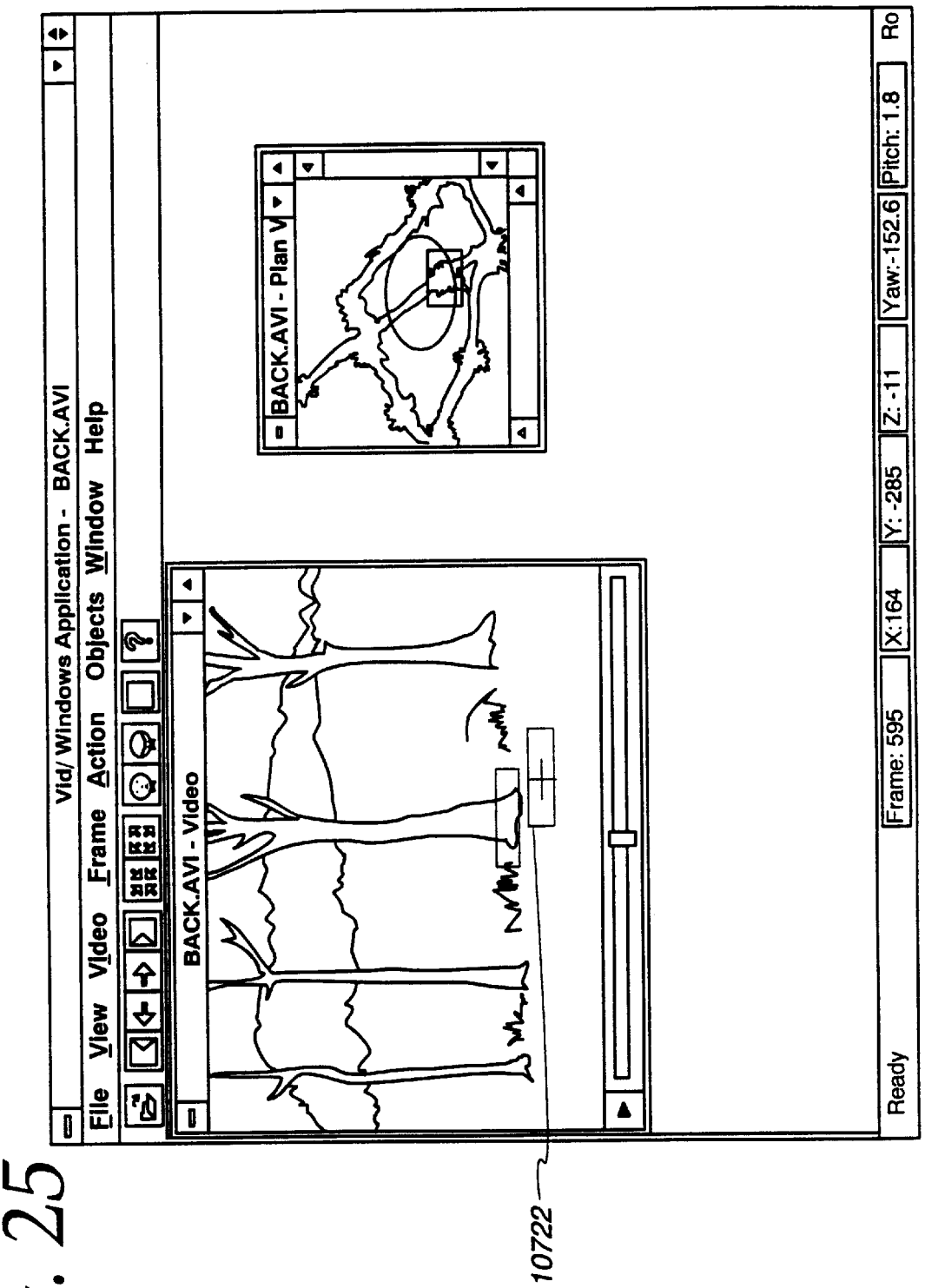

An Exit area is defined by the operator's actions:

The operator clicks on the Plan View window, holding the left mouse button down and moving the pointer to another point within the plan view window. This action creates a rectangle drawn on the Plan View 10122 (FIG. 19). The operator then invokes the Objects-Create Exit dialog 10500 (FIG. 23), and after filling in the dialog's entries, clicks the mouse on the OK button 10580 (FIG. 23). The dialog's Destination File item 10510 (FIG. 23) identifies the *.mta file associated with the database containing the desired Entrance, the named entrance which was defined by the procedure above. The Destination Name item 10520 (FIG. 23) selects the tag for the desired Entrance frame which was previously identified using the procedure described above for defining Entrance frames. Finally, the operator identifies the Exit area by entering an Exit name in the Exit Name item 10530 (FIG. 23), and completes the dialog by clicking the mouse on the OK button 10580 (FIG. 23).

Figure 24:
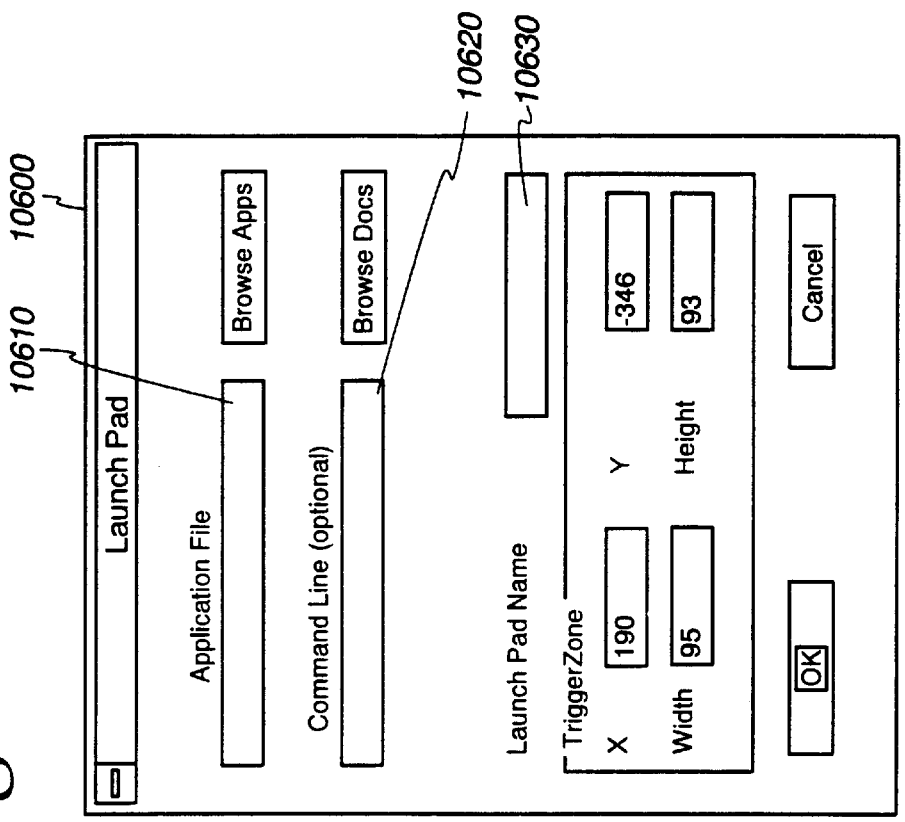

A Launch Pad item is defined in a similar fashion. The operator clicks and drags on the Plan View window as above, and then invokes the Objects-Create Launch Pad dialog 10600 (FIG. 24). The operator fills in the Application File item 10610 (FIG. 24) with the name of an application to execute, the Command Line item 10620 (FIG. 24) with command line information if any, and gives the Launch Pad a name in the Launch Pad Name item 10630 (FIG. 24).

Each of these overlay items is projected onto the current video frame according to the overlay calculation code described above.

The Window pop down menu provides conventional Microsoft Windows window control functions that need not be described here. The Help popdown menu also needs no special explanation.

Figure 26:
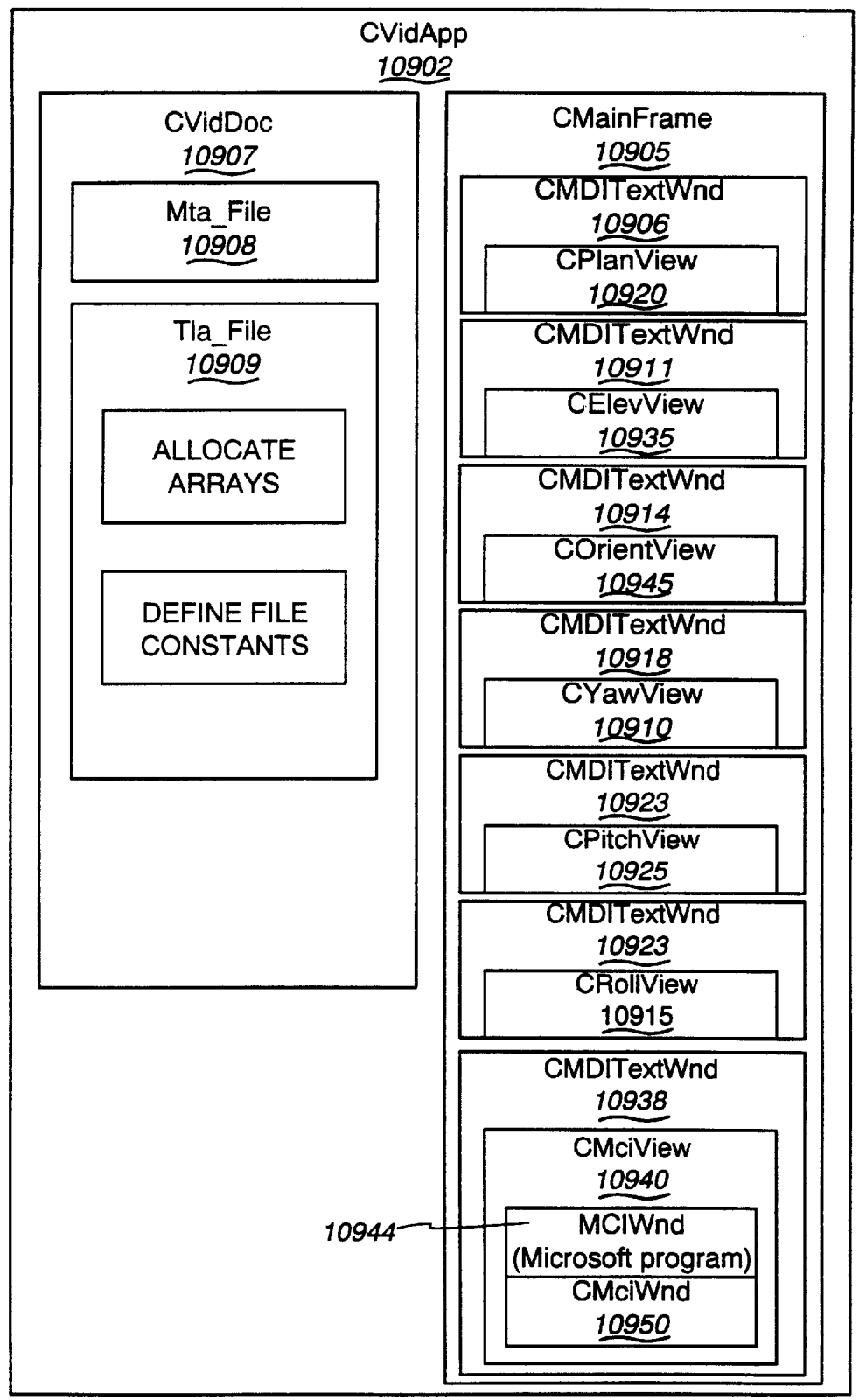
FIG. 26 is a block diagram illustrating the structure of program-generated objects in the movie mapper program 325 when it is in actual operation.
Figure 27:
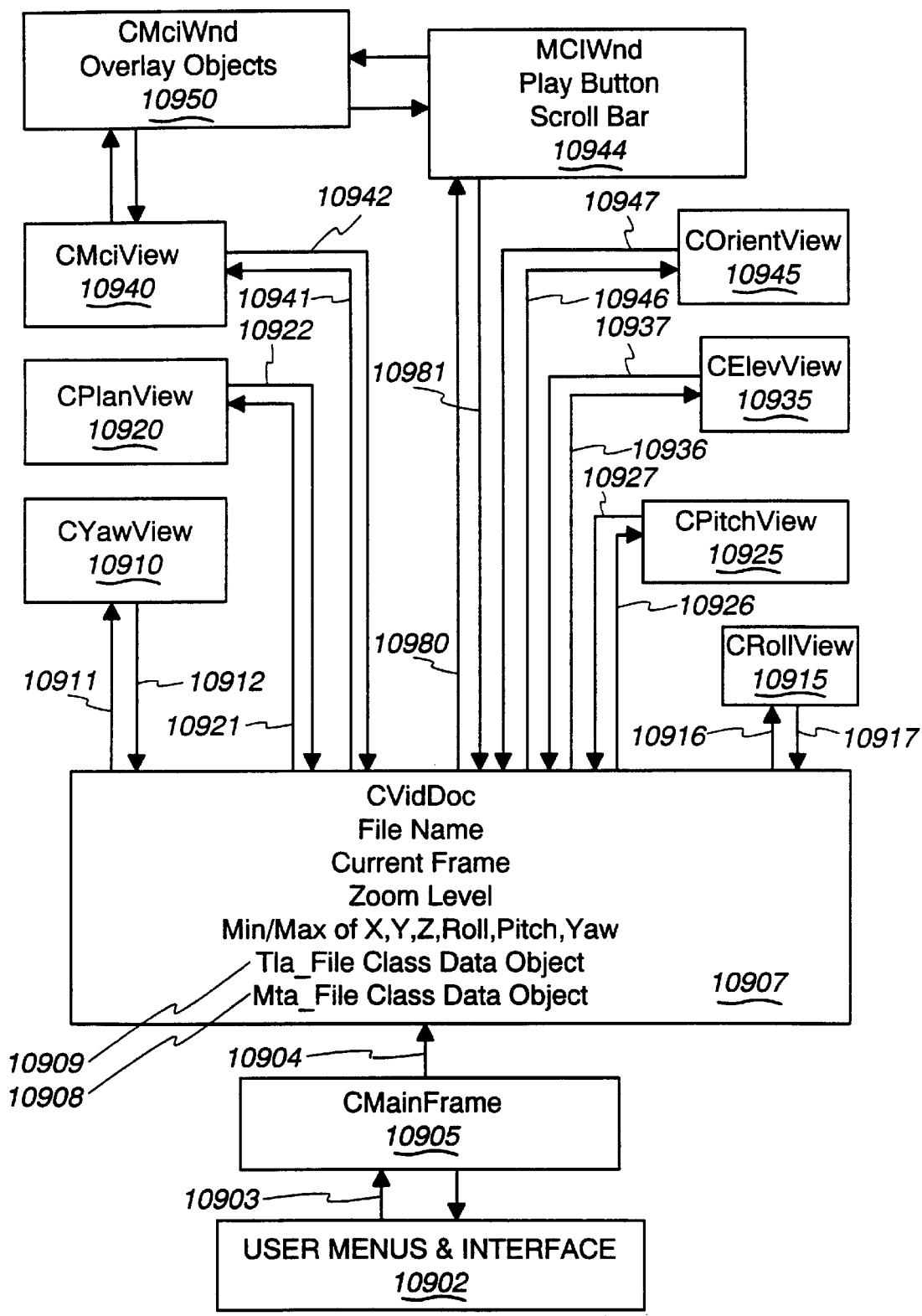
FIG. 27 is an information flow block diagram of the program-generated objects in the movie mapper program 325 illustrating how they communicate.

The object program structure of the movie mapper 325 is described in overview in FIG. 26, and the message paths connecting these program object elements are shown in FIG. 27. Taken together. and in conjunction with the preceding figures that illustrate the windows and program operation, FIGS. 19 to 35 present a full overview of the program 325.

The operating program is composed of a number of objects each of which is an instance of some class of objects. These objects are represented by rectangles in FIGS. 26 and 27. Objects sometimes create subsidiary objects. When this happens, the subsidiary objects are represented in FIG. 26 by smaller rectangles contained within the larger object rectangles that gave rise to them. Each object has properties which correspond to its particular class. Each object class has a name, and the properties of the class are defined by separate program listings for each class. To aid the reader in pursuing these programs, FIG. 26 presents the hierarchical arrangement of the objects that are present in the program 325 when it is actually operating. The class name of each object appears within the rectangle for the object.

When the program commences operating, it first appears as an object named CVidApp 10902 (FAG. 26). This object then creates a frame window derived from the Microsoft class CMainFrame 10905. This CMainFrame object appears on the screen as a large window frame 10100 (see FIG. 19) that includes a menu bar, a tool bar, and a status line, as has been described.

This CMainFrame object next launches a child frame derived from Microsoft's CMDIChildWnd that is of the class CMDITextWnd 10938. This object gives rise to a child window that is modified from the Microsoft original in that its title line (positioned above the window) may be dynamically altered while the program is in operation.

This first child object launches within itself an instance of the CMCIView 10940 object, which launches MCIWnd 10944 to display the sequence of video images.

The CMciView object 10944 also launches a CMCIWnd object 10950. The CMCIWnd object 10950 attaches itself to the MCIWnd object 10944 so that Windows operating system events come to the CMCIWnd 10950 object instead of being sent directly to the MCIWnd object 10944. In most cases the CMCIWnd 10950 object merely forwards the events to the MCIWnd object 10944. The CMCIWnd object 10950 intercepts mouse events, so that it may sense operator clicks on the overlay objects. The CMCIWnd object 10950 also intercepts MCIWnd redraw requests, forwards these requests to MCIWnd 10944 for video refresh, and then redraws the overlay objects associated with the video frame being displayed.

The CMciView and MCIView objects are the lower-most of the seven objects shown in FIG. 26 within the CMainFrame object 10905. Accordingly, the user sees upon the screen a large window 10100 (FIG. 19) within which a small window 10110 appears having video playback control 10108

Six more windows may be opened by the user through activation of the View pop down menu, as has been described. Each of these windows corresponds to an additional pair of nested objects which appear within the CMainFrame object 10905 shown in FIG. 26.

If the user opens the Plan View: XY window 10120 (FIG. 19), then the object CMDITextWnd 10906 containing the object CPlanView 10920 is created within the CMainFrame object 10905, and this pair of objects together create the child window shown at 10120 in FIG. 19. If the user opens the Elev View:XZ window 10130, then the object CMDITextWnd 10911 containing the object CElevView 10935 is created within the CMainFrame object 10905, and this pair of objects together create the child window shown at 10130 in FIG. 19. If the user opens the Orient View window 10180, then the object CMDITextWnd 10914 containing the object COrientView 10945 is created within the CMainFrame object 10905, and this pair of objects together create the child window shown at 10180 in FIG. 19.

If the user opens the Yaw View window 10140, then the object CMDITextWnd 10918 containing the object CYawView 10910 is created within the CMainFrame object 10905, and this pair of objects together create the child window shown at 10140 in FIG. 19.

If the user opens the Pitch View window 10195, then the object CMDITextWnd 10923 containing the object CPitchView 10925 is created within the CMainFrame object 10905, and this pair of objects together create the child window shown at 10195 in FIG. 19.

If the user opens the Roll View window 10160, then the object CMDITextWnd 10923 containing the object CRollView 10915 is created within the CMainFrame object, and this pair of objects together create the child window shown at 10160 in FIG. 19.

As the user closes the windows, the corresponding pairs of objects are destroyed.

The objects, once created, send messages back and forth to each other over the paths illustrated in FIG. 27. The following discussion does not consider messages directed to the window frames (to adjust the frame size, for example) and to the child window frame object instances CMDITextWnd, which are not shown to simplify FIG. 27.

When the user "talks" to the program, using the keyboard or mouse, in general the user communicates with the active window (in the case of the keyboard) or the window that the mouse is in (in the case of the mouse), selecting a different active window by clicking within the window boundaries. The nine windows shown in FIG. 19 to which the user "talks" correspond to the ten objects numbered 10905, 10910, 10915, 10920, 10925, 10935, 10940, 10944, 10945, and 10950 in FIGS. 26 and 27. So these ten objects receive messages from the user and must respond.

The central coordinating object is the document object, which is an instance of CVidDoc 10927 which is derived from the class Cdocument (a Microsoft class). This object contains the key system variables that determine the state of the system. Included, as illustrated in FIG. 27, are the name of the file being processed, the number of the current frame being displayed, the current zoom level, the minimum and maximum values of coordinates that are used in the displays, and an object 10909 which is an instance of the class Tla_File, which stores and manipulates the positional data. (The minimum and maximum values of the coordinates are derived from the file data itself as the extreme values found within this object.)

If any window receives a message that calls for adjustment of one of the key system variables, that message is sent immediately to the document object CVidDoc 10907. The value of the key variable is adjusted, and then the document object 10907 broadcasts an "Update All Views" message over the path 10980 to the MCIWnd child window object 10944, over path 10911 to object 10910, over path 10921 to object 10920, over path 10926 to object 10925, over path 10916 to object 10915, over path 10936 to object 10935, over path 10941 to object 10940, and over path 10946 to object 10945. Each responds accordingly. The "Update All Views" message contains a hint that says either:

1. Rewrite Everything, or
2. Just Do Current Frame.

The "rewrite everything" hint causes each window to be redrawn completely. The "just do current frame" hint causes, for example. just one point to be changed from blue to red.

The individual window objects next communicate with the document object 10907 over paths 10911, 10916, 10921, 10926, 10936, 10941, and 10946 and receive information via paths 10912, 10917, 10922, 10927, 10937, 10942, and 10947 to learn of the new state of the system and to retrieve from the document object 10907 whatever data they need to update their respective windows. For example, if the user at 10902 clicks upon the "zoom out" push button 10146 (FIG. 19), this action is communicated to the object CMainFrame 10905 associated with the outer window frame. The object 10905 communicates this message over the path 10904 to the document object 10907. The Zoom Level variable is updated within the object 10907, and an "Update All Views—Rewrite Everything" message is broadcast over the paths 10911, 10916. 10921, 10926, 10936, 10941, 10946, and 10980 to the remaining objects, except for the CMciWnd object 10950. This object receives its update messages before they are sent to the MCIWnd object 10944, and are re-routed by the operating system. Then each of the objects 10910, 10915, 10920, 10925, 10935, 10940, and 10945 must send messages to the document object 10907 requesting all of the positional information (from "Tla_File") so that they may repaint their plots of camera motion. They also request the current frame number so that they can color the plot of the current frame position red in color. The object 10944, which simply needs to recompute and display the camera's orientation when capturing the current frame, simply requests the current frame number and the positional data relevant to that one frame. The object 10944, after verifying that the current frame value has not changed, simply does nothing in this case.

Double clicking on the path in one of the windows 10110, 10120, 10130, 10140, 10150, 10160, and 10180 (FIG. 19)

causes one of the objects 10910, 10915, 10920, 10925, 10935, 10940, or 10945 to send a message to the document object 10907 reporting a new value for the current frame number. In response. the document object broadcasts over the paths 10912, 10917, 10922, 10927, 10937, 10942, 10947, and 10981 the message "Update All Views—Rewrite Everything" to the objects 10910, 10915, 10920, 10925, 10935, 10940, 10944 and 10945. In response, the objects 10910, 10915, 10920, 10925, 10935. 10940, and 10945 redraw their plots totally. requesting the necessary data from the document object 10907. The CMCIView object 10940. after determining that the current frame had changed, would request the display of the designated new frame by the MCIWnd object from Microsoft 10944. That request is intercepted by CMciWnd object 10950, which refreshes the overlay after the MCIWnd object 10944 finishes its update. When the user clicks upon one of the positioning controls 10142, 10143, 10144, or 10145 in the tool bar (FIG. 19), these actions are communicated over the path 10903 to the CMainFrame object 10905 which, in a similar manner, sends a frame update message over the path 10904 to the document object 10907 and triggers a similar response to that just described.

When the user activates the video controls within the child window 10110 (FIG. 19) that contains the video image. the user is communicating directly with the Microsoft MCI-Wind object 10944. This object updates the display of the image as requested and sends a message indicating the new frame number to the object CMCIView 10940. The object 10940 must then communicate this action to the document object 10907 over the path 10942. In this case, if the 10942, 10947, and 10980 "Update All Views—Just Do Current Frame," Accordingly, the objects 10910, 10915, 10920, 10925, 10935, 10940, and 10945 need simply to request information concerning the new current frame.

The program provides the facility of navigating through the video database by selecting frames of data from the database which represent translations and rotations from the position of the current frame's point of view. The program searches the database for frames which best meet the criteria, and the operator then selects one of these frames using the keys or mouse as described above. The following paragraphs describe the method the program uses to select the best frame for each of the possible operator choices (turn left, turn right, jump forward, jump backward, jump forward and simultaneously turn right, jump forward and simultaneously turn left).

First, the program initializes variables which are used to keep track of the best entry found for each of the selections above. Cw_slope is clockwise, and ccw_slope is counterclockwise. Fov is the slope data for the current frame. LeftDiag is the slope data for the frame to the left of the current frame, its centerline close to twice the fov counterclockwise of the current frame's centerline. RightDiag is the slope data for the frame to the right of the current frame, its centerline close to twice the fov clockwise of the current frame's centerline.

```
void Tla_File::select_field_of_view(unsigned short current_frame)
{
        unsigned short fov_subset_index = MIN_FRAME_COUNT;// index used w/ subset array
        unsigned short subset_index;            // index used w/ data arrays
        SlopeData Fov;
        SlopeData LeftDiag;
        SlopeData RightDiag;
        float IndexCurrentSlope;
        int current_x = get_x_data(current_frame);  // get x coor for current frame
        int current_y = get_y_data(current_frame);  // get y coor for current frame
        int index_x;        // x coor of point/frame under test of being in camera's field of view
        int index_y;
        BOOL same_location;   // true if indexed point and current point are same point or location
        BOOL in_front_fov;    // true if indexed point is in the camera's field of view at current pt
        BOOL in_rear_fov;     // true if indexed point is in the current pt camera's rear view
mirror's fov
        BOOL in_left_diag;    // true if indexed point is in the left diagonal's range as seen from
current pt
        BOOL in_right_diag;   // true if indexed point is in the right diagonal's range as seen from
current pt
                // time saving combination used in side frame selection tradeoff
                // m_Selecting_Tradeoff is 1 to 17
        float DistanceGain = (float)(NEUTRAL_DIST_GAIN * m_Selecting_Tradeoff /
DEFAULT_PRIORITY);           // ~1/8 to 2+
        // calc slope of line of clockwise field of view limit within the xy plan (plan view)
        Fov.cw_slope = get_yaw_data(current_frame) - (m_HorzFieldOfViewAngle / 2);
        // calc slope of line of counterclockwise field of view limit within the xy plan (plan view)
        Fov.ccw_slope = get_yaw_data(current_frame) + (m_HorzFieldOfViewAngle / 2);
```

Figure 33:
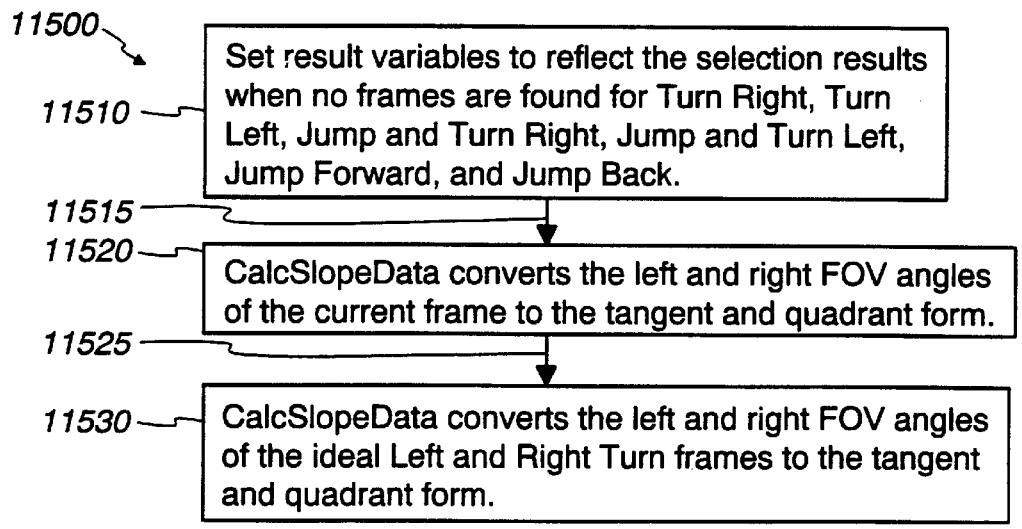

MCIWind viewer is playing the video as an animated display, then the document object 10907 broadcasts a message over the paths 10912, 10917, 10922, 10927, 10937,

CalcSlopeData converts the cw_slope and ccw_slope angles of the current frame to the tangent of the angles, with quadrant. (FIG. 33, step 11520)

```
    CalcSlopeData(&Fov);    // calc variables used in testing slope limits. Means of testing if yaw
in bounds
            // sets goal for side frame selection as fraction of
m_HorzFieldOfViewAngle
    float TurnAngleGoal = m_sideFrameGain * m_HorzFieldOfViewAngle;
            // left is ccw and TurnAngleGoal is added   to turn left
            // right is cw and TurnAngleGoal is subtracted to turn right
    if (TurnAngleGoal > m_MaxHeadingAngle)   // note this is a new use for
m_MaxHeadingAngle
        {
            // want right most limit of left diag range to be left of current yaw
        LeftDiag.cw_slope    = get_yaw_data(current_frame) + TurnAngleGoal −
m_MaxHeadingAngle;
            // want left most limit of right diag range to be right of current yaw
        Right Diag.ccw_slope = get_yaw_data(current_frame) − TurnAngleGoal +
m_MaxHeadingAngle;
        }
 else
        {
        LeftDiag.cw_slope = get_yaw_data(current_frame);
        RightDiag.ccw_slope = get_yaw_data(current_frame);
        }
            // note this is a new use for m_MaxHeadingAngle
        LeftDiag.ccw_slope   = get_yaw_data(current_frame) + TurnAngleGoal +
m_MaxHeadingAngle;
        RightDiag.cw_slope   = get_yaw_data(current_frame) − TurnAngleGoal −
m_MaxHeadingAngle;
```

CalcSlopeData converts the cw_slope and ccw_slope angles of the LeftDiag and RightDiag to the tangent of the angles, with quadrant. (FIG. 33, step 11530)

```
    CalcSlopeData(&LeftDiag); // calc variables used in testing slope limits. Means of testing if
yaw in bounds
    CalcSlopeData(&RightDiag); // calc variables used in testing slope limits. Means of testing if
yaw in bounds
    m_FovSubsetIndexMax   = NO_FRAMES;
    float CurrentPointYaw = get_yaw_data(current_frame); // use for finding most aligned fov pt
    float IndexPointYaw;
    float Cos_CurrentPointYaw = (float)cos(CurrentPointYaw * DEG_TO_RAD);
    float Sin_CurrentPointYaw = (float)sin(CurrentPointYaw * DEG_TO_RAD);
    float xCurrentMinusIndex;           // diff in x between current pt and index pt
    float yCurrentMinusIndex;           // diff in y between current pt and index pt
        // in these rating, smaller is better
        // used for selecting best frames to use for right and left mciwnds
    float AdjIndexCurrentDistanceRating;         // rating by distance from current point adj
for angle
    float WeightedRadiusDistanceRating;          // rating by distance from neighborhood
radius
    float LeftIndexRating;              // measure of merit for indexed pt as left pt
    float RightIndexRating;             // measure of merit for indexed pt as right pt
    float FovIndexRating;               // measure of merit for indexed pt as fwd jump
pt
    float FwdSmallestDisplayRating = HIGH_VALUE_RATING; // best measure of merit for
fwd jump pt so far
    float RearSmallestDisplayRating = HIGH_VALUE_RATING; // best measure of merit for
rear jump pt so far
    float LeftSmallestDisplayRating  = HIGH_VALUE_RATING; // best measure of merit for
left display pt so far
    float RightSmallestDisplayRating = HIGH_VALUE_RATING; // best measure of merit for
right display pt so far
    float LeftSmallestTurnRating     = HIGH_VALUE_RATING; // best measure of merit for
left turn pt so far
    float RightSmallestTurnRating    = HIGH_VALUE_RATING; // best measure of merit for
right turn pt so far
    float LeftSmallestDiagRating     = HIGH_VALUE_RATING; // best measure of merit for
left diag turn pt so far
    float RightSmallestDiagRating    = HIGH_VALUE_RATING; // best measure of merit for
right diag turn pt so far
    float DisplayYawAbsDiff;            // abs diff in yaw of limit yaw + trial display
pts
    float TurnYawAbsDiff;               // abs diff in yaw of limit yaw + trial turn pts
    float CurrentIndexYawAbsDiff;       // abs diff in yaw of current and index pts
```

-continued

```
    float IndexCurrentYawDiff;              // signed diff in yaw of current and index pts
    BOOL IndexYawToLeftOfCurrentYaw;        // is candidate frame's yaw pointing to
left of current yaw
    float DistanceSquared;                  // square of distance betw index and current pts.
    float NeighborRadiusSquared    = m_NeighborRadius * m_NeighborRadius;
        sqr of neighborhood radius
    float MultipliedNeighborRadiusSquared   // sqr of multiplied limit of neighborhood
radius
        = m_NeighborhoodMultiplier*m_NeighborhoodMultiplier*
NeighborRadiusSquared;
The result variables are set to reflect the selection results when no frames are found. (FIG. 33,
step 11510)
    m_FovPtClosestInYaw = NO_FRAMES;        // no closest point
    m_RearFovPtClosestInYaw = NO_FRAMES;    // no closest point
    m_PtLeftFov        = current_frame;     // if find nothing better, show behind
current point
    m_PtRightFOV       = current_frame;     // if find nothing better, show behind
current point;
    m_PtLeftTurn       = current_frame;     // if find nothing better, show over current
point;          // no closest point
    m_PtRightTurn      = current_frame;     // if find nothing better, show over current
point;
    m_PtLeftDiag       = NO_FRAMES;
    m_PtRightDiag      = NO_FRAMES;
    float LeftFovPtYaw  = CurrentPointYaw +   m_HorzFieldOfViewAngle;   // don't
worry if > 180'
    float RightFovPtYaw = CurrentPointYaw -   m_HorzFieldOfViewAngle; // don't
worry if < -180'
    float Left2FovPtYaw  = CurrentPointYaw + (2 * m_HorzFieldOfViewAngle); // don't
worry if > 180'
    float Right2FovPtYaw = CurrentPointYaw - (2 * m_HorzFieldOfViewAngle); // don't
worry if < -180'
    float LeftTurnPtYaw  = CurrentPointYaw +   TurnAngleGoal;           // don't worry if
> 180'
    float RightTurnPtYaw = CurrentPointYaw -   TurnAngleGoal;           // don't worry if
< 180'
```

Figure 32:
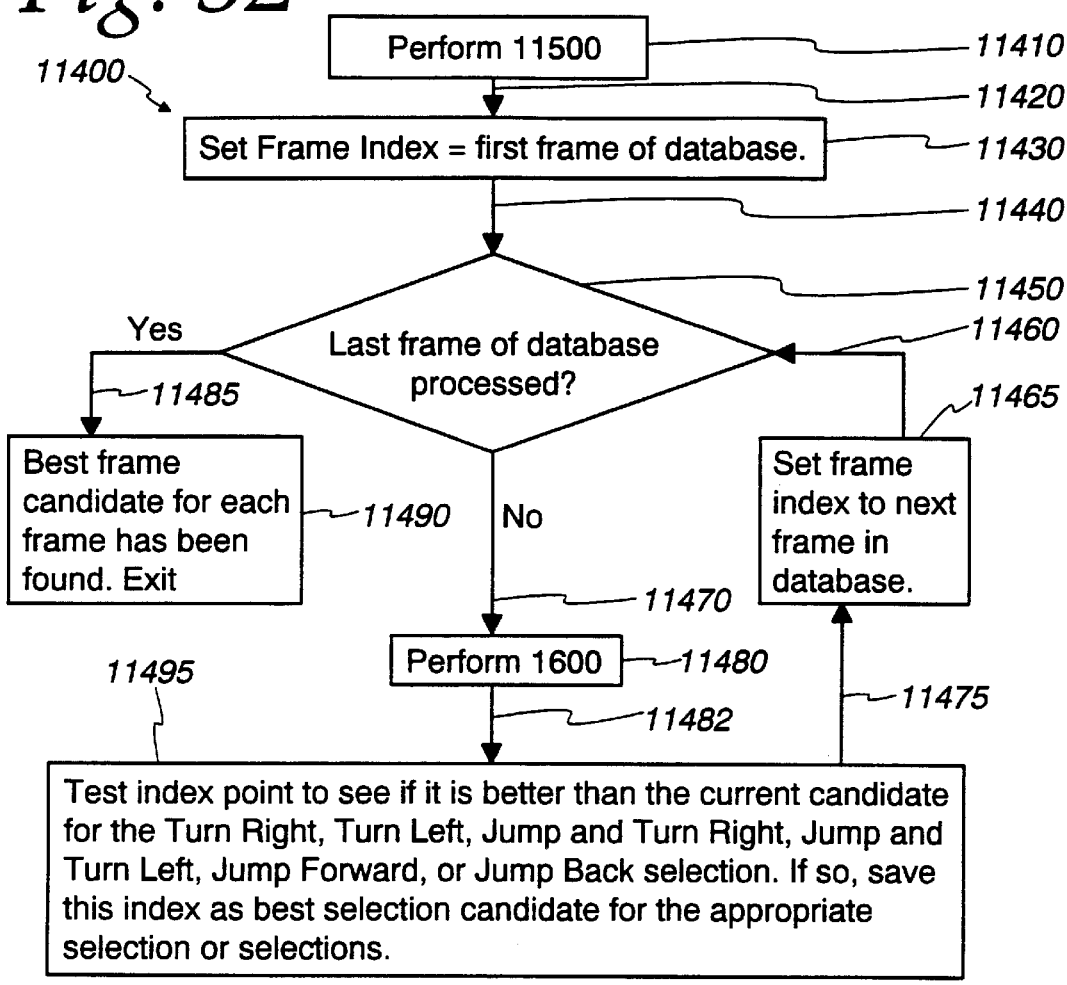
FIGS. 32 to 35 are flow chart representations of portions of the movie mapper program 325.

Now iterate through all frames in the database. (FIG. 32, Steps 11430, 11450, and 11465). The search may be limited to a subset of the all the frames in the database, if the operator has zoomed in on one of the data windows (Plan View, Elev, View, Yaw View, Pitch View, Roll View).

```
    unsigned short frame_index;
    if (m_zoom_subset_index_max != NO_FRAMES)         // If there are points in reg subset
        {
        for (subset_index   = MIN_FRAME_COUNT;
            subset_index    <= m_zoom_subset_index_max; // do all pts in reg subset defined by
views
            subset_index++
            )
        {
        in_front_fov = FALSE;
        in_rear_fov  = FALSE;
        in_left_diag = FALSE;
        in_right_diag = FALSE;
        frame_index  = get_frame_from_zoom_subset(subset_index);
        IndexPointYaw = get_yaw_data(frame_index);
```

Get the X and Y data for the frame. (FIG. 34, step 11610) In this loop "index" is the index of the frame being tested. "Current" is the index of the currently displayed frame.

```
index_x    = get_x_data(frame_index);
index_y    = get_y_data(frame_index);
    // calc offset using normal x,y axes
xCurrentMinusIndex = current_x - index_x;
yCurrentMinusIndex = current_y - index_y;
```

Calculate distance from current frame's location to index frame's location on plan view. (FGI. 34, step 11620)

```
    DistanceSquared = (float)(xCurrentMinusIndex*xCurrentMinusIndex +
yCurrentMinusIndex*yCurrentMinusIndex);
        // calc slope of line from current point to point under test (subset_index point)
        // first prevent divide by zero
same_location = FALSE;
```

Figure 34:
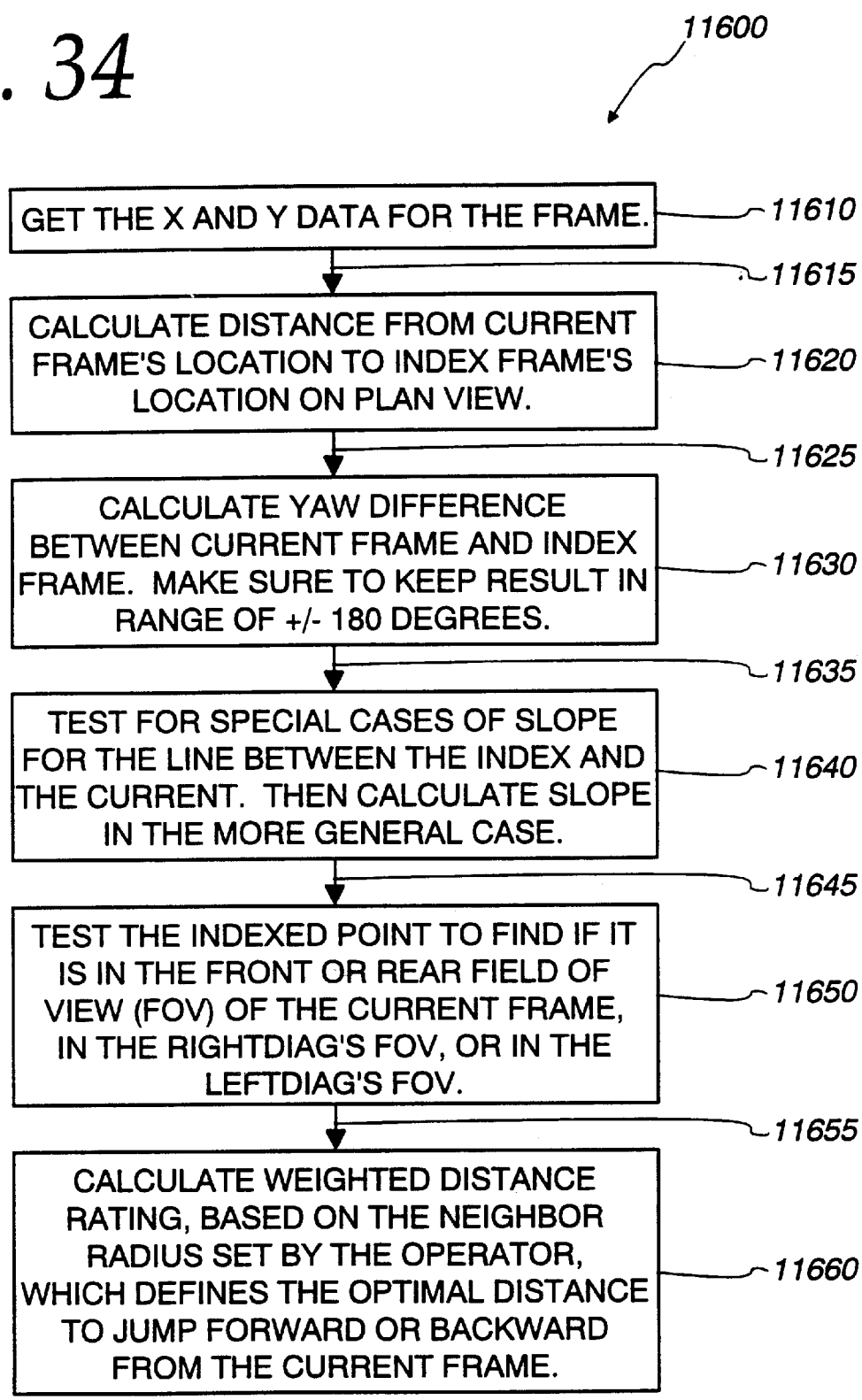

Calculate yaw difference between current frame and index frame. Make sure to keep result in range of +/− 180 degrees. (FIG. 34, step 11630)

```
    IndexCurrentYawDiff = IndexPointYaw - CurrentPointYaw; // pos yaw is counter
clockwise
    if (((IndexCurrentYawDiff >= 0)   // if candidate's yaw is closer to current pt's yaw in
ccw dir
        && (IndexCurrentYawDiff <= 180) // but no wrap around that makes far really close
on other side
        )
    || (IndexCurrentYawDiff < -180)   // appears to be clockwise
            // but does wrap around so makes big diff really close on
other side
        )
    {
    IndexYawToLeftOfCurrentYaw = TRUE;
    }
    else
    {
    IndexYawToLeftOfCurrentYaw = FALSE;
    }
    CurrentIndexYawAbsDiff = (float)(fabs(CurrentPointYaw - IndexPointYaw));
        // Cant be further apart than 180
    if (CurrentIndexYawAbsDiff >= 180)
    {
    CurrentIndexYawAbsDiff   = 360 - CurrentIndexYawAbsDiff;
    }
```

Test for special cases of slope for the line between the index and the current. The math calculation causes an error if the slope is vertical. Then calculate slope in the more general case. (FIG. 34, step 11640)

```
        // you would think that checking index_x and index_y would catch this
        // but the math is sometimes inexact evidently so explicitly check if same point
if (current_frame == frame_index)
    {
        // two points are on exactly same spot. You cant see yourself in your field of view
        IndexCurrentSlope = 0;          // s/b undefined, really.
        same_location    = TRUE;
    }
else
    {
    if (index_x == current_x)
        {
        if (index_y > current_y)
            {
            IndexCurrentSlope = MAX_SLOPE;
            }
        else if (index_y < current_y)
        {
        IndexCurrentSlope = -MAX_SLOPE;
        }
        else
        {
            // two points are on exactly same spot. You cant see yourself in your field of view
            IndexCurrentSlope = 0;          // s/b undefined, really.
            same_location    = TRUE;
        }
    }
else // ok tc calc slope. no divide by zero
    {
    IndexCurrentSlope    = ((float)index_y - current_y) / (index_x - current_x);
    }
}
```

Test the indexed point to find if it is in the front or rear field of view (fov) of the current frame, in the RightDiag's fov, or in the LeftDiag's fov. Jump and turn right's frame will be selected from the RightDiag fov. Jump and turn left's frame will be selected from the LeftDiag fov. (FIG. 34, step 11650)

```
// So, is the indexed point within the FRONT field of view of current point?
// Is it between the cw and ccw slope limits? If so, then in fov
// Note. Here x,y are data x,y, not display pixel x,y. First quadrant is pos x and pos y.
if ( index_y = current_y)
        {
        if (index_x >= current_x)      // index_quadrant = FIRST_QUADRANT;
            {           // slopes in this quadrant are positive. pos x/ pos y
            if ((( Fov.cw_quadrant    == FIRST_QUADRANT) // both same quadrant
                && (IndexCurrentSlope   >= Fov.cw_slope)   // proper relationship
                )
            || ( Fov.cw_quadrant    == FOURTH_QUADRANT) // (IndexCurrentSlope >=
cw_slope) is automatic here
                )
                {
                if ((( Fov.ccw_quadrant == FIRST_QUADRANT) // both same quadrant
                    && (IndexCurrentSlope <= Fov.ccw_slope) // proper relationship
                    )
                || (Fov.ccw_quadrant == SECOND_QUADRANT) // (IndexCurrentSlop <=
cw_slope) is automatic here
                    )
                    {
                    in_front_fov = TRUE;
                    } // ccw
                } // cw
                // see if in left diag yaw range
            if ((( LeftDiag.cw_quadrant     == FIRST_QUADRANT) // both same quadrant
                && (IndexCurrentSlope       >= LeftDiag.cw_slope)// proper relationship
                )
```

-continued

```
           || ( LeftDiag.cw_quadrant    == FOURTH_QUADRANT) // (IndexCurrentSlope
>= cw_slope) is automatic here
               )
               {
               if ((( LeftDiag.ccw_quadrant == FIRST_QUADRANT) // both same quadrant
                   && (IndexCurrentSlope         <= LeftDiag.ccw_slope) // proper relationship
                   )
               || (LeftDiag.ccw_quadrant == SECOND_QUADRANT) // (IndexCurrentSlope
<= cw_slope) is automatic here
                   )
                   {
                   in_left_diag = TRUE;
                   } // ccw
               } // cw
                   // see if in right diag yaw range
               if ((( (RightDiag.cw_quadrant   == FIRST_QUADRANT) // both same quadrant
                   && (IndexCurrentSlope         >= RightDiag.cw_slope) // proper relationship
                   )
               || ( RightDiag.cw_quadrant    == FOURTH_QUADRANT) // (IndexCurrentSlope
>= cw_slope) is automatic here
                   )
                   {
                   if ((( (RightDiag.ccw_quadrant == FIRST_QUADRANT) // both same quadrant
                       && (IndexCurrentSlope         <= RightDiag.ccw_slope)// proper relationship
                       )
                   || (RightDiag.ccw_quadrant == SECOND_QUADRANT) // (IndexCurrentSlope
<= cw_slope) is automatic here
                       )
                       {
                       in_right_diag = TRUE;
                       } // ccw
                   } // cw
               }     // if quadrant
           else   // (index_x < current_x)    index_quadrant = SECOND_QUADRANT;
               {             // slopes in this quadrant are negative. neg x/ pos y
               if ((( Fov.cw_quadrant    == SECOND_QUADRANT) // both same quadrant
                   && (IndexCurrentSlope >= Fov.cw_slope)    // greater than here means less
negative
                   )
               || ( Fov.cw_quadrant    == FIRST_QUADRANT) // must be ok so far
                   )
                   {
                   if ((( (Fov.ccw_quadrant == SECOND_QUADRANT) // both same quadrant
                       && (IndexCurrentSlope<= Fov.ccw_slope)    // less than here means more
negative
                       )
                   || (Fov.ccw_quadrant == THIRD_QUADRANT) // must be ok
                       )
                       {
                       in_front_fov = TRUE;
                       } // ccw
                   } // cw
                   // see if in left diag yaw range
               if ((( (LeftDiag.cw_quadrant   == SECOND_QUADRANT) // both same quadrant
                   && (IndexCurrentSlope         >= LeftDiag.cw_slope)// greater than here means less
negative
                   )
               || ( LeftDiag.cw_quadrant    == FIRST_QUADRANT) // must be ok so far
                   )
                   {
                   if ((( (LeftDiag.ccw_quadrant == SECOND_QUADRANT) // both same quadrant
                       && (IndexCurrentSlope         <= LeftDiag.ccw_slope)// less than here means more
negative
)
|| (LeftDiag.ccw_quadrant == THIRD_QUADRANT) // must be ok
)
{
in_left_diag = TRUE;
} // ccw
               } // cw
                   // see if in right diag yaw range
               if ((( (RightDiag.cw_quadrant   == SECOND_QUADRANT) // both same quadrant
                   && (IndexCurrentSlope         >= RightDiag.cw_slope) // greater than here means
less negative
                   )
               || ( RightDiag.cw_quadrant    == FIRST_QUADRANT) // must be ok so far
                   )
                   {
                   if ((( (RightDiag.ccw_quadrant == SECOND_QUADRANT) // both same quadrant
```

-continued

```
            && (IndexCurrentSlope <= RightDiag.ccw_slope) // less than here means more
negative
                )
            || (RightDiag.ccw_quadrant == THIRD_QUADRANT) // must be ok
            )
            {
            in_right_diag = TRUE;
            } // ccw
        }  // cw
     }       // else quadrant
    }
   else     // (index_y < current_y)
     {
      if (index_x >= current_x)     // index_quadrant = FOURTH_QUADRANT;
        {                // slopes in this quadrant are negative. pos x/ neg y
         if ((( (Fov.cw_quadrant   == FOURTH_QUADRANT) // both same quadrant
            && (IndexCurrentSlope   >= Fov.cw_slope)       // greater than here means less
negative
                )
            || (Fov.cw_quadrant   == THIRD_QUADRANT)
            )
            {
            if ((( (Fov.ccw_quadrant == FOURTH_QUADRANT) // both same quadrant
               && (IndexCurrentSlope <= Fov ccw_slope)      // less than here means more
negative
                )
            || ( Fov. ccw_quadrant == FIRST_QUADRANT)
            )
            {
            in_front_fov  = TRUE;
            } // ccw
        }  // cw
            // see if in left diag yaw range
         if ((( (LeftDiag.cw_quadrant   == FOURTH_QUADRANT)   // both same quadrant
            && (IndexCurrentSlope      >= LeftDiag.cw_slope) // greater than here means
less negative
                )
            || (LeftDiag.cw_quadrant   == THIRD_QUADRANT)
            )
            {
            if ((( (LeftDiag.ccw_quadrant == FOURTH_QUADRANT)  // both same quadrant
               && (IndexCurrentSlope      <= LeftDiag.ccw_slope) // less than here means more
negative
                )
            || ( LeftDiag.ccw_quadrant == FIRST_QUADRANT)
            )
            {
            in_left_diag   = TRUE;
            } // ccw
        }  // cw
            // see if in right diag yaw range
         if ((( (RightDiag.cw_quadrant   == FOURTH_QUADRANT)   // both same quadrant
            && (IndexCurrentSlope         >= RightDiag.cw_slope) // greater than here means
less negative
                )
            || (RightDiag.cw_quadrant   == THIRD_QUADRANT)
            )
            {
            if ((( (RightDiag.ccw_quadrant == FOURTH_QUADRANT)  // both same quadrant
               && (IndexCurrentSlope      <= RightDiag.ccw_slope) // less than here means
more negative
                )
            || ( RightDiag.ccw_quadrant == FIRST_QUADRANT)
            )
            {
            in_right_diag  = TRUE;
            } // ccw
        }  // cw
     }       // if quadrant
   else   // (index_x < current_x)   index_quadrant = THIRD_QUADRANT;
        {                  // slopes in this quadrant are positive. neg x/ neg y
         if ((( (Fov.cw_quadrant   == THIRD_QUADRANT)        // both same quadrant
            && (IndexCurrentSlope      >= Fov.cw_slope)           // proper relationship
                )
            || ( Fov.cw_quadrant     == SECOND_QUADRANT)
            )
            {
            if ((( (Fov.ccw_quadrant == THIRD_QUADRANT)        // both same quadrant
               && (IndexCurrentSlope <- Fov.ccw_slope)          // proper relationship
```

```
            )
        || (Fov.ccw_quadrant == FOURTH_QUADRANT)
        )
        {
        in_front_fov  = TRUE;
        } // ccw
    }  // cw
        // see if in left diag yaw range
    if ((( (LeftDiag.cw_quadrant   == THIRD_QUADRANT)       // both same quadrant
        && (IndexCurrentSlope      >= LeftDiag.cw_slope)  // proper relationship
        )
    || ( LeftDiag.cw_quadrant   == SECOND_QUADRANT)
        )
        {
        if ((( (LeftDiag.ccw_quadrant == THIRD_QUADRANT)        // both same quadrant
            && (IndexCurrentSlope      <= LeftDiag.ccw_slope)  // proper relationship
            )
        || (LeftDiag.ccw_quadrant == FOURTH_QUADRANT)
            )
            {
            in_left_diag  = TRUE;
            } // ccw
    }  // cw
        // see if in right diag yaw range
    if ((( (RightDiag.cw_quadrant   == THIRD_QUADRANT)      // both same quadrant
        && (IndexCurrentSlope       >= RightDiag.cw_slope) // proper relationship
        )
    || ( RightDiag.cw_quadrant   == SECOND_QUADRANT)
        )
        {
        if ((( (RightDiag.ccw_quadrant == THIRD_QUADRANT)       // both same quadrant
            && (IndexCurrentSlope       <= RightDiag.ccw_slope) // proper relationship
            )
        || (RightDiag.ccw_quadrant == FOURTH_QUADRANT)
            )
            {
            in_right_diag  = TRUE;
            } // ccw
    }  // cw
    }          // else quadrant
}
```

Calculate weighted distance rating, based on the neighbor radius set by the operator, which defines the optimal distance to jump forward or backward from the current frame. (FIG. 34, step 11660)

WeightedRadiusDistanceRating=(float)(fabs(NeighborRadiusSquared—DistanceSquared)*DistanceGain);

Test index point to see if it is better than the current candidate for the jump forward or jump backward selection. (FIG. 32, step 11495)

```
if (!same_location)        // indexed and current points are not at same x,y
    {
    FovIndexRating = CurrentIndexYawAbsDiff + WeightedRadiusDistanceRating;
        // find 'green dot', jump forward point and find which pts are in forward
        //     field of view subset
    if (in_front_fov)       // if in field of view
        {
        // put this subset_index point in further subset of points in field of view
        *(m_pFovSubsetIndex + fov_subset_index) = *(m_pZoomSubsetIndex + subset_index);
        fov_subset_index++;         // increment after using, get ready for loop
        m_FovSubsetIndexMax++;      // equal to highest index in this fov subset
        if (m_FovPtClosestInYaw == NO_FRAMES)      // if we don't have a current champion
            { // add criterion of keeping inside twice the neighborhood radius
            if ((MultipliedNeighborRadiusSquared >= DistanceSquared)   // in the double hood
                // Use this point only if it is not too different from current point's heading
                // Note the first champ is closer to the current angle difference than max limit
                && (CurrentIndexYawAbsDiff < m_MaxHeadingAngle)
                )
                {
                m_FovPtClosestInYaw      = subset_index;
```

-continued

```
            FwdSmallestDisplayRating = FovIndexRating;        // save for next candidate
comparison
                }
            }
        else // have a valid champ
            {
                // if this fov pt has smaller total rating than defending champ
            if ((FwdSmallestDisplayRating > FovIndexRating)
                // add criterion of keeping inside twice the neighborhood radius
            && (MultipliedNeighborRadiusSquared >= DistanceSquared)    // in the hood
                // Use this point only if it is not too different from current point's heading
                // Note the first champ is closer to the current angle difference than max limit
            && (CurrentIndexYawAbsDiff < m__MaxHeadingAngle)
                )
                {
            m__FovPtClosestInYaw       = subset__index;        // save for next candidate
comparison
            FwdSmallestDisplayRating = FovIndexRating;
            } // end if new champ beats old champ
        } // end else have a valid champ
        } // end jump forward point
    else   // not in front fov
        {
                // So, is the indexed point within the REAR field of view of current point?
                // Is it between the reverse cw and ccw slope limits? If so, then in rear fov
                // Note. Here x,y are data x,y, not display pixel x,y. First quadrant is pos x and
pos y.
        if ( index__y >= current__y)
            {
            if (index__x >= current__x)     // index__quadrant = FIRST__QUADRANT;
                {
                if ((( (Fov.rear__cw__quadrant   == FIRST__QUADRANT) // both same quadrant
                    && (IndexCurrentSlope         >= Fov.cw__slope)       // proper relationship
                    )
                || ) Fov.rear__cw__quadrant    == FOURTH__QUADRANT) // (−
IndexCurrentSlope >= rear__cw__slope) is automatic here
                    )
                    {
                    if ((( (Fov.rear__ccw__quadrant == FIRST__QUADRANT) // both same quadrant
                        && (IndexCurrentSlope         <= Fov.ccw__slope)       // proper relationship
                        )
                    || (Fov.rear__ccw__quadrant == SECOND__QUADRANT) // (−
IndexCurrentSlope <= rear__ccw__slope) is automatic here
                        )
                        {
                        in__rear__fov = TRUE;
                        } // ccw
                    }   // cw
                }      // if quadrant
            else   // (index__x < current__x)     index__quadrant = SECOND__QUADRANT;
                {
                if ((( (Fov.rear__cw__quadrant   == SECOND__QUADRANT) // both same quadrant
                    && (IndexCurrentSlope         >= Fov.cw__slope)        // proper relationship
                    )
                || ) Fov.rear__cw__quadrant    == FIRST__QUADRANT) // must be ok so far
                    )
                    {
                    if ((( (Fov.rear__ccw__quadrant == SECOND__QUADRANT) // both same quadrant
                        && (IndexCurrentSlope         <= Fov.ccw__slope)       // proper relationship
                        )
                    || (Fov.rear__ccw__quadrant == THIRD__QUADRANT) // must be ok
                        )
                        {
                        in__rear__fov = TRUE;
                        } // ccw
                    } // cw
                }    // else quadrant
            }
        else    // (index__y < current__y)
            {
            if (index__x >= current__x)     // index__quadrant = FOURTH__QUADRANT;
                {
                if ((( (Fov.rear__cw__quadrant   == FOURTH__QUADRANT) // both same quadrant
                    && (IndexCurrentSlope         >= Fov.cw__slope)         // proper relationship
                    )
                || (Fov.rear__cw__quadrant    == THIRD__QUADRANT)
                    )
                    {
                    if ((( (Fov.rear__ccw__quadrant == FOURTH__QUADRANT) // both same quadrant
```

-continued

```
                && (IndexCurrentSlope      <= Fov.ccw_slope)     // proper relationship
                )
            || ( Fov.rear_ccw_quadrant == FIRST_QUADRANT)
            )
            {
            in_rear_fov  = TRUE;
            } // ccw
          } // cw
        } // if quadrant
    else // (index_x < current_x)  index_quadrant = THIRD_QUADRANT;
      {
      if ((( Fov.rear_cw_quadrant   == THIRD_QUADRANT) // both same quadrant
          && (IndexCurrentSlope     >= Fov.cw_slope)     // proper relationship
          )
        || ( Fov.rear_cw_quadrant   == SECOND_QUADRANT)
        )
        {
        if ((( Fov.rear_ccw_quadrant == THIRD_QUADRANT) // both same quadrant
            && (IndexCurrentSlope      <= Fov.ccw_slope)     // proper relationship
            )
          ||  (Fov.rear_ccw_quadrant == FOURTH_QUADRANT)
          )
          {
          in_rear_fov  = TRUE;
          } // ccw
        } // cw
      } // else quadrant
  }
        // see if have new champion, find rear fov pt most aligned in yaw to current
frame
      if (in_rear_fov)            // if in rear view field of view
        {
        if (m_RearFovPtClosestInYaw == NO_FRAMES)       // if we don't have a current
champion
          { // add criterion of keeping inside twice the neighborhood radius
          if ((MultipliedNeighborRadiusSquared >= DistanceSquared)   // in the double
hood
            // Use this point only if it is not too different from current point's heading
            // Note the first champ is closer to the current angle difference than max limit
            && (CurrentIndexYawAbsDiff < m_MaxHeadingAngle)
            )
            {
            m_RearFovPtClosestInYaw   = subset_index;
            RearSmallestDisplayRating = FovIndexRating;         // save for next candidate
comparison
            }
          }
        else   // have a valid champ
          {
          // if this rear fov pt has smaller total rating than defending champ
          if ((RearSmallestDisplayRating > FovIndexRating)
            // add criterion of keeping inside twice the neighborhood radius
            && (MultipliedNeighborRadiusSquared >= DistanceSquared)   // in the hood
            // Use this point only if it is not too different from current point's heading
            // Note the first champ is closer to the current angle difference than max limit
            && (CurrentIndexYawAbsDiff < m_MaxHeadingAngle)
            )
            {
            m_RearFovPtClosestInYaw   = subset_index;
            RearSmallestDisplayRating = FovIndexRating;         // save for next candidate
comparison
                } // end if new champ beats old champ
              } // end else have a valid champ
            } // end if in rear fov
          } // end else not in front fov
        } // end if not same location
      if m_FovPtClosestInYaw   == current_frame)  // s/b impossible but .....
        {
        AfxMessageBox("Tla_File::select_field_of_view() m_FovPtClosestInYaw ==
current_frame");
        }
      if (m_RearFovPtClosestInYaw == current_frame)  // s/b impossible but .....
        {
        AfxMessageBox("Tla_File::select_field_of_view() m_RearFovPtClose_stInYaw ==
current_frame");
        }
```

Test index point to see if it is better than the current candidate for the jump and turn right or jump and turn left selection. (FIG. 32, step 11495)

```
            // looking for side frame candidates
        if ((NeighborRadiusSquared >= DistanceSquared)   // in the hood
            && (!same_location)         // and indexed and current points do not have identical x,y
location
            )
            {
            // the trig is there to forgive offset if the side frame is pointing in line w/ the offset
vector
            //   running from the current center point to the side frame. This is because offsets
are less
            //   noticeable if there are in the direction in which you are looking. Move your
head forward
            //   and back like a pigeon. Some movement of objects but not as much as when
you move
            //   your head left and right. Don't want to forgive completely so put in a
minimum.
        AdjIndexCurrentDistanceRating
                = (float)((fabs(xCurrentMinusIndex * (fabs_quick_cos(IndexPointYaw) + 0.2))
                + fabs(yCurrentMinusIndex * (fabs_quick_sin(IndexPointYaw) + 0.2))
                )
                * DistanceGain
                );
            // do left displayed frame
        if (IndexYawToLeftOfCurrentYaw == TRUE)
            {
            Display YawAbsDiff = (float)(fabs(LeftFovPtYaw - IndexPointYaw));
                // Cant be further apart than 180
            if (Display YawAbsDiff >= 360)
                {
                DisplayYawAbsDiff -= 360;
                }
            else if (DisplayYawAbsDiff >= 180)
                {
                DisplayYawAbsDiff  = 360 - DisplayYawAbsDiff;
                }
                // within neighborhood, within constrained subset  m_MaxHeadingAngle
                // if this pt is closer in yaw and in distance to goal than defending champ
            LeftIndexRating = DisplayYawAbsDiff + AdjIndexCurrentDistanceRating;
            if (LeftSmallestDisplayRating > LeftIndexRating)
                {
                        // if is actually pointing to the correct side but not too far
out
                if (Left2FovPtYaw <= 180)        // nothing weird
                    {
                    if ((IndexPointYaw > CurrentPointYaw)
                       && (Left2FovPtYaw >= IndexPointYaw)
                       )
                       {
                       // convert from subset index to frame
                       m_PtLeftFOV            = frame_index;
                       LeftSmallestDisplayRating = LeftIndexRating;// save it as benchmark
                       }
                    }
                else                    // weird range split by +/-180 line
                    {
                    if ((IndexPointYaw > CurrentPointYaw)
                       || (Left2FovPtYaw >= IndexPointYaw + 360)
                       )
                       {
                         // convert from subset index to frame
                       m_PtLetFOV             = frame_index;
                       LeftSmallestDisplayRating = LeftIndexRating;// save it as benchmark
                    }
                }
            }
        }
}
```

Test index point to see if it is better than the current candidate for turn left turn or right turn selection. (FIG. 32, step 11495)

```
        // now choose the lft turn frame
   TurnYawAbsDiff = (float)(fabs(LeftTurnPtYaw - IndexPointYaw));
        // Cant be further apart than 180
   if (TurnYawAbsDiff >= 360)
   {
   TurnYawAbsDiff -= 360;
   }
   else if (TurnYawAbsDiff >= 180)
   {
   TurnYawAbsDiff = 360 - TurnYawAbsDiff;
   }
          // within neighborhood, within constrained subset m_MaxHeadingAngle
          // if this pt is closer in yaw and in distance to goal than defending champ
   LeftIndexRating = TurnYawAbsDiff + AdjIndexCurrentDistanceRating;
   if (LeftSmallestTurnRating > LeftIndexRating)
   {
              // if is actually pointing to the correct side but not too far
out
     if (Left2FovPtYaw <= 180)      // nothing weird
     {
       if ((IndexPointYaw > CurrentPointYaw)
        && (Left2FovPtYaw >= IndexPointYaw)
        )
       {
          // convert from subset index to frame
        m_PtLeftTurn        = frame_index;
        LeftSmallestTurnRating = LeftIndexRating;// save it as benchmark
       }
     }
     else              // weird range split by +/-180 line
     {
        if ((IndexPointYaw > CurrentPointYaw)
        || (Left2FovPtYaw >= IndexPointYaw + 360)
        )
        {
           // convert from subset index to frame
         m_PtLeftTurn        = frame_index;
         LeftSmallestTurnRating = LeftIndexRating;// save it as benchmark
        }
     }
    }       // end if IndexYawToLeftOfCurrentYaw
else    // on index yaw is to the right of the current yaw
    {
        // do right displayed frame
    DisplayYawAbsDiff = (float)(fabs(RightFovPtYaw - IndexPointYaw));
        // Cant be further apart than 180
    if (DisplayYawAbsDiff >= 360)
    {
    DisplayYawAbsDiff -= 360;
    }
    else if (DisplayYawAbsDiff >= 180)
    {
    DisplayYawAbsDiff   = 360 - DisplayYawAbsDiff;
    }
        // within neighborhood, within constrained subset   m_MaxHeadingAngle
        // if this pt is closer in yaw and in distance to goal than defending champ
    RightIndexRating = DisplayYawAbsDiff + AdjIndexCurrentDistanceRating;
    if (RightSmallestDisplayRating > RightIndexRating)
    {
              // if is actually pointing to the correct side but not too far out
     if (Right2FovPtYaw >= -180)      // nothing weird
       {
        if ((IndexPointYaw < CurrentPointYaw)
        && (Right2FovPtYaw <= IndexPointYaw)
        )
        {
           // convert from subset index to frame
         m_PtRightFOV         = frame_index;
         RightSmallestDisplayRating = RightIndexRating;// save it as benchmark
        }
      }
     else             // weird range split by +/-180 line
      {
```

-continued

```
            if ((IndexPointYaw < CurrentPointYaw)
              || (Right2FovPtYaw <= IndexPointYaw - 360)
              )
              {
                // convert from subset index to frame
                m_PtRightFOV            = frame_index;
                RightSmallestDisplayRating = RightIndexRating;// save it as benchmark
              }
            }
          } // end if m_PtRightFOV
          // now choose the right turn frame
          TurnYawAbsDiff = (float)(fabs(RightTurnPtYaw - IndexPointYaw));
            // Cant be further apart than 180
          if (TurnYawAbsDiff >= 360)
          {
            TurnYawAbsDiff -= 360;
          }
          else if (TurnYawAbsDiff >= 180)
          {
            TurnYawAbsDiff  = 360 - TurnYawAbsDiff;
          }
                    // within neighborhood, within constrained subset
                    // if this pt is closer in yaw and in distance to goal than defending champ
          RightIndexRating = TurnYawAbsDiff + AdjIndexCurrentDistanceRating;
          if (RightSmallestTurnRating > RightIndexRating)
          {
                      // if is actually pointing to the correct side but no too far out
            if (Right2FovPtYaw >= -180)     // nothing weird
            {
              if ((indexPointYaw < CurrentPointYaw)
                && (Right2FovPtYaw <= IndexPointYaw)
                )
                {
                  // convert from subset index to frame
                  m_PtRightTurn       = frame_index;
                  RighttSmallestTurnRating = RightIndexRating;// save it as benchmark
                }
              }
            }
            else                  // weird range split by +/-180 line
            {
              if ((IndexPointYaw < CurrentPointYaw)
              || (Right2FovPtYaw <= IndexPointYaw - 360)
              )
              {
                // convert from subset index to frame
                m_PtRightTurn       = frame_index;
                RightSmallestTurnRating = RightIndexRating;// save it as benchmark
              }
            }
          }
        } // end if m_PtRightTurn
      }   // end if not IndexYawToLeftOfCurrentYaw
}         // end if within neighborhood radius
```

Test index point to see if it is better than the current candidate for turn left frame or right frame display in Triple Mci display mode. (FIG. 32, step 11495)

```
if (in_left_diag)          // if in range
    {
        // now choose the left diag frame
        TurnYawAbsDiff = (float)(fabs(LeftTurnPtYaw - IndexPointYaw));
            // Cant be further apart than 180
            if (TurnYawAbsDiff >= 360)
            {
              TurnYawAbsDiff -=  360;
            }
            else if (TurnYawAbsDiff >=0 180)
            {
              TurnYawAbsDiff =  360 - TurnYawAbsDiff;
            }
        LeftIndexRating = TurnYawAbsDiff + WeightedRadiusDistanceRating;
        if ((m_PtLeftDiag == NO_FRAMES)     // if we don't have a current champion
              // or if this pt is closer in yaw and in distance to goal than defending champ
```

-continued

```
                || (LeftSmallestDiagRating > LeftIndexRating)
                )
                {
                    // the absolute standards
                    if ((MultipliedNeighborRadiusSquared >= DistanceSquared)   // in the double hood
                        // Use this point only if it is not too different from turn point's heading
                        // Note the first champ is closer to the current angle difference than max limit
                        && (TurnYawAbsDiff < m_MaxHeadingAngle)
                        )
                        {
                            // convert from subset index to frame
                            m_PtLeftDiag         = frame_index;
                            LeftSmallestDiagRating = LeftIndexRating; // save it as benchmark
                        }
                }
            }       // end if in diag range
            if (in_right_diag)           // if in range
            {
                // now choose the left diag frame
                TurnYawAbsDiff = (float)(fabs(RightTurnPtYaw - IndexPointYaw));
                // Cant be further apart than 180
                if (TurnYawAbsDiff >= 360)
                {
                    TurnYawAbsDiff -=    360;
                }
                else if (TurnYawAbsDiff >= 180)
                {
                    TurnYawAbsDiff = 360 - TurnYawAbsDiff;
                }
                RightIndexRating = TurnYawAbsDiff + WeightedRadiusDistanceRating;
                if ((m_PtRightDiag == NO_FRAMES)       // if we don't have a current champion
                    // or if this pt is closer in yaw and in distance to goal than defending champ
                || (RightSmallestDiagRating > RightIndexRating)
                )
                {
                    // the absolute standards
                    if ((MultipliedNeighborRadiusSquared >= DistanceSquared)   // in the double hood
                        // Use this point only if it is not too different from turn point'sheading
                        // Note the first champ is closer to the current angle difference than max limit
                        && (TurnYawAbsDiff < m_MaxHeadingAngle)
                        )
                        {
                            // convert from subset index to frame
                            m_PtRightDiag         = frame_index;
                            RightSmallestDiagRating = RightIndexRating; // save it as benchmark
                        }
                }
            }       // end if in diag range
        }           // end for
        if (m_PtLeftFOV == NO_FRAMES)
        {
            AfxMessageBox("Tla_File::select_field_of_view() m_PtLeftFOV == NO_FRAMES");
        }
        if (m_PtRightFOV == NO_FRAMES)
        {
            AfxMessageBox("Tla_File::select_field_of_view() m_PtRightFOV == NO_FRAMES");
        }
        if (m_FovPtClosestInYaw != NO_FRAMES)       // if picked a point
        {
            if (get_frame_from_zoom_subset(m_FovPtClosestInYaw) == current_frame)   // s/b
impossible but .....
            {
                AfxMessageBox("Tla_File::select_field_of_view() m_FovPtClosestInYaw ==
current_frame");
            }
        }
    }     // end if not m_zoom_subset_index_max
    return;
}
```

Figure 35:
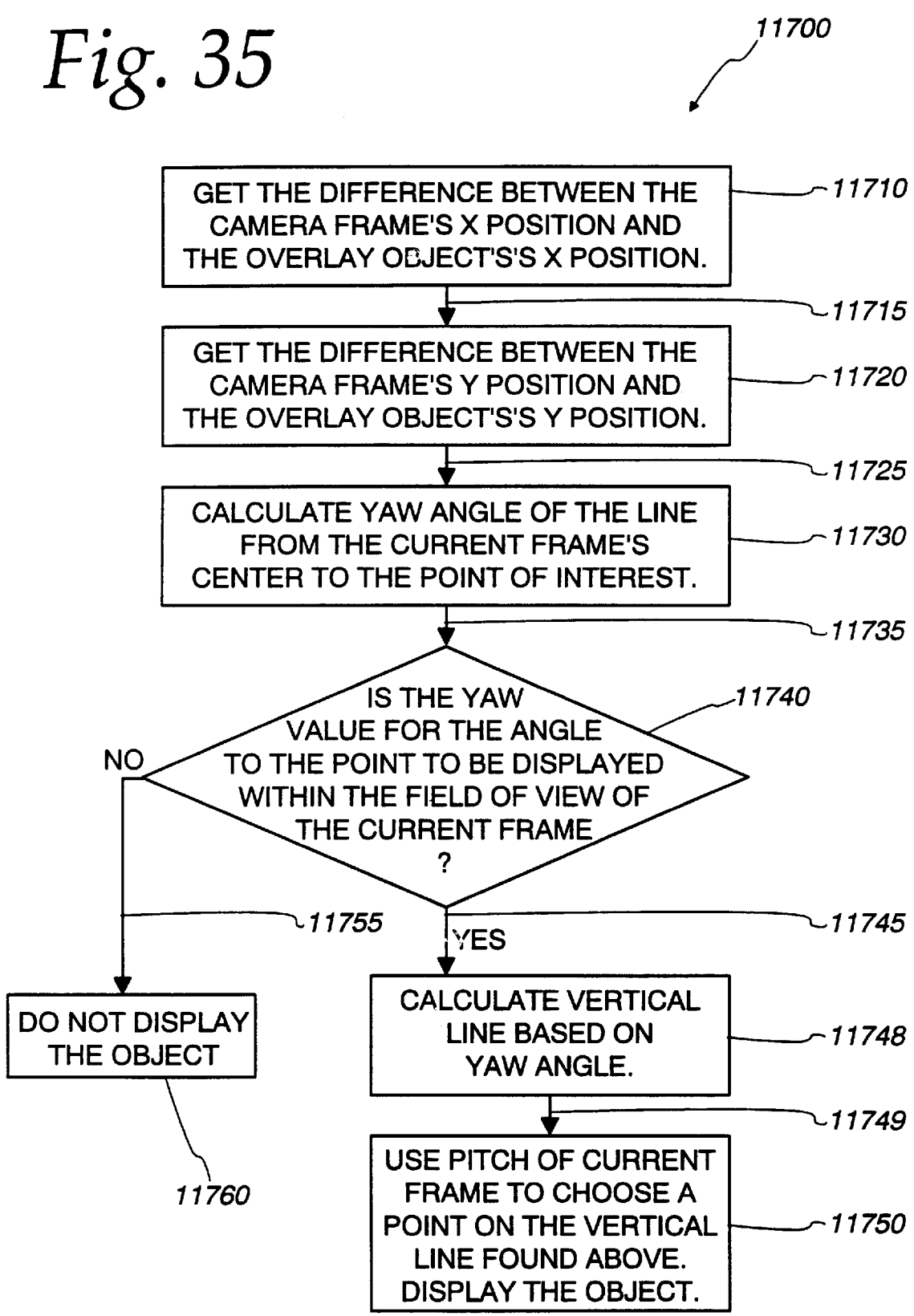

The overlay window relates points and areas in the geometric space defined by the camera's movements to points and areas within a particular video frame. Geometric points and areas within the geometric space are projected to the camera's image plane using the following formula (In this code fragment the calculation is done for a Tombstone type overlay, but the calculation is the same for any overlay object.):

First, get the difference between the camera frame's x position and the overlay object's's x position. (FIG. 35, step 11710)

```
numerator = -(m_pDoc->m_mta_file.m_Tombstone[index].XCtr
            - m_pDoc->m_tla_file.get_x_data(ThisWindsFrame)
          );
```

Next, get the difference between the camera frame's y position and the overlay object's y position. (FIG. 35, step 11720)

```
denominator = (m_pDoc->m_mta_file.m_Tombstone[index].YCtr
             - m_pDoc->m_tla_file.get_y_data(ThisWindsFrame)
           );
```

Calculate yaw angle of the line from the current frame's center to the point of interest. (FIG. 35, step 11730)

If it is within the limits, calculate the offset from the middle pixel to the vertical line of pixels corresponding to the object's yaw angle relative to the current frame's yaw angle. (FIG. 35, step 11748)

xPixel=(int)(xMidPixel+(xScale * tan(DEG_TO_RAD*
(yawCurrentPt-yawFramlToOverlay))));

Finally, the pitch of the current frame is used to choose a point on the vertical line determined above. The calculation for CalcOverlayMarkers is described below. (FIG. 35, step 11750)

```
pitchFrameToOverlay =
    CalcOverlayMarkers(&MarkerHalfWidth,
        &MarkerHalfHeight,
        m_pDoc->m_mta_file.m_Tombstone[index].XCtr,
        m_pDoc->m_mta_file.m_Tombstone[index].YCtr,
        ThisWndsFrame
    );
```

This program segment calculates the point on the vertical line determined by yaw angle from the current frame's centerline at which to project an x,y coordinate onto the current video frame. It presumes that the photographed space is planar and is not inclined with respect to the gravitational normal. It uses a CameraHeight setting, adjustable by the operator via the Action-Adjust Parameters dialog Camera Height Above Floor entry 10316 (FIG. 21).

```
            // calc angle of line from current point to this active tombstone
    if (denominator != 0)    // don't divide by zero
        {
        yawFrameToOverlay = (float)(RAD_TO_DEG * atan2(numerator, denominator));
        }
    else            // denom is zero
        {
            // make ratio of num/denom big via a small denominator but avoid div by zero
        yawFrameToOverlay = (float)(RAD_TO_DEG * atan2(numerator,
SMALL_ARBITRARY_FLOAT));
        }
    Test to see if the yaw value for the angle to the point to be displayed is within the field of view
of the current frame. (FIG. 35, step 11740)
            // if in limits, calc differential yaw, scale and display bar
    if (((YawLimits == NORMAL_LIMITS)
            && ((yawFrameToOverlay >= yawMinFov) && (yawFrameToOverlay <=
yawMaxFov))    // note &&
        )
    || ((YawLimits == Wrapped_LIMITS)
        && ((yawFrameToOverlay >= yawMinFov) || (yawFrameToOverlay <=
yawMaxFov))    // note ||
        )
        )
        {
```

```
// calculate angle between horizon and line from camera (at m_pDoc-
>m_tla_file.m_CameraHeight off flat floor)
// to a particluar overlay marker. Flat floor assumes z doesn't change too much.
float CMciWnd::CalcOverlayMarkers(int *pHalfWidth, int *pHalfHeight, int xCtrZone, int
yCtrZone,
                unsigned short  ThisWndsFrame)
{
    float  AngleHorizonToMarkerOnFloor;
    double XYDistance;
    // d = x^2 + y^2
    XYDistance = ( XCtrZone - (double)(m_pDoc->m_tla_file.get_x_data(ThisWndsFrame)))
        *( xCtrZone - (double)(m_pDoc->m_tla_file.get_x_data(ThisWndsFrame)))
        +
            ( yCtrZone - (double)(m_pDoc->m_tla_file.get_y_data(ThisWndsFrame)))
            *( yCtrZone - (double)(m_pDoc->m_tla_file.get_y_data(ThisWndsFrame)));
    if (XYDistance <= 0)
    {
    TRACE("CMciWnd::CalcOverlayMarkers, bad XYDistance after sqrt()/n");
    AfxMessageBox("CMciWnd::CalcOverlayMarkers, bad XYDistance before sqrt()/n");
    return 0;
    }
else if (XYDistance == 0)
    {
    XYDistance = (double)SMALL_ARBITRARY_FLOAT; // let's not divide by zero.
    }
else
    {
    // take square root
    XYDistance = sqrt(XYDistance);
    }
    // for this part of calc, ignore pitch of camera, assume level
    // calc angle between horizon and line from camera to center of dropped avi
    AngleHorizonToMarkerOnFloor
        = (float)(RAD_TO_DEG * atan2(m_pDoc->m_tla_file.m_CameraHeight,
XYDistance));
    float SizeAdj = (float)(10 * m_pDoc->m_tla_file.m_CameraHeight / XYDistance);
    *pHalfWidth   = (int)(MAX_MARKER_WIDTH * SizeAdj);
    *pHalfHeight = (int)(MAX_MARKER_HEIGHT * SizeAdj);
    if (*pHalfWidth < MIN_MARKER_WIDTH)
        {
        *pHalfWidth = MIN_MARKER_WIDTH;
        }
    else if (*pHalfWidth > MAX_MARKER_WIDTH)
        {
        *pHalfWidth = MAX_MARKER_WIDTH;
        }
    if (*pHalfHeight < MIN_MARKER_HEIGHT)
        {
        *pHalfHeight = MIN_MARKER_HEIGHT;
        }
    else if (*pHalfHeight > MAX_MARKER_HEIGHT)
        {
        *pHalfHeight = MAX_MARKER_HEIGHT;
        }
    return AngleHorizonToMarkerOnFloor;
}
```

While the preferred embodiment of the invention has been described, it will be understood that numerous modifications and changes will occur to those skilled in the art. It is therefore intended by the appended claims to define the true scope of the invention.

What is claimed as new and desired to be secured by Letters Patent of the United States is:

1. A spatially referenced photographic system comprising:
   a data base containing plural images of objects and also containing information corresponding to said images defining the position at which each image was originally viewed and the orientation of the image with respect to that position;
   image presentation and navigation means for displaying the images to a user and for facilitating the user in navigating among said images by receiving spatial movement commands from the user, as indicated by said spatial movement commands;
   a camera capable of capturing data representative of plural images of objects;
   position sensing means connected to said camera for capturing data defining the position of said camera at times when images are captured;
   orientation sensing means connected to said camera for capturing data defining the orientation of said camera at times when images are captured;
   data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position; and wherein said orientation sensing means comprises gimbals associated with gyroscopes.

2. A spatially referenced photographic system in accordance with claim 1 wherein said gyroscopes are rigidly attached to said camera by means of gimbals, and where said orientation defining data is derived from the rotational position of said gimbals.

3. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position;

wherein said image presentation and navigation means includes means for displaying, along with an image, a view of the camera path and an indication of the camera position and orientation when the image was recorded;

wherein camera position and orientation is indicated by a mark on the path oriented as the camera is oriented to point where the camera was pointing; and wherein the view is a plan view and wherein the mark bears an indication thereon of the yaw angle of the camera.

4. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position;

wherein said image presentation and navigation means includes means for displaying, along with an image, a view of the camera path and an indication of the camera position and orientation when the image was recorded; and wherein a mark appears in said image of a location associated with another image such that the user may signal a desire to navigate forward to view said another image in a simple manner.

5. A spatially referenced photographic system in accordance with claim 4 wherein the path also bears an indication of the location of said another image.

6. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position; and wherein said image presentation and navigation means provides the user with navigation controls for moving backward, in response to the actuation of which controls said presentation and navigation means selects an image captured at a generally backward camera position having an orientation similar to that of an image the user is currently viewing.

7. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position; and wherein said image presentation and navigation means provides the user with navigation controls for rotating left or right, in response to the actuation of which controls said presentation and navigation means selects an image captured at a generally left-rotated or right-rotated camera position having a position fore-, aft-, and side-to-side similar to that of an image the user is currently viewing.

8. A spatially referenced photographic system in accordance with claim 7 wherein the image which the user is currently viewing bears marks indicating left and right possible rotations which thereby indicate the general location of the viewpoint of said image captured at said generally left-rotated or right-rotated camera positions.

9. A spatially referenced photographic system in accordance with claim 8 wherein the user signals a desire to move generally left or right by mouse clicking on said indicating marks.

10. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position; and wherein said image representation and navigation means provides the user with navigation controls for moving forward and simultaneously rotating to the left or to the right, in response to the actuation of which controls said presentation and navigation means selects an image captured at a generally forward camera position having an angular orientation rotated to the left or right of that of an image the user is currently viewing.

11. A spatially referenced photographic system comprising:

a data base containing plural images of objects and also containing information corresponding to said images defining the position at which each image was originally viewed and the orientation of the image with respect to that position;

image presentation and navigation means for displaying the images to a user and for facilitating the user in navigating among said images by receiving spatial movement commands from the user, as indicated by said spatial movement commands;

a camera capable of capturing data representative of plural images of objects;

position sensing means connected to said camera for capturing data defining the position of said camera at times when images are captured;

orientation sensing means connected to said camera for capturing data defining the orientation of said camera at times when images are captured;

data capturing means for receiving image representation data from said camera, position defining data from said position sensing means, and orientation defining data from said orientation sensing means and for storing all of said data to form said data base containing plural images of objects and also containing information corresponding to said images defining the position at which each image was originally viewed and the orientation of the image with respect to that position; and said image presentation and navigation means providing the user with navigation controls, in response to the actuation of which controls said presentation and navigation means selects an image captured at a position generally shifted from that of an image the user is currently viewing, as indicated by the user actuation of said controls.

\* \* \* \* \*

UNITED STATES PATENT AND TRADEMARK OFFICE
CERTIFICATE OF CORRECTION

| | | |
|---|---|---|
| PATENT NO. | : 6,195,122 B1 | Page 1 of 1 |
| APPLICATION NO. | : 08/894206 | |
| DATED | : February 27, 2001 | |
| INVENTOR(S) | : Robert Vincent | |

It is certified that error appears in the above-identified patent and that said Letters Patent is hereby corrected as shown below:

On TITLE Page, Item [75]

"Wakefield, IL" should read --Wakefield, MA--

Signed and Sealed this

Twenty-eighth Day of August, 2012

David J. Kappos
*Director of the United States Patent and Trademark Office*